US012394374B2

(12) United States Patent
Liu et al.

(10) Patent No.: US 12,394,374 B2
(45) Date of Patent: Aug. 19, 2025

(54) DISPLAY SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Song Liu, Beijing (CN); Yang Zhou, Beijing (CN); Lu Bai, Beijing (CN); Junxiu Dai, Beijing (CN); Lingtong Li, Beijing (CN); Liheng Wei, Beijing (CN); Tianci Chen, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/029,356

(22) PCT Filed: Jun. 21, 2022

(86) PCT No.: PCT/CN2022/100197
§ 371 (c)(1),
(2) Date: Mar. 29, 2023

(87) PCT Pub. No.: WO2023/245438
PCT Pub. Date: Dec. 28, 2023

(65) Prior Publication Data

US 2024/0363066 A1 Oct. 31, 2024

(51) Int. Cl.
*G09G 3/3233* (2016.01)
*G09G 3/00* (2006.01)
*G09G 3/3266* (2016.01)

(52) U.S. Cl.
CPC ........... *G09G 3/3233* (2013.01); *G09G 3/006* (2013.01); *G09G 3/3266* (2013.01);
(Continued)

(58) Field of Classification Search
CPC .... G09G 3/3233; G09G 3/006; G09G 3/3266; G09G 2310/0286; G09G 2310/0291; G09G 2310/08; G09G 2330/023; G09G 2330/12
See application file for complete search history.

(56) References Cited

U.S. PATENT DOCUMENTS

2018/0075803 A1 3/2018 Lee et al.
2019/0096322 A1* 3/2019 Gao .................... G09G 3/3266
(Continued)

FOREIGN PATENT DOCUMENTS

CN 107767819 A 3/2018
CN 110033734 A 7/2019
(Continued)

OTHER PUBLICATIONS

European Search Report for 22947218.8 Mailed Jan. 7, 2025.

*Primary Examiner* — Kenneth B Lee, Jr.
(74) *Attorney, Agent, or Firm* — Ling Wu; Stephen Yang; Ling and Yang Intellectual Property

(57) ABSTRACT

A display substrate and a display device are provided, the display substrate includes a base substrate and a circuit structure layer disposed on the base substrate, the circuit structure layer includes a pixel circuit, a scan drive circuit, a control drive circuit and a buffer drive circuit; the pixel circuit includes a node reset transistor, a writing transistor, a reset signal line connected to a control electrode of the node reset transistor, a scan signal line connected to a control electrode of the writing transistor, and a control signal line; reset signal lines of pixel circuits of first to K-th rows are electrically connected with the buffer drive circuit, reset signal lines of pixel circuits of (K+1)-th to N-th row are electrically connected with the scan drive circuit or the control drive circuit.

20 Claims, 18 Drawing Sheets

(52) U.S. Cl.
CPC ............... *G09G 2310/0286* (2013.01); *G09G 2310/0291* (2013.01); *G09G 2310/08* (2013.01); *G09G 2330/023* (2013.01); *G09G 2330/12* (2013.01)

(56) References Cited

U.S. PATENT DOCUMENTS

| | | | | |
|---|---|---|---|---|
| 2021/0183312 | A1 | 6/2021 | Kim et al. | |
| 2021/0193020 | A1 | 6/2021 | Ka et al. | |
| 2022/0383820 | A1 | 12/2022 | Zeng et al. | |
| 2022/0392408 | A1* | 12/2022 | Zhang | G09G 3/3266 |
| 2022/0415257 | A1* | 12/2022 | Liu | G09G 3/3233 |

FOREIGN PATENT DOCUMENTS

| | | | |
|---|---|---|---|
| CN | 111243526 | A | 6/2020 |
| CN | 113471225 | A | 10/2021 |
| CN | 113990259 | A | 1/2022 |
| CN | 215577633 | U | 1/2022 |
| CN | 114514573 | A | 5/2022 |
| CN | 114627807 | A | 6/2022 |
| JP | 2006-284943 | A | 10/2006 |
| JP | 2009-69292 | A | 4/2009 |
| JP | 2009116115 | A | 5/2009 |
| WO | 2021031167 | A1 | 2/2021 |
| WO | 2022028186 | A1 | 2/2022 |

* cited by examiner

DISPLAY SUBSTRATE AND DISPLAY DEVICE

CROSS-REFERENCE TO RELATED APPLICATION

The present application is a U.S. National Phase Entry of International Application PCT/CN2022/100197 having an international filing date of Jun. 21, 2022, and entitled "Display Substrate and Display Device". The entire contents of the above-identified application are hereby incorporated by reference.

TECHNICAL FIELD

The present disclosure relates to, but is not limited to, the field of display technology, and more particularly, to a display substrate and a display device.

BACKGROUND

An Organic Light Emitting Diode (OLED for short) and a Quantum-dot Light Emitting Diode (QLED for short) are active light emitting display devices and have advantages such as self-luminescence, wide viewing angle, high contrast ratio, low power consumption, very high response speed, lightness and thinness, flexibility, and low costs. With constant development of display technologies, a flexible display that uses an OLED or a QLED as a light emitting device and performs signal control by a Thin Film Transistor (TFT for short) has become a mainstream product in the field of display at present.

SUMMARY

The following is a summary of subject matter described herein in detail. The summary is not intended to limit the protection scope of claims.

In a first aspect, the present disclosure provides a display substrate including a base substrate and a circuit structure layer disposed on the base substrate, wherein the circuit structure layer includes a pixel circuit, a scan drive circuit, a control drive circuit and a buffer drive circuit; the pixel circuit includes a node reset transistor, a writing transistor, a reset signal line, a scan signal line, and a control signal line, wherein the reset signal line is connected with a control electrode of the node reset transistor, the scan signal line is connected with a control electrode of the writing transistor;

reset signal lines of pixel circuits of first row to K-th row are electrically connected with the buffer drive circuit, reset signal lines of pixel circuits of (K+1)-th row to N-th row are electrically connected with the scan drive circuit or the control drive circuit, wherein K is designed such that a difference between a start time of a scan signal line or a control signal line of a pixel circuit being an effective level signal and an end time of a signal of a reset signal line being an effective level signal is greater than or equal to a threshold time, and N is a total number of rows of the pixel circuits.

In some possible implementations, the pixel circuit further includes a drive transistor, the threshold time t is approximately equal to K*(1/f)/N, or K*(1/f)/(N+N0), or Tstress, where f is a refresh frequency of the display substrate, N is a total number of rows of the pixel circuits, NO is a sum of number of blank rows executed by the display substrate before and/or after operation of the N rows pixel circuit, NO is a positive integer greater than or equal to 0, and Tstress is a recovery time of a threshold voltage of the biased drive transistor.

In some possible implementations, scan signal lines of pixel circuits of the first row to N-th row are electrically connected to the scan drive circuit, and control signal lines of pixel circuits of the first row to N-th row are electrically connected to the control drive circuit;

when a transistor type of the node reset transistor is the same as that of the writing transistor, the reset signal lines of the pixel circuits of (K+1)-th row to N-th row are electrically connected with the scan drive circuit; the pixel circuit further includes a compensation transistor and a compensation reset transistor; a transistor type of the compensation reset transistor is opposite to those of the drive transistor, the node reset transistor, the writing transistor and the compensation transistor; the scan signal line is further electrically connected with a control electrode of the compensation transistor, and a control signal line is electrically connected with a control electrode of the compensation reset transistor;

when the transistor type of the node reset transistor is opposite to that of the writing transistor, the reset signal lines of the pixel circuits of (K+1)-th row to N-th are electrically connected with the control drive circuit, and the pixel circuit further includes the compensation transistor; the transistor types of the node reset transistor and the compensation transistor are opposite to those of the drive transistor and the writing transistor; the control signal line is electrically connected with the control electrode of the compensation transistor.

In some possible implementations, a display area and a non-display area are included, wherein the non-display area includes a bezel area surrounding a periphery of the display area and a bonding area located at a side of the bezel area away from the display area;

the scan drive circuit, the control drive circuit and the buffer drive circuit are located in the display area and/or the non-display area;

when the scan drive circuit, the control drive circuit and the buffer drive circuit are located in the non-display area, the scan drive circuit and the control drive circuit are located at a first side and a second side of the display area which are opposite to each other, the buffer drive circuit is located at a third side of the display area away from the bonding area, or a fourth side of the display area close to the bonding area.

In some possible implementations, a light emitting drive circuit is further included, wherein the pixel circuit further includes a light emitting transistor and a light emitting signal line; the light emitting signal line is electrically connected with a control electrode of the light emitting transistor; the light emitting drive circuit is located at a side of the control drive circuit away from the display area;

light emitting signal lines of pixel circuits of the first row to N-th row are electrically connected with the light emitting drive circuit;

for a same row of pixel circuits, a difference between a start time of a signal of a light emitting signal line of the pixel circuits being an effective level signal and an end time of a signal of a reset signal line of the pixel circuits being an effective level signal is greater than a sum of the threshold time and a duration of a signal of the scan signal line being an effective level signal.

In some possible implementations, a test circuit and a multiplexing circuit are further included; the pixel circuit further includes a data signal line extending in a second direction, a first direction intersects with the second direction, the first direction is an extension direction of the reset signal line, the scan signal line and the control signal line;

the data signal line is electrically connected with a first electrode of the writing transistor, the test circuit and the multiplexing circuit respectively; and the test circuit is located at a first side and a third side of a display area, and the multiplexing circuit is located at the first side and/or a second side of the display area.

In some possible implementations, when the reset signal lines of the pixel circuits of (K+1)-th row to N-th row are electrically connected to the scan drive circuit, the buffer drive circuit includes K cascaded buffer shift registers; the scan drive circuit includes N cascaded scan shift registers; the control drive circuit includes N/2 cascaded control shift registers, an output terminal of a buffer shift register of last stage is electrically connected with an input terminal of a scan shift register of first stage;

a buffer shift register of a-th stage is electrically connected with a reset signal line of a pixel circuit of a-th row, 1≤a≤K;

a scan shift register of b-th stage is electrically connected with a scan signal line of a pixel circuit of b-th row, 1≤b≤N;

a scan shift register of c-th stage is electrically connected with a reset signal line of a pixel circuit of (K+c)-th row, 1≤c≤N−K;

a control shift register of d-th stage is electrically connected to control signal lines of pixel circuits of (2d−1)-th row and 2d-th row respectively, 1≤d≤N/2.

In some possible implementations, scan shift registers of first stage to (N−K)-th stage include a first signal output line and a second signal output line connected to each other, wherein the second signal output line is located at a side of the first signal output line away from the base substrate;

a first signal output line of the scan shift register of the c-th stage is electrically connected with a scan signal line of a pixel circuit of the c-th row, and a second signal output line of the scan shift register of the c-th stage is electrically connected with a reset signal line of the pixel circuit of the (K+c)-th row;

wherein the first signal output line and the second signal output line are located between the scan drive circuit and the display area, and an extension direction of the first signal output line intersects with an extension direction of the second signal output line.

In some possible implementations, buffer shift registers of first stage to K-th stage include a third signal output line arranged in a same layer as the second signal output line, and a third signal output line of the buffer shift register of a-th stage is electrically connected with a reset signal line of a pixel circuit of a-th row;

scan shift registers of (N−K+1)-th stage to N-th stage include a fourth signal output line arranged in a same layer as the first signal output line; a fourth signal output line of a scan shift register of s-th stage is electrically connected with a scan signal line of a pixel circuit of s-th row, N−K+1≤s≤N; and the third signal output line and the fourth signal output line are located between the scan drive circuit and the display area.

In some possible implementations, the buffer drive circuit includes K/2 cascaded buffer shift registers when the reset signal lines of the pixel circuits of the (K+1)-th row to the N-th row are electrically connected to the control drive circuit; the scan drive circuit includes N cascaded scan shift registers; the control drive circuit includes N/2 cascaded control shift registers; an output terminal of a buffer shift register of last stage is electrically connected with an input terminal of a control shift register of first stage;

a buffer shift register of i-th stage is electrically connected to reset signal lines of pixel circuits of (2i−1)-th row and 2i-th row respectively, 1≤i≤K/2;

a scan shift register of b-th stage is electrically connected with a scan signal line of a pixel circuit of b-th row, 1≤b≤N;

a control shift register of m-th stage is electrically connected to control signal lines of pixel circuits of (2m−1)-th row and 2m-th row respectively, 1≤m≤N/2; and a control shift register of n-th stage is electrically connected to reset signal lines of pixel circuits of (K+2n−1)-th row and (K+2n)-th row respectively, 1≤n≤(N−K)/2.

In some possible implementations, control shift registers of first stage to (N−K)/2-th stage include a first signal output line and a second signal output line connected to each other, wherein the second signal output line is located at a side of the first signal output line away from the base substrate;

a first signal output line of a control shift register of n-th stage is electrically connected to control signal lines of pixel circuits of (2n−1)-th row and 2n-th row respectively, and a second signal output line of a control shift register of n-th stage is electrically connected to the reset signal lines of the pixel circuits of (K+2n−1)-th row and (K+2n)-th row, respectively;

wherein the first signal output line and the second signal output line are located between the control drive circuit and the display area, and an extension direction of the first signal output line intersects with an extension direction of the second signal output line.

In some possible implementations, the buffer shift registers of first stage to (K/2)-th stage include a third signal output line arranged in a same layer as the second signal output line, and a third signal output line of the buffer shift register of i-th stage is electrically connected with the reset signal lines of the pixel circuits of (2i−1)-th row and 2i-th row;

control shift registers of ((N−K)/2+1)-th stage to N/2-th stage include a fourth signal output line arranged in a same layer as the first signal output line; a fourth signal output line of a control shift register of t-th stage is electrically connected with control signal lines of pixel circuits of (2t−1)th row and 2t-th row respectively, (N−K)/2+1≤t≤N/2; and the third signal output line and the fourth signal output line are located between the control drive circuit and the display area.

In some possible implementations, the light emitting drive circuit includes light emitting shift registers of N/2 stages;

a light emitting shift register of d-th stage is electrically connected with light emitting signal lines of pixel circuits of (2d−1)-th row and 2d-th row respectively, 1≤d≤N/2.

In some possible implementations, a shape of a boundary of the display area includes rounded rectangle. The rounded rectangle includes four rounded corners and four bezel edges. The bezel area includes a first rounded corner area located outside a first rounded corner, a second rounded corner area located outside a second rounded corner, a third rounded corner area located outside a third rounded corner, a fourth rounded corner area located outside a fourth rounded corner, a first bezel area located outside a first bezel edge, a second bezel area located outside a second bezel edge, a third bezel area located outside a third bezel edge and a fourth bezel area located outside a fourth bezel edge;

the first bezel area, the first rounded corner area and the second rounded corner area are located at the first side of the display area; the second bezel area, the third rounded corner area and the fourth rounded corner area are located at the second side of the display area; the third bezel area is located at the third side of the display area; and the fourth bezel area is located at the second side of the display area;

the pixel circuits of the first row are close to the third bezel area, and the pixel circuits of the N-th row are close to the fourth bezel area;

the scan drive circuit is located in the first bezel area, the first rounded corner area and the second rounded corner area; the control drive circuit and the light emitting drive circuit are located in the second bezel area, the third rounded corner area and the fourth rounded corner area;

scan shift registers located in the first rounded corner area are arranged along the first rounded corner;

scan shift registers located in the second rounded corner area are arranged along the second rounded corner;

control shift registers located in the third rounded corner area are arranged along the third rounded corner; and control shift registers located in the fourth rounded corner area are arranged along the fourth rounded corner.

In some possible implementations, the buffer drive circuit is located in the third bezel area, and the cascaded buffer shift registers in the buffer drive circuit are arranged along the first direction.

In some possible implementations, the test circuit includes multiple sub-test circuits, a part of the sub-test circuits are located in the third bezel area and interspersed between buffer shift registers, and another part of the sub-test circuits are located in the first rounded corner area and interspersed between the scan shift registers located in the first rounded corner area; and the multiplexing circuit is interspersed between the scan shift registers located in the first bezel area and/or the control shift registers located in the second bezel area.

In some possible implementations, K is greater than or equal to 14 when the reset signal lines of the pixel circuits of (K+1)-th row to N-th row are electrically connected to the scan drive circuit;

K is greater than or equal to 7, when the reset signal lines of the pixel circuits of (K+1)-th row to N-th row are electrically connected to the control drive circuit.

In some possible implementations, a boundary of the display area includes a circle; the bezel area includes a first area to a fourth area, the first area and the second area are located between the third area and the fourth area, a center line of the display area extending along the first direction passes through the third area and the fourth area;

the first area and the second area are respectively located at two sides of the center line of the display area extending along the first direction;

the first area is located at the first side of the display substrate, the second area is located at the second side of the display area, the third area is located at the third side of the display area, and the fourth area is located at the fourth side of the display area;

the pixel circuits of the first row are close to the fourth area, and the pixel circuits of the N-th row are close to the third area;

the scan drive circuit is located in the first area, the control drive circuit and the light emitting drive circuit are located in the second area;

scan shift registers located in the first area are arranged along the circular boundary;

control shift registers located in the second area are arranged along the circular boundary; and light emitting shift registers located in the second area are arranged along the circular boundary.

In some possible implementations, the buffer drive circuit is located in the fourth area, and multiple cascaded buffer shift registers in the buffer drive circuit are arranged along the first direction.

In some possible implementations, the test circuit is located in the first area and the third area;

the multiplexing circuit is located in the first area and/or the second area and is interspersed between the scan shift registers and/or the control shift registers.

In some possible implementations, K is greater than or equal to 10 when the reset signal lines of the pixel circuits of (K+1)-th row to N-th row are electrically connected to the scan drive circuit; and K is greater than or equal to 5, when the reset signal lines of the pixel circuits of (K+1)-th row to N-th row are electrically connected to the control drive circuit.

In some possible implementations, when the reset signal lines of the pixel circuits of (K+1)-th row to N-th row are electrically connected with the scan drive circuit, the buffer shift register and the scan shift register have a same circuit structure including multiple scan transistors and multiple scan capacitors, wherein each scan capacitor includes a first plate and a second plate;

the display substrate further includes a scan initial signal line, a first scan clock signal line and a second scan clock signal line, a first scan power supply line and a second scan power supply line; a buffer shift register of first stage is electrically connected with the scan initial signal line, and the buffer drive circuit and the scan drive circuit are electrically connected with the first scan clock signal line, the second scan clock signal line, the first scan power supply line and the second scan power supply line respectively;

when the reset signal lines of the pixel circuits of (K+1)-th row to the N-th row are electrically connected with the control drive circuit, the buffer shift register and the control shift register have a same circuit structure including multiple control transistors and multiple control capacitors, wherein each control capacitor includes a first plate and a second plate;

the display substrate further includes a control initial signal line, a first control clock signal line and a second control clock signal line, a first control power supply line and a second control power supply line; a buffer shift register of first stage is electrically connected to the control initial signal line, and the buffer drive circuit and the control drive circuit are electrically connected to the first control clock signal line, the second control clock signal line, the first control power supply line and the second control power supply line respectively.

In some possible implementations, when the reset signal lines of the pixel circuits of (K+1)-th row to N-th row are electrically connected with the scan drive circuit, the circuit structure layer includes a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on the base substrate;

the semiconductor layer includes active layers of the multiple scan transistors;

the first conductive layer includes control electrodes of multiple scan transistors and first plates of multiple scan capacitors;

the second conductive layer includes second plates of multiple scan capacitors;

the third conductive layer includes first electrodes and second electrodes of multiple scan transistors, first signal output lines of scan shift registers of first stage to (N−K)-th stage and fourth signal output lines of scan shift registers of (N−K+1)-th stage to N-th stage; and the fourth conductive layer includes the scan initial signal line, the first scan clock signal line, the second scan clock signal line, the first scan power supply line, the second scan power supply line, second signal output lines of the scan shift registers of first stage to (N−K)-th stage and third signal output lines of buffer shift registers of first stage to K-th stage.

In some possible implementations, when the reset signal lines of the pixel circuits of (K+1)-th row to N-th row are electrically connected with the control drive circuit, the circuit structure layer includes a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on the base substrate;

the semiconductor layer includes active layers of the multiple control transistors;

the first conductive layer includes control electrodes of the multiple control transistors and first plates of the multiple control capacitors;

the second conductive layer includes second plates of the multiple control capacitors;

the third conductive layer includes first electrodes and second electrodes of the multiple control transistors, first signal output lines of control shift registers of first stage to (N−K)/2-th stage and fourth signal output lines of control shift registers of ((N−K)/2+1)-th stage to N-th stage; and the fourth conductive layer includes the control initial signal line, the first control clock signal line, the second control clock signal line, the first control power supply line, the second control power supply line, second signal output lines of the control shift registers of first stage to (N−K)/2-th stage and third signal output lines of buffer shift registers of first stage to K/2-th stage.

In a second aspect, the present disclosure further provides a display device, including the display substrate described above.

Other aspects may be understood upon reading and understanding of the drawings and the detailed description.

BRIEF DESCRIPTION OF DRAWINGS

Accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
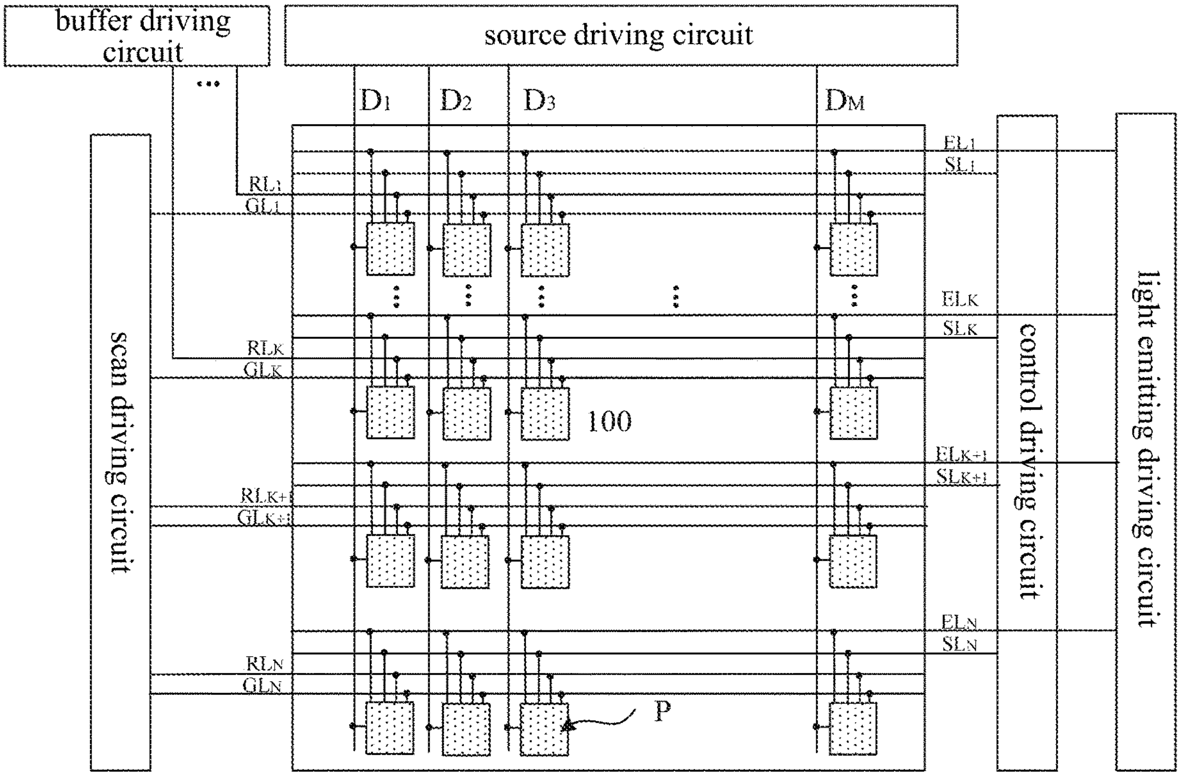
FIG. 1 is a first schematic structural diagram of a display substrate according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementation modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in an actual process, but are not limited thereto. For example, a width-length ratio of a channel, a thickness and spacing of each film layer, and a width and spacing of each signal line may be adjusted according to actual needs. The number of pixels in a display substrate and the number of sub-pixels in each pixel are not limited to the numbers shown in the drawings. The drawings described in the present disclosure are schematic structure diagrams only, and one implementation mode of the present disclosure is not limited to the shapes, numerical values or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, a detachable connection, or an integral connection. It may be a mechanical connection or an electrical connection. It may be a direct mutual connection, or an indirect connection through middleware, or an internal communication between two components. Those of ordinary skills in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 800 and below 100°, and thus also includes a state in which the angle is above 850 and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In this specification, "being disposed in a same layer" is referred to a structure formed by patterning two (or more than two) structures through a same patterning process, and their materials may be the same or different. For example, materials of precursors forming multiple structures arranged in a same layer are the same, and the resulting materials may be the same or different.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

Low Temperature Poly-Silicon (LTPS for short) technology is used in display substrates. The LTPS technology has advantages such as high resolution, a high response speed, high brightness, and a high aperture ratio. Although it is welcomed by the market, the LTPS technology also has some defects, such as a relatively high production cost and relatively large power consumption. In this case, a technology solution of Low Temperature Polycrystalline Oxide (LTPO for short) came into being. Compared with the LTPS technology, in the LTPO technology, a leakage current is smaller, pixel point response is faster, and an additional layer of oxide is added to a display substrate, which reduces energy consumption required for exciting pixel points, thus reducing power consumption during displaying of a screen. However, compared with the display products using the LTPS technology, the display products using the LTPO technology will cause afterimage due to biasing of a threshold voltage of the drive transistor in the pixel circuit, which reduces the display effect of the display products.

Figure 2:
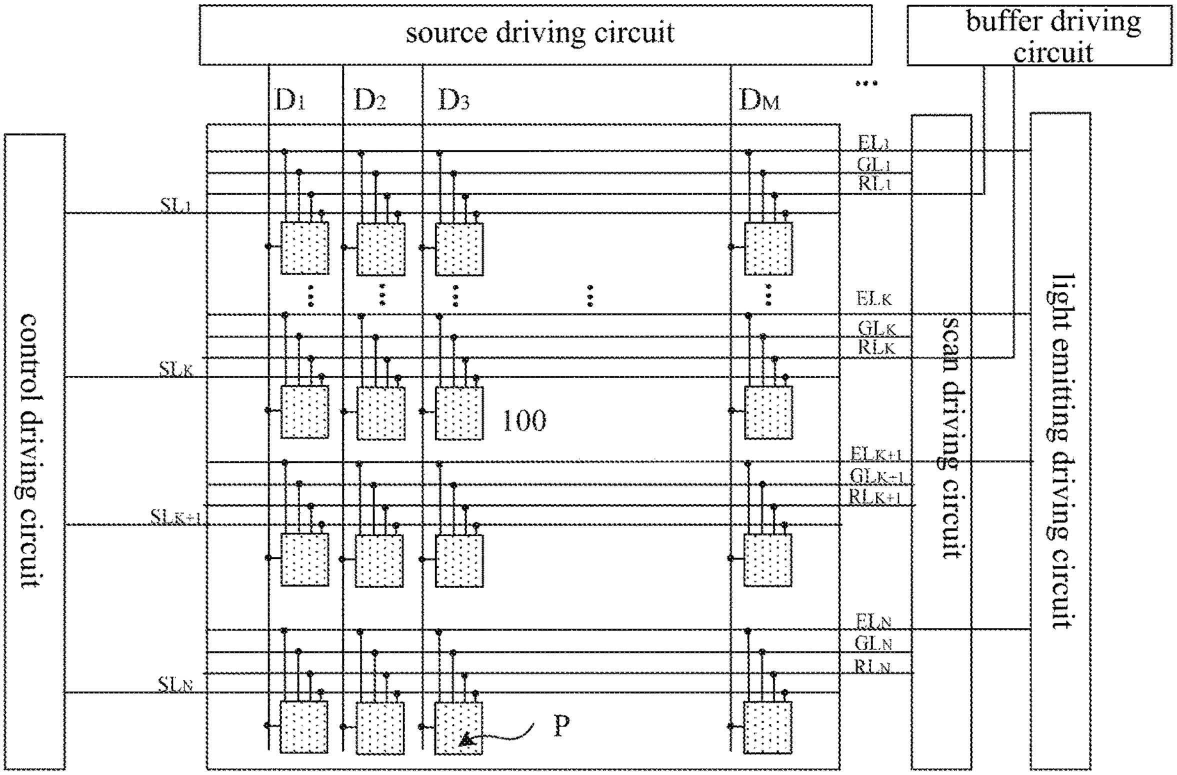
FIG. 2 is second a schematic structural diagram of a display substrate according to an embodiment of the present disclosure.

FIG. 1 is a first schematic structural diagram of a display substrate according to an embodiment of the present disclosure, and FIG. 2 is second a schematic structural diagram of a display substrate according to an embodiment of the present disclosure. As shown in FIGS. 1 and 2, the display substrate includes a base substrate and a circuit structure layer disposed on the base substrate. The circuit structure layer includes a pixel circuit P, a scan drive circuit, a control drive circuit, and a buffer drive circuit. The pixel circuit P includes a writing transistor, a node reset transistor, a reset signal line connected to a control electrode of the node reset transistor, a scan signal line connected to a control electrode of the writing transistor, and a control signal line. FIGS. 1 and 2 illustrates an example of a pixel circuit of N rows and M columns, where $RL_i$ refers to a reset signal line of a pixel circuit of i-th row, $GL_i$ refers to a scan signal line of the pixel circuit of i-th row, and $SL_i$ refers to a control signal line of the pixel circuit of i-th row.

In an exemplary embodiment, the display substrate includes: a display area 100 and a non-display area. The pixel circuit P is located in the display area 100, and the scan drive circuit, the control drive circuit, and the buffer drive circuit may be located in the display area 100 and/or the non-display area, which is not limited in the present disclosure. FIGS. 1 and 2 illustrate an example in which the scan drive circuit, the control drive circuit and the buffer drive circuit are located in the non-display area.

As shown in FIGS. 1 and 2, scan signal lines $GL_1$ to $GL_N$ of pixel circuits of first row to N-th row may be electrically connected to the scan drive circuit, and control signal lines $SL_1$ to $SL_N$ of the pixel circuits of first row to N-th row may be electrically connected to the control drive circuit, where N is the total number of rows of the pixel circuits.

As shown in FIGS. 1 and 2, reset signal lines $RL_1$ to $RL_K$ of the pixel circuits of first row to K-th row are electrically connected to the buffer drive circuit. Reset signal lines $RL_{K+1}$ to $RL_N$ of the pixel circuits of (K+1)-th row to N-th row are electrically connected to the scan drive circuit or the control drive circuit, wherein K is designed such that a difference between a start time of a signal of a scan signal line or a control signal line of a pixel circuit being an effective level signal and an end time of a signal of a reset signal line of the pixel circuit being an effective level signal is greater than a threshold time. FIG. 1 illustrates an example in which the reset signal lines $RL_{K+1}$ to $RL_N$ of the pixel circuits of (K+1)-th row to N-th row are electrically connected with the scan drive circuit, and FIG. 2 illustrates an example in which the reset signal lines $RL_{K+1}$ to $RL_N$ of the pixel circuits of (K+1)-th row to N-th row are electrically connected with the control drive circuit.

In the present disclosure, K is designed such that a difference between a start time of a signal of a scan signal line or a control signal line of a pixel circuit of x-th row being an effective level signal and an end time of a signal of a reset signal line of the pixel circuit of x-th row being an effective level signal is greater than or equal to a threshold time, where $1 \le x \le N$.

In an exemplary embodiment, the drive circuit further includes a drive transistor. The threshold time t is approximately equal to the driving time of at least two rows of pixel circuits, or equal to K*(1/f)/N, or equal to K*(1/f)/(N+N0), or equal to Tstress, where f is a refresh frequency of the display substrate, N is a total number of rows of the pixel circuit, NO is a sum of the number of blank rows executed by the display substrate before and/or after the operation of the N rows pixel circuit, NO is a positive integer greater than or equal to 0, and Tstress is a recovery time of a threshold voltage of the biased drive transistor.

K*(1/f)/N, or (1/f)/(N+N0) is the driving time of one row of pixel circuit. For example, when the display substrate includes 496 rows and 378 columns of pixel circuits, and has a refresh rate of 60 Hz, and the display substrate includes 24 blank rows before the operation of the pixel circuits and 20 blank rows after display, then (1/f)/(N+N0)=1/60/(496+44) =30.8 us. For example, when the display substrate includes 466 rows and 466 columns of pixel circuits, and has a refresh rate of 60 Hz, and includes 24 blank rows before display and 20 blank rows after display, then (1/f)/(N+N0)=1/60/(466+44)=32.7 us.

In an exemplary embodiment, the threshold time t is approximately equal to the driving time of at least two rows of pixel circuits. For example, the threshold time t is approximately equal to the driving time of at least 3~6 rows of pixel circuits.

In an exemplary embodiment, the threshold voltage of the drive transistor is generally biased by 0.3 volts.

In an exemplary embodiment, the recovery time of the threshold voltage of the biased drive transistor is about 250 microseconds to 300 microseconds.

In an exemplary embodiment, the display substrate may be a LTPO display substrate.

In an exemplary embodiment, the base substrate may be a rigid base substrate or a flexible base substrate. The rigid base substrate may be, but is not limited to, one or more of glass and metal foil, the flexible base substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the display substrate may further include: a light emitting structure layer located at a side of the circuit structure layer away from the base substrate. The light emitting structure layer includes light emitting elements arranged in an array in the display area. Each light emitting element includes a first electrode (anode), an organic light emitting layer and a second electrode (cathode). The anode is located at a side of the organic light emitting layer close to the base substrate and the cathode is located at a side of the organic light emitting layer away from the base substrate. The light emitting element is electrically connected with a pixel circuit.

In an exemplary embodiment, the circuit structure layer may further include a low level power supply line located in the non-display area, and the low level power supply line is electrically connected with the cathode of the light emitting element.

In an exemplary embodiment, the light emitting element may be an Organic Light Emitting Diode (OLED) or a Quantum dot Light Emitting Diode (QLED). Among them, the OLED may include a first electrode (anode), an organic emitting layer, and a second electrode (cathode) that are stacked.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary embodiment, hole injection layers of all sub pixels may be connected together to form a common layer, electron injection layers of all the sub pixels may be connected together to form a common layer, hole transport layers of all the sub pixels may be connected together to form a common layer, electron transport layers of all the sub pixels may be connected together to form a common layer, hole block layers of all the sub pixels may be connected together to form a common layer, emitting layers of adjacent sub pixels may be overlapped slightly, or may be isolated from each other, and electron block layers of adjacent sub pixels may be overlapped slightly, or may be isolated from each other.

In an exemplary embodiment, as shown in FIGS. 1 and 2, the display substrate may further include: a timing controller and a source drive circuit located in the non-display area. The timing controller and the source drive circuit may be located in the non-display area.

In an exemplary embodiment, the timing controller may provide the source drive circuit with a gray-scale value and a control signal suitable for specifications of the source drive circuit, provide the scan drive circuit with a clock signal, a scan start signal, and the like suitable for specifications of the scan drive circuit, provide the control drive circuit with a clock signal, a control start signal, and the like suitable for specifications of the control drive circuit, and provide the light emitting drive circuit with a clock signal, a light emitting stop signal, and etc. suitable for specifications of the light emitting drive circuit.

In an exemplary embodiment, the source drive circuit may generate a data voltage to be provided to a data signal line $D_1$, $D_2$, $D_3$ . . . and $D_M$ using the gray-scale value and the control signal received from the timing controller. For example, the source drive circuit may sample the gray-scale value using the clock signal, and apply the data voltage corresponding to the gray-scale value to the data signal line $D_1$ to $D_M$ by taking a sub-pixel row as a unit.

In an exemplary embodiment, the scan drive circuit may generate a scan signal that is to be provided to scan lines $GL_1$, $GL_2$, $GL_3$ . . . and $GL_M$ by receiving the clock signal, the scan start signal, and etc. from the timing controller. For example, the scan drive circuit may sequentially provide a scan signal with an on-level pulse to the scan signal lines $GL_1$ to $GL_M$. For example, the scan drive circuit may be constructed in a form of a shift register and may generate a scan signal by sequentially transmitting the scan start signal provided in a form of an on-level pulse to a next stage circuit under control of the clock signal.

In an exemplary embodiment, the control drive circuit may generate a control signal to be provided to control signal lines $SL_1$, $SL_2$, $Sl_3$ . . . and $SL_M$ by receiving the clock signal, the scan start signal, and the like from the timing controller. For example, the control drive circuit may sequentially provide control signals $Sl_1$ to $SL_M$ with on-level pulses to the control signal lines. For example, the control drive circuit may be constructed in a form of a shift register, and may generate a control signal by sequentially transmitting the control start signal provided in a form of an on-level pulse to a next stage circuit under control of the clock signal.

In an exemplary embodiment, the light emitting drive circuit may generate a light emitting signal that is to be provided to the light emitting signal lines $EL_1$, $EL_2$, $EL_3$ . . . and $EL_M$ by receiving the clock signal, the emission stopping signal and the like from the timing controller. For example, the light emitting drive circuit may sequentially provide an emission signal with an off-level pulse to the light emitting signal lines $EL_1$ to $EL_M$. For example, the light emitting drive circuit may be constructed in a form of a shift register and may generate a light emitting signal by sequentially transmitting the light emitting stop signal provided in a form of an off-level pulse to a next stage circuit under control of the clock signal.

The display substrate according to the embodiment of the present disclosure includes a base substrate and a circuit structure layer disposed on the base substrate. The circuit structure layer includes a pixel circuit, a scan drive circuit, a control drive circuit and a buffer drive circuit. The pixel circuit includes a writing transistor, a node reset transistor, a reset signal line connected to a control electrode of the node reset transistor, a scan signal line connected to a control electrode of the writing transistor, and a control signal line. Reset signal lines of pixel circuits of first row to K-th row are electrically connected with the buffer drive circuit, reset signal lines of pixel circuits of (K+1)-th row to N-th row are electrically connected with the scan drive circuit or the control drive circuit, such that a difference between a start time of a signal of a scan signal line or a control signal line of a pixel circuit being an effective level signal and an end time of a signal of a reset signal line of the pixel circuit being an effective level signal is greater than a threshold time. In the present disclosure, a difference between the time when the reset signal line of the pixel circuit is an effective level signal and the time when the scan signal line or the control signal line of the pixel circuit is an effective level signal can be lengthened by providing the buffer drive circuit, so that the control electrode of the drive transistor of the pixel circuit can be fully reset, and the threshold voltage can be restored from the biased state, thereby improving the after-image of the display substrate and enhancing the display effect of the display substrate.

As shown in FIGS. 1 and 2, a display substrate according to an exemplary embodiment may further include a light emitting drive circuit, and the pixel circuit further includes a light emitting transistor and a light emitting signal line. The light emitting signal line is electrically connected with a control electrode of the light emitting transistor. The light emitting drive circuit is located at a side of the control drive circuit away from the display area 100. The light emitting signal lines of the pixel circuits of first row to N-th row are electrically connected with the light emitting drive circuit. ELi in FIGS. 1 and 2 refers to a light emitting signal line of a pixel circuit of i-th row.

In an exemplary embodiment, for a same row of pixel circuits, a difference between a start time of a signal of the light emitting signal lines of the pixel circuits being an effective level signal and an end time of a signal of the reset signal lines being an effective level signal is greater than a sum of a threshold time and a duration of a signal of the reset signal lines being an effective level signal.

In an exemplary embodiment, for a same row of pixel circuits, the difference between the start time of the signal the light emitting signal lines of the pixel circuits being an effective level signal and the end time of the signal of the reset signal lines of the pixel circuits being an effective level signal is equal to the sum of the threshold time and the duration of the signal of the reset signal lines being an effective level signal.

As shown in FIGS. 1 and 2, a display substrate according to an exemplary embodiment may further include a test circuit and a multiplexing circuit (not shown in the figures). The pixel circuit further includes a data signal line D extending along a second direction, wherein a first direction intersects with the second direction, and the first direction is an extension direction of the reset signal line, the scan signal line, and the control signal line. Di in FIGS. 1 and 2 refers to a data signal line of a pixel circuit of i-th column. The data signal line is electrically connected to a first electrode of the writing transistor, the test circuit and the multiplexing circuit, respectively. The test circuit is located at a first side and a third side of the display area, and the multiplexing circuit is located at the first side and/or a second side of the display area.

In an exemplary embodiment, when a transistor type of the node reset transistor is the same as that of the writing transistor, the reset signal lines of the pixel circuits of (K+1)-th row to N-th row are electrically connected to the scan drive circuit. At this time, the pixel circuit may further include a compensation transistor and a compensation reset transistor. A transistor type of the compensation reset transistor is opposite to that of the drive transistor, the node reset transistor, the writing transistor and the compensation transistor. The scan signal line is also electrically connected to a control electrode of the compensation transistor, and the control signal line is electrically connected to a control electrode of the compensation reset transistor.

In an exemplary embodiment, the when the transistor type of the node reset transistor is opposite to that of the writing transistor, the reset signal lines of the pixel circuits of (K+1)-th row to N-th are electrically connected with the control drive circuit, and the pixel circuit further includes a compensation transistor. The transistor types of the node reset transistor and the compensation transistor are opposite to those of the drive transistor and the writing transistor. The control signal line is electrically connected with the control electrode of the compensation transistor.

Figure 3A:
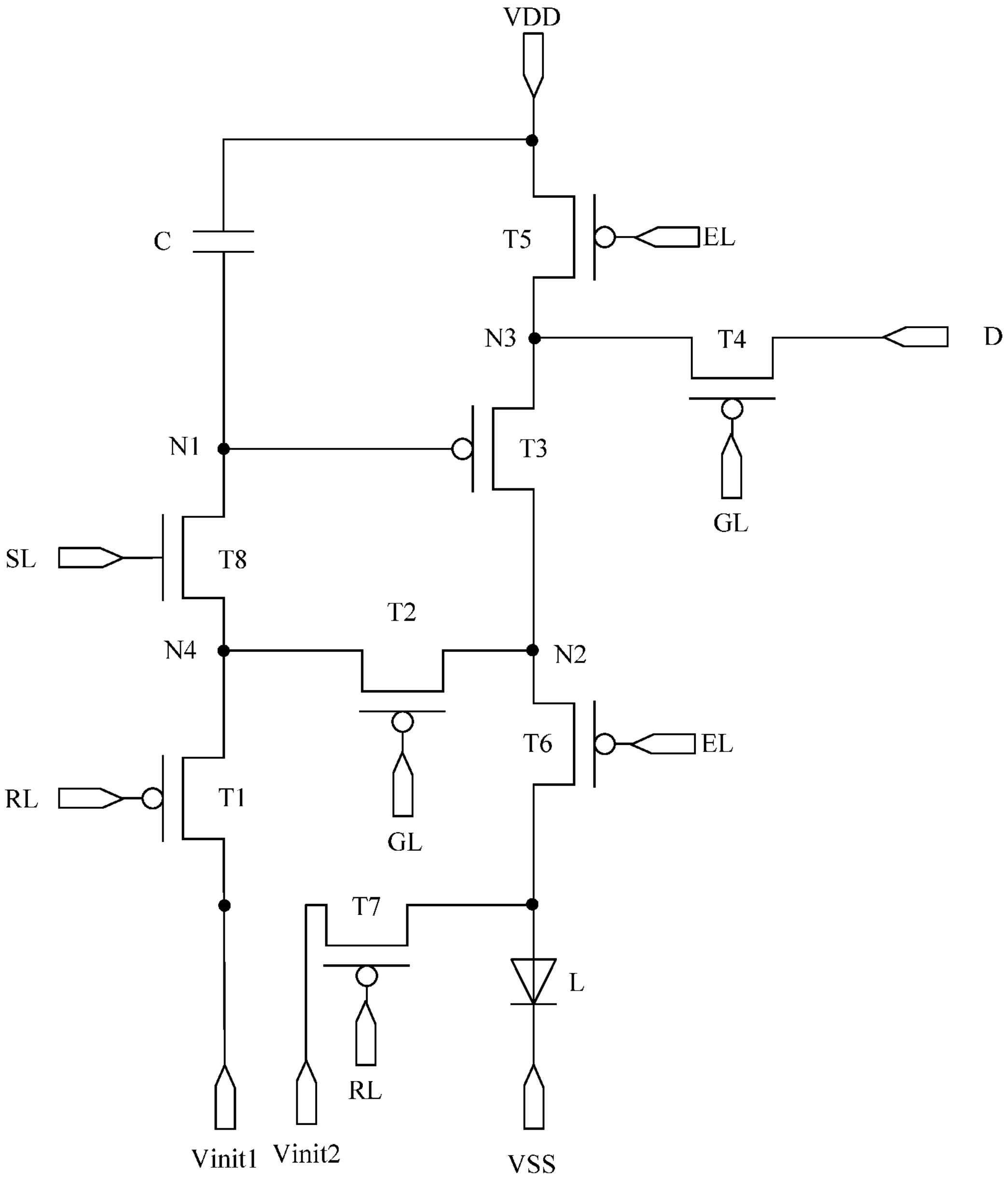
FIG. 3A is an equivalent circuit diagram of a pixel circuit.

In an exemplary embodiment, FIG. 3A is an equivalent circuit diagram of a pixel circuit. As shown in FIG. 3A, the pixel circuit may include eight transistors (a first transistor T1 to an eighth transistor T8), one capacitor C and eight signal lines (a data signal line D, a control signal line SL, a scan signal line GL, a reset signal line RL, a light emitting signal line EL, a first initial signal line Vinit1, a second initial signal line Vinit2, a first power supply line VDD, and a second power supply line VSS). FIG. 3A illustrates an example in which transistor types of the node reset transistor and the writing transistor are the same.

In an exemplary embodiment, a first plate of the capacitor C is connected with the first power supply line VDD, and a second plate of the capacitor C is connected with a first node N1. A control electrode of the first transistor T1 is connected with the reset control signal line RL, a first electrode of the first transistor T1 is connected with the first reset signal line Vinit1, and a second electrode of the first transistor T1 is connected with a fourth node N4. A control electrode of the second transistor T2 is connected with the scan signal line GL, a first electrode of the second transistor T2 is connected with the fourth node N4, and a second electrode of the second transistor T2 is connected with a second node N2. A control electrode of the third transistor T3 is connected with the first node N1, a first electrode of the third transistor T3 is connected with the second node N2, and a second electrode of the third transistor T3 is connected with a third node N3. A control electrode of the fourth transistor T4 is connected with the scan signal line GL, a first electrode of the fourth transistor T4 is connected with the data signal line D, and a second electrode of the fourth transistor T4 is connected with the third node N3. A control electrode of the fifth transistor T5 is connected with the light emitting signal line EL, a first electrode of the fifth transistor T5 is connected with the first power supply line VDD, and a second electrode of the fifth transistor T5 is connected with the third node N3. A control electrode of the sixth transistor T6 is connected with the light emitting signal line EL, a first electrode of the sixth transistor T6 is connected with the second node N2, and a second electrode of the sixth transistor T6 is connected with a first electrode of a light emitting element L. A control electrode of the seventh transistor T7 is connected with the reset signal line RL, a first electrode of the seventh transistor T7 is connected with the second initial signal line Vinit2, a second electrode of the seventh transistor T7 is connected with the first electrode of the light emitting element L, and a second electrode of the light emitting element L is connected with the second power supply line VSS. A control electrode of the eighth transistor T8 is connected with the control signal line SL, a first electrode of the eighth transistor T8 is connected with the first node N1, and a second electrode of the eighth transistor T8 is connected with the fourth node N4.

In an exemplary embodiment, the control electrode of the seventh transistor T7 may also be connected to the scan signal line GL, the first electrode of the seventh transistor T7 is connected to the second initial signal line Vinit2, the second electrode of the seventh transistor T7 is connected to the first electrode of the light emitting element L, and a second electrode of the light emitting element L is connected to the second power supply line VSS.

In an exemplary embodiment, the first transistor T1 may be referred to as a node reset transistor, and when an effective level signal is input to the reset signal line RL, the first transistor T1 transmits an initialization voltage to the first node N1 to initialize a charge amount of the first node N1.

In an exemplary embodiment, the eighth transistor T8 may be referred to as a compensation reset transistor, and when an effective level signal is input to the control signal line SL, the eighth transistor T8 transmits a signal of the fourth node N4 to the first node N1, not only a charge amount of the first node may be initialized, but also threshold compensation may be performed on the third transistor T3.

In an exemplary embodiment, the second transistor T2 may be referred to as a compensation transistor, and when an effective level signal is input to the scan signal line GL, the second transistor T2 writes a signal of the second node N2 to the fourth node N4.

In an exemplary embodiment, the third transistor T3 may be referred to as a drive transistor. The third transistor T3 determines a drive current flowing between the first power supply line VDD and the second power supply line VSS according to a potential difference between the control electrode and the first electrode of the third transistor T3.

In an exemplary embodiment, the fourth transistor T4 may be referred to as a writing transistor, and when an effective level signal is input to the scan signal line GL, the fourth transistor T4 enables a data voltage of the data signal line D to be input to the pixel circuit.

In an exemplary embodiment, the fifth transistor T5 and the sixth transistor T6 may be referred to as light emitting transistors. When an effective level signal is input to the light emitting signal line EL, the fifth transistor T5 and the sixth transistor T6 enable a light emitting element to emit light by forming a path of drive current between the first power supple line VDD and the second power supply line VSS.

In an exemplary embodiment, a signal of the first power supply line VDD is a high-level signal continuously provided, and a signal of the second power supply line VSS is a low-level signal.

In an exemplary embodiment, the eighth transistor T8 is a metal oxide transistor, and is an N-type transistor, and the first transistor T1 to the seventh transistor T7 are low-temperature poly-silicon transistors and are P-type transistors.

In an exemplary embodiment, the eighth transistor T8 is an oxide transistor and may reduce a leakage current, improve performance of the pixel circuit, and may reduce power consumption of the pixel circuit.

Figure 3B:
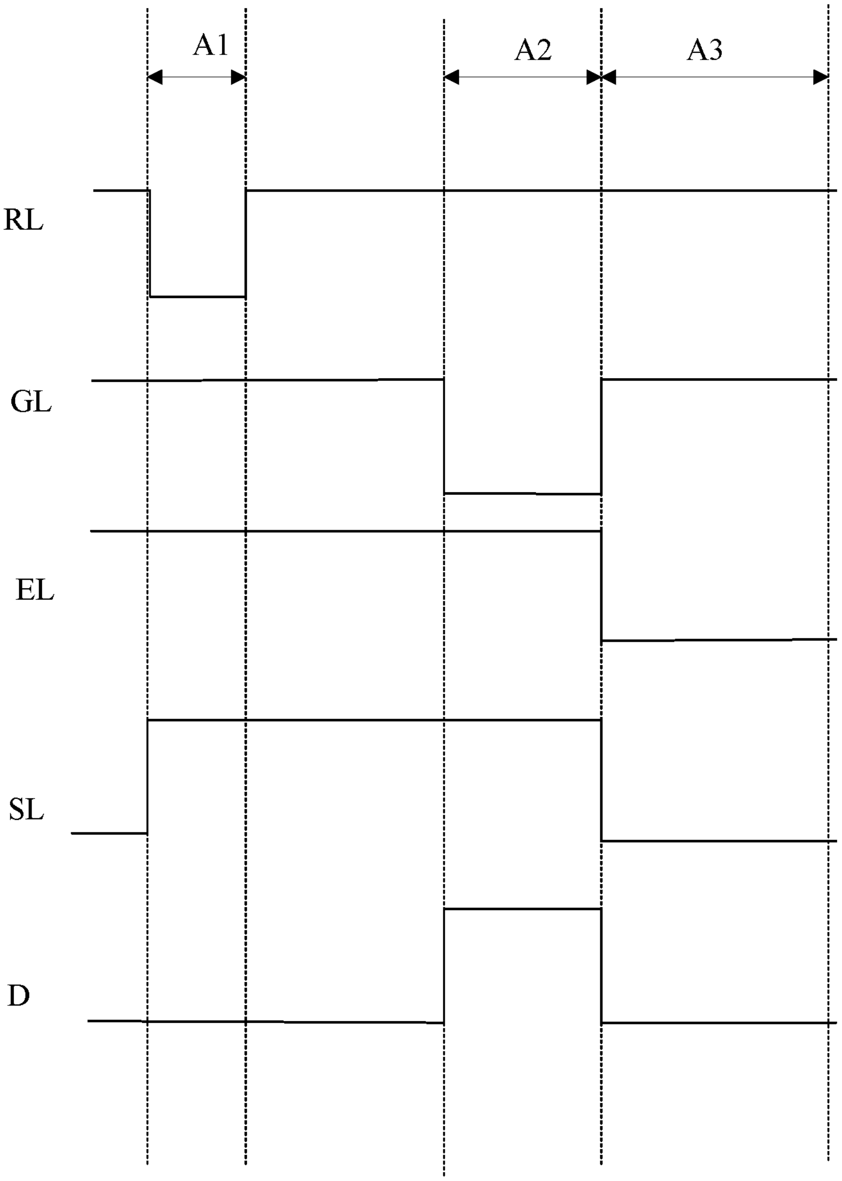
FIG. 3B is an operating timing diagram of the pixel circuit provided in FIG. 3A.

FIG. 3B is an operating timing diagram of the pixel circuit provided in FIG. 3A Exemplary embodiments of the present disclosure are described below with reference to an operating process of the pixel circuit illustrated in FIG. 3A. The operating process of the pixel circuit may include following stages.

In a first stage A1, referred to as a reset stage, signals of the control signal line SL, the light emitting signal line EL, and the scan signal line GL are all high-level signals, and a signal of the reset signal line RL is a low-level signal. The signal of the reset signal line RL is the low-level signal, the first transistor T1 is turned on, a signal of the first initial signal line Vinit1 is provided to the fourth node N4, the seventh transistor T7 is turned on, an initial voltage of the second initial signal line Vinit2 is provided to the first electrode of the light emitting element L, so that the first electrode of the light emitting element L is initialized (reset), for example, a pre-stored voltage inside the light emitting element L is cleared up, and initialization is completed to ensure that the light emitting element L does not emit light. The signal of the control signal line SL is a high level signal, the eighth transistor T8 is turned on, the signal of the fourth node N4 is provided to the first node N1 to initialize the capacitor C, and the original data voltage in the capacitor C is cleared. The signals of the scan signal line GL and the light emitting signal line EL are high-level signals, so that the second transistor T2, the fourth transistor T4, the fifth transistor T5, the sixth transistor T6 and the seventh transistor T7 are turned off, and the light emitting element L does not emit light in this stage.

In a second phase A2, which is referred to as a data writing phase or a threshold compensation phase, the signal of the scan signal line GL is a low-level signal, the signals of the reset signal line RL, the light emitting signal line EL and the control signal line SL are high-level signals, and the data signal line D outputs a data voltage. In this stage, since a signal of the first node N1 is a low-level signal, the third transistor T3 is turned on. The signal of the scan signal line GL is the low-level signal, so that the second transistor T2 and the fourth transistor T4 are turned on, the signal of the control signal line SL is a high-level signal, so that the eighth transistor T8 is turned on. The second transistor T2, the fourth transistor T4, and the eighth transistor T8 are turned on so that the data voltage output by the data signal line D is provided to the first node N1 through the third node N3, the turned-on third transistor T3, the second node N2, the turned-on second transistor T2, the fourth node N4, and the turned-on eighth transistor T8. A difference between the data voltage output by the data signal line D and a threshold voltage of the third transistor T3 is charged into the capacitor C until a voltage of the first node N1 is Vd−|Vth|, wherein Vd is the data voltage output by the data signal line D, and Vth is the threshold voltage of the third transistor T3. The signal of the reset signal line RL is the low-level signal, so that the first transistor T1 and the seventh transistor T7 are turned off. The signal of the light emitting signal line EL is the high-level signal, so that the fifth transistor T5 and the sixth transistor T6 are turned off.

In a third phase A3, which is referred to as a light emitting phase, the signals of the control signal line SL and the light emitting signal line EL are both low-level signals, and the signals of the scan signal line GL and the reset signal line RL are high-level signals. The signal of the reset signal line RL is the low-level signal, so that the first transistor T1 and the seventh transistor T7 are turned off. The signal of the control signal line SL is the low-level signal, the signals of the scan signal line GL and the reset signal line RL are high-level signals, so that the second transistor T2, the fourth transistor T4 and the eighth transistor T8 are turned off. The signal of the light emitting signal line EL is the low-level signal, so that the fifth transistor T5 and the sixth transistor T6 are turned on, and a power supply voltage output by the first power supply line VDD provides a drive voltage to the first electrode of the light emitting element L through the turned-on fifth transistor T5, the third transistor T3, and the sixth transistor T6 to drive the light emitting element L to emit light.

In a drive process of the pixel circuit, a drive current flowing through the third transistor T3 (drive transistor) is determined by a voltage difference between the control electrode and the first electrode of the third transistor T3. Since the voltage of the first node N1 is Vd−|Vth|, the drive current of the third transistor T3 is as follows:

$$I = K*(Vgs - Vth)^2 = K*[(Vdd - Vd + |Vth|) - Vth]^2 = K*[(Vdd - Vd]^2$$

wherein I is the drive current flowing through the third transistor T3, that is, the drive current for driving the light emitting element, K is a constant, Vgs is the voltage difference between the control electrode and the first electrode of the third transistor T3, Vth is the threshold voltage of the third transistor T3, Vd is the data voltage output by the data signal line D, and Vdd is the power supply voltage output by the first power supply line VDD.

Figure 4A:
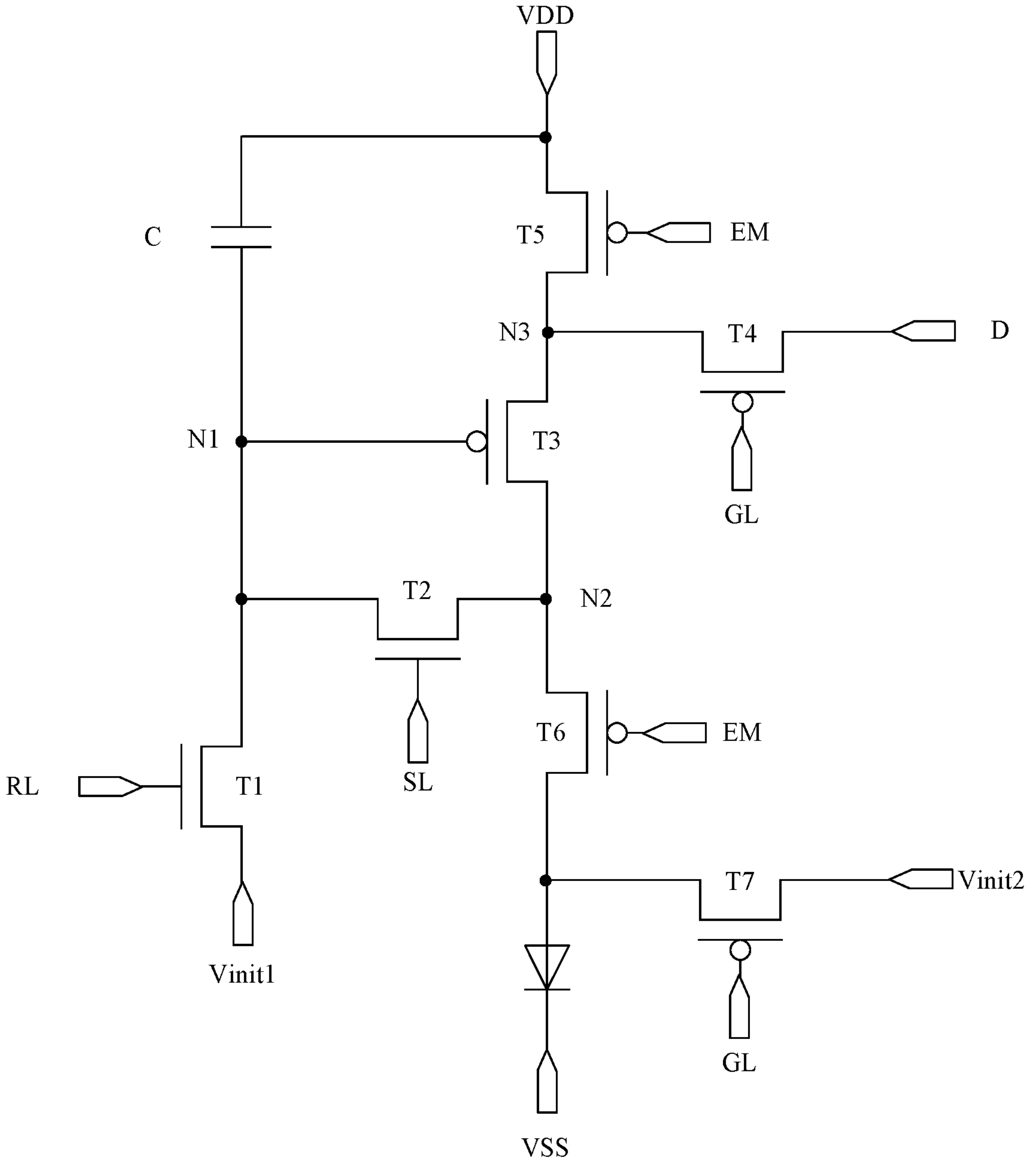
FIG. 4A is an equivalent circuit diagram of another pixel circuit.

In an exemplary embodiment, FIG. 4A is an equivalent circuit diagram of another pixel circuit. As shown in FIG. 4A, the pixel circuit may include seven transistors (a first transistor T1 to a seventh transistor T7), one capacitor C and nine signal lines (a data signal line D, a control signal line SL, a scan signal line GL, a reset signal line RL, a light emitting signal line EL, a first initial signal line Vinit1, a second initial signal line Vinit2, a first power supply line VDD, and a second power supply line VSS). FIG. 4A illustrates an example in which a transistor type of the node reset transistor is opposite to that of the writing transistor.

As shown in FIG. 4A, a first plate of the capacitor C is connected with the first power supply line VDD, and a second plate of the capacitor C is connected with a first node N1. A control electrode of the first transistor T1 is connected with the reset signal line RL, a first electrode of the first transistor T1 is connected with the first initial signal line Vinit1, and a second electrode of the first transistor is connected with a first node N1. A control electrode of the second transistor T2 is connected with the control signal line SL, a first electrode of the second transistor T2 is connected with the first node N1, and a second electrode of the second transistor T2 is connected with a second node N2. A control electrode of the third transistor T3 is connected with the first node N1, a first electrode of the third transistor T3 is connected with the second node N2, and a second electrode of the third transistor T3 is connected with a third node N3. A control electrode of the fourth transistor T4 is connected with the scan signal line GL, a first electrode of the fourth transistor T4 is connected with the data signal line D, and a second electrode of the fourth transistor T4 is connected with the third node N3. A control electrode of the fifth transistor T5 is connected with a light emitting signal line EL, a first electrode of the fifth transistor T5 is connected with a first power supply line VDD, and a second electrode of the fifth transistor T5 is connected with the third node N3. A control electrode of the sixth transistor T6 is connected with the light emitting signal line EL, a first electrode of the sixth transistor T6 is connected with the second node N2, and a second electrode of the sixth transistor T6 is connected with the first electrode of the light emitting element. A control electrode of the seventh transistor T7 is connected with the scan signal line GL, a first electrode of the seventh transistor T7 is connected with the second initial signal line Vinit2, a second electrode of the seventh transistor T7 is connected with a first electrode of a light emitting element, and a second electrode of the light emitting element L is connected with the second power supply line VSS.

In an exemplary embodiment, the first transistor T1 may be referred to as a node reset transistor, and when an effective level signal is input to the reset signal line RL, the first transistor T1 transmits an initialization voltage to the first node N1 to initialize a charge amount of the first node N1.

In an exemplary embodiment, the second transistor T2 may be referred to as a compensation transistor, and when an effective level signal is input to the control signal line SL, the second transistor T2 transmits a signal of the second node N2 to the first node N1 to compensate a signal of the first node N1.

In an exemplary embodiment, the third transistor T3 may be referred to as a drive transistor. The third transistor T3 determines a drive current flowing between the first power supply line VDD and the second power supply line VSS according to a potential difference between the control electrode and the first electrode of the third transistor T3.

In an exemplary embodiment, the fourth transistor T4 may be referred to as a writing transistor, and when an effective level signal is input to the control signal terminal Si, the fourth transistor T4 enables a data voltage of the data signal line D to be input to the third node N3.

In an exemplary embodiment, the fifth transistor T5 and the sixth transistor T6 may be referred to as light emitting control transistors. When an effective level signal is input to the light emitting signal line EL, the fifth transistor T5 and the sixth transistor T6 enable the light emitting element to emit light by forming a path of drive current between the first power supply line VDD and the second power supply line VSS.

In an exemplary embodiment, a signal of the first power supply line VDD is a high-level signal continuously provided, and a signal of the second power supply line VSS is a low-level signal.

In an exemplary embodiment, the first transistor T1 and the second transistor T2 are metal oxide transistors, and are N-type transistors, and the third transistor T3 to the seventh transistor T7 are low-temperature poly-silicon transistors and are P-type transistors.

In an exemplary embodiment, the first transistor T1 and the second transistor T2 are oxide transistors, which may reduce a leakage current, improve performance of the pixel circuit, and may reduce power consumption of the pixel circuit.

Figure 4B:
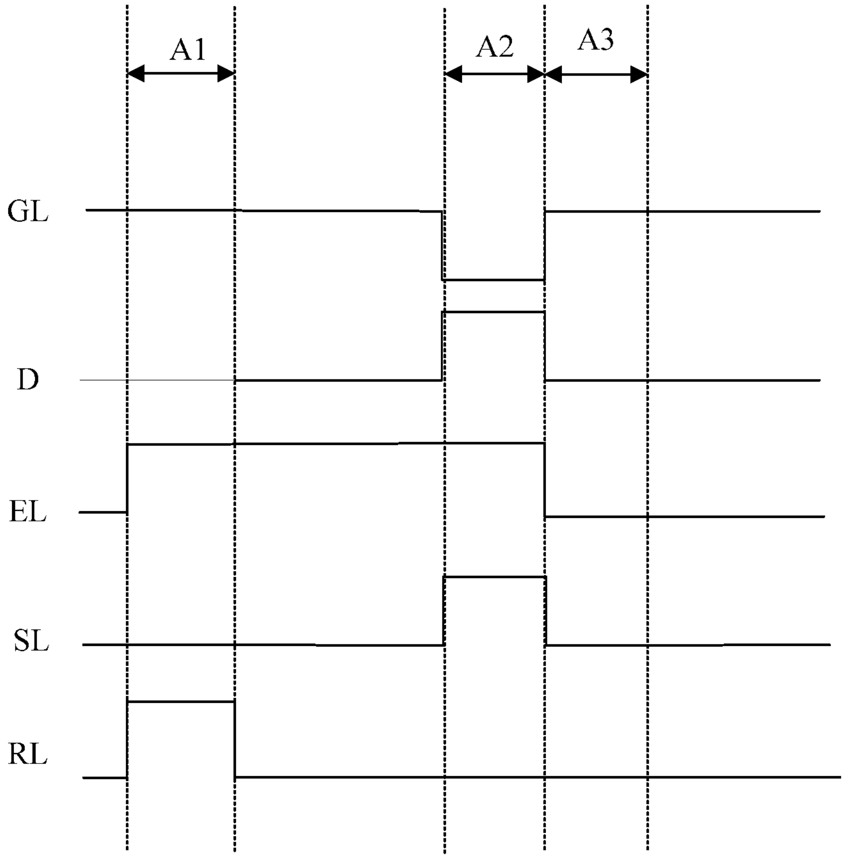
FIG. 4B is an operating timing diagram of the pixel circuit provided in FIG. 4A.

FIG. 4B is an operating timing diagram of the pixel circuit provided in FIG. 4A Exemplary embodiments of the present disclosure are described below with reference to an operating process of the pixel circuit illustrated in FIG. 4B. In an exemplary embodiment, the operating process of the pixel circuit may include following stages.

In a first stage A1, which is referred to as a reset stage, signals of the reset signal line RL, the scan signal line GL, and the light emitting signal line EL are all high-level signals, and a signal of the control signal line SL is a low-level signal. The signal of the reset signal line RL is a high level signal, so that the first transistor T1 is turned on, a signal of the first initial signal line Vinit1 is provided to the first node N1 to initialize the capacitor C, and an original data voltage in the capacitor C is cleared. The signals of the first scan signal line GL and the light emitting signal line EL are the high-level signals, the signal of the control signal line SL is the low-level signal, so that the second transistor T2, the fourth transistor T4, the fifth transistor T5, the sixth transistor T6, and the seventh transistor T7 are turned off. In this stage, the light emitting element does not emit light.

In a second phase A2, which is referred to as a data writing phase or a threshold compensation phase, the signals of the scan signal line GL and the reset signal line are low-level signals, the signals of the light emitting signal line EL and the control signal line SL are high-level signals, and the data signal line D outputs a data voltage. In this stage, since a signal of the first node N1 is a low-level signal, the third transistor T3 is turned on. The signal of the scan signal line GL is the low level signal, so that the fourth transistor T4 and the seventh transistor T7 are turned on, the signal of the control signal line SL is the high level signal, so that the second transistor T2 is turned on. The second transistor T2 and the fourth transistor T4 are turned on, so that the data voltage output by the data signal line D is provided to the first node N1 through the third node N3, the turned-on third transistor T3, the second node N2, and the turned-on second transistor T2, and the capacitor C is charged with a difference between the data voltage output by the data signal line D and a threshold voltage of the third transistor T3 until a voltage of the first node N1 is $Vd-|Vth|$, where Vd is the data voltage output by the data signal line D, and Vth is the threshold voltage of the third transistor T3. The seventh transistor T7 is turned on, so that the initial voltage of the second initial signal line Vinit2 is provided to the first electrode of the light emitting element L to initialize (reset) the first electrode of the light emitting element L and clear a pre-stored voltage of the light emitting element to complete initialization to ensure that the light emitting element does not emit light. The signal of the reset signal line RL is a low-level signal such that the first transistor T1 is turned off. The signal of the light emitting signal line EL is the high-level signal, so that the fifth transistor T5 and the sixth transistor T6 are turned off.

In a third stage A3, which is referred to as a light emitting stage, the signal of the scan signal line GL is a high-level signal, and the signals of the control signal line SL, the light emitting signal line EL and the reset signal line RL are low-level signals. The signal of the light emitting signal line EL is the low-level signal, so that the fifth transistor T5 and the sixth transistor T6 are turned on, and a power supply voltage output by the first power supply line VDD provides a drive voltage to the first electrode of the light emitting element L through the turned-on fifth transistor T5, the third transistor T3, and the sixth transistor T6 to drive the light emitting element L to emit light.

In a drive process of the pixel circuit, a drive current flowing through the third transistor T3 (drive transistor) is determined by a voltage difference between a control electrode and a first electrode of the third transistor T3. Since the voltage of the first node N1 is $Vd-|Vth|$, the drive current of the third transistor T3 is as follows:

$$I = K*(Vgs - Vth)^2 = K*[(Vdd - Vd + |Vth|) - Vth]^2 = K*[(Vdd - Vd]^2$$

wherein I is the drive current flowing through the third transistor T3, i.e., a drive current for driving the OLED, K is a constant, Vgs is the voltage difference between the gate electrode and the first electrode of the third transistor T3, Vth is the threshold voltage of the third transistor T3, Vd is the data voltage output by the data signal line D, and Vdd is the power voltage output by the first power supply line VDD.

In an exemplary embodiment, the non-display area may include a bezel area surrounding a periphery of the display area and a bonding area located at a side of the bezel area away from the display area.

When the scan drive circuit, the control drive circuit and the buffer drive circuit are located in the non-display area, as shown in FIGS. 1 and 2, the scan drive circuit and the control drive circuit may be located at a first side and a second side of the display area which are opposite to each other, and the buffer drive circuit may be located at a third side or a fourth side of the display area. The third side is located at a side of the display area away from the bonding area, and the fourth side is located at a side of the display area close to the bonding area.

Figure 5:
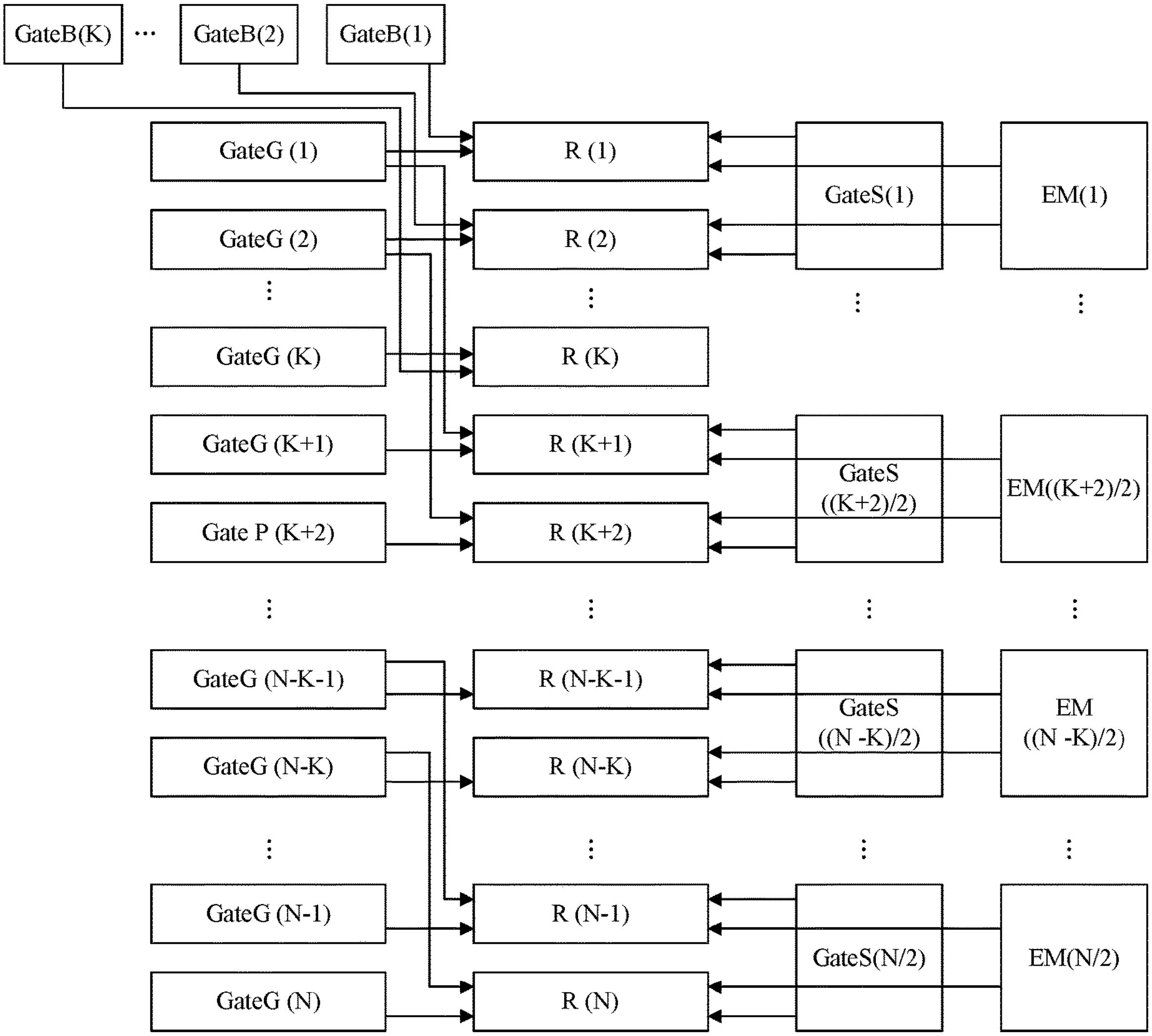
FIG. 5 is a schematic cascaded diagram of multiple drive circuits of a display substrate.

FIG. 5 is a schematic cascaded diagram of multiple drive circuits of a display substrate. With reference to FIGS. 1 and 5, when reset signal lines of pixel circuits of (K+1)-th row to N-th row are electrically connected to the scan drive circuit, the buffer drive circuit includes K cascaded buffer shift registers GateB (1) to GateB (K), the scan drive circuit includes N cascaded scan shift registers GateG (1) to GateG (N), the control drive circuit includes N/2 cascaded control shift registers GateS (1) to GateS (N/2), and an output terminal of a buffer shift register GateB (K) of last stage is electrically connected with an input terminal of a scan shift register GateG (1) of first stage. R (i) in FIG. 5 refers to a pixel circuit of i-th row.

As shown in FIG. 1 and FIG. 5, a buffer shift register of a-th stage is electrically connected with a reset signal line of a pixel circuit of a-th row, where 1≤a≤K.

As shown in FIG. 1 and FIG. 5, a scan shift register of b-th stage is electrically connected (b) with a scan signal line of a pixel circuit of b-th row, where 1≤b≤N.

As shown in FIG. 1 and FIG. 5, a scan shift register of c-th stage is electrically connected (c) with a reset signal line of a pixel circuit of (K+c)-th row, 1≤c≤N−K.

As shown in FIG. 1 and FIG. 5, a control shift register GateS(d) of d-th stage is electrically connected with control signal lines of a pixel circuit of (2d−1)-th row and a pixel circuit of 2d-th row respectively, where 1≤d≤N/2.

Figure 6:
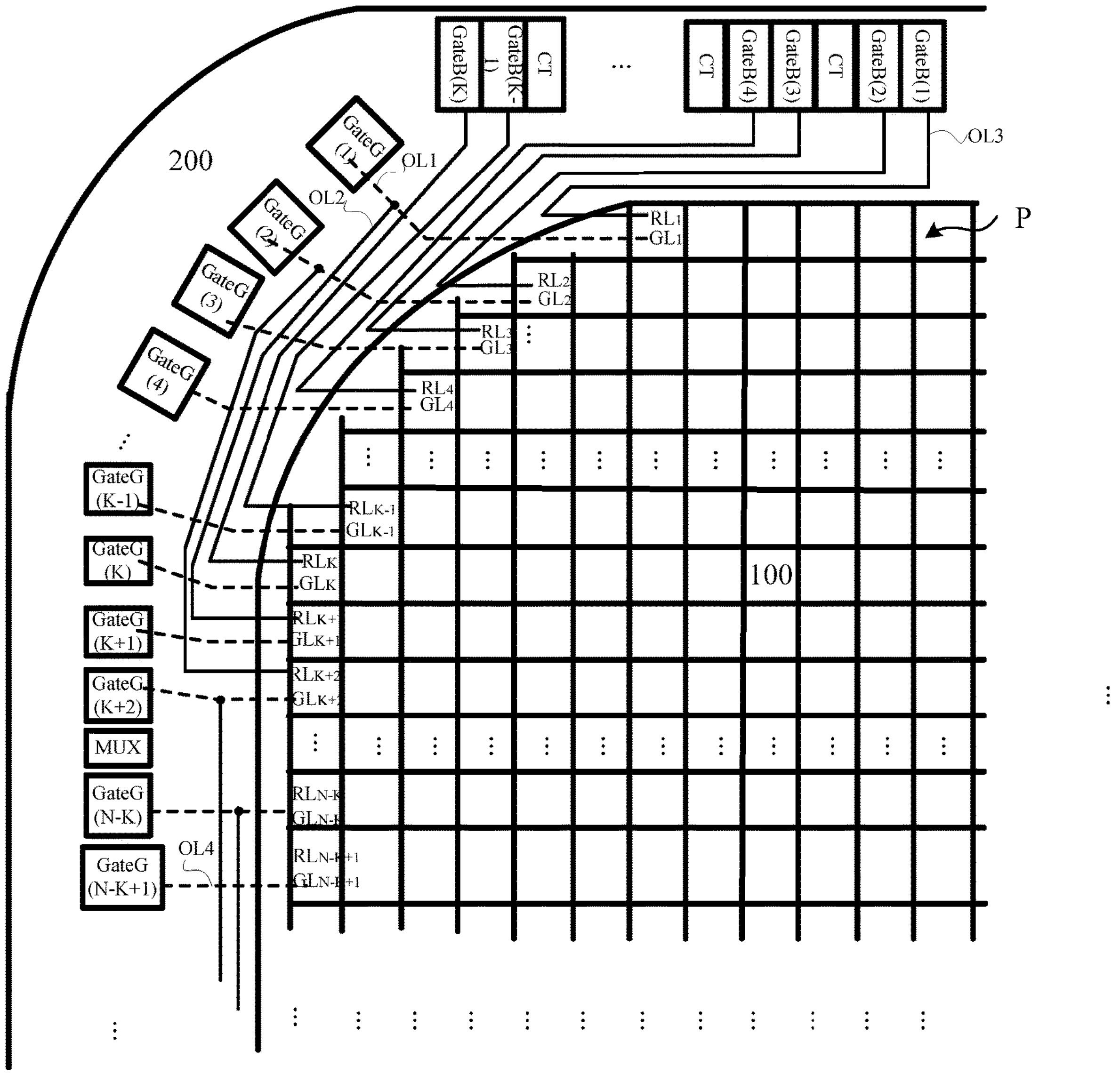
FIG. 6 is a schematic diagram of a connection between a drive circuit and a pixel circuit in a display substrate.

FIG. 6 is a schematic diagram of a connection between a drive circuit and a pixel circuit in a display substrate. As shown in FIG. 6, the scan shift registers GateG (1) to GateG (N−K) of first stage to (N−K)-th stage include a first signal output line OL1 and a second signal output line OL2 connected to each other, wherein the second signal output line OL2 is located at a side of the first signal output line OL1 away from the base substrate. A first signal output line of the scan shift register of c-th stage is electrically connected with a scan signal line GL(c) of a pixel circuit of c-th row, and a second signal output line of the scan shift register of c-th stage is electrically connected with a reset signal line RL(K+c) of the pixel circuit of (K+c)-th row.

In an exemplary embodiment, as shown in FIG. 6, the first signal output line OL1 and the second signal output line OL2 are located between the scan drive circuit and the display area, and an extension direction of the first signal output line OL1 intersects with an extension direction of the second signal output line OL2.

As shown in FIG. 6, the buffer shift registers GateB (1) to GateB (K) of first stage to K-th stage include a third signal output line OL3 arranged in a same layer as the second signal output line OL2, and a third signal output line of a buffer shift register GateB (a) of a-th stage is electrically connected to a reset signal line RL (a) of the pixel circuit of a-th row.

In an exemplary embodiment, as shown in FIG. 6, the scan shift register GateG (N−K+1) to GateG (N) s of (N−K+1)-th stage to N-th stage include: a fourth signal output line OL4 arranged in a same layer as the first signal output line OL1. A fourth signal output line of a scan shift register GateS (s) of s-th stage is electrically connected to a scan signal line GL (s) of the pixel circuit of s-th row, where N−K+1≤s≤N.

In an exemplary embodiment, as shown in FIG. 6, the third signal output line OL3 and the fourth signal output line OL4 are located between the scan drive circuit and the display area.

Figure 7:
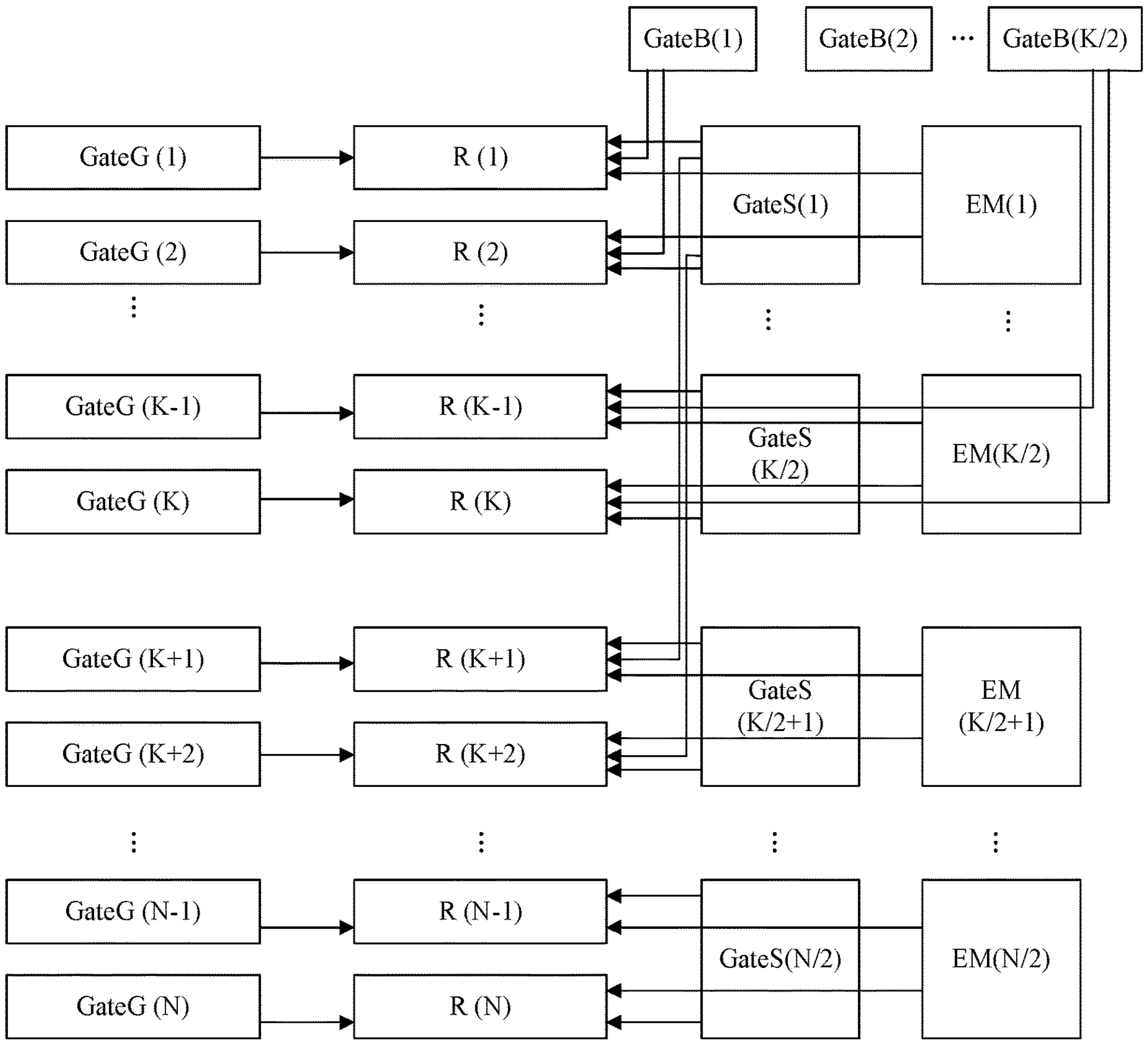
FIG. 7 is a schematic cascaded diagram of multiple drive circuits of another display substrate.

FIG. 7 is a schematic cascaded diagram of multiple drive circuits of another display substrate. As shown in FIGS. 2 and 7, when reset signal lines of pixel circuits of (K+1) row to N-th row are electrically connected to the control drive circuit, the buffer drive circuit includes K/2 cascaded buffer shift registers GateB (1) to GateB (K/2), the scan drive circuit includes N cascaded scan shift registers GateG (1) to GateG (N), the control drive circuit includes N/2 cascaded control shift registers GateS (1) to GateS (N/2), and an output terminal of a buffer shift register GateB (K/2) of last stage is electrically connected with an input terminal of a control shift register GateS (1) of first stage.

As shown in FIG. 2 and FIG. 7, a buffer shift register GateB(i) of i-th stage is electrically connected to reset signal lines of a pixel circuit of (2i−1)-th row and a pixel circuit of 2i-th row respectively, where 1≤i≤K/2.

As shown in FIG. 2 and FIG. 7, a scan shift register GateG(b) of b-th stage is electrically connected (b) with a scan signal line of a pixel circuit of b-th row, where 1≤b≤N.

As shown in FIG. 2 and FIG. 7, a control shift register GateS(m) of m-th stage is electrically connected with control signal lines of a pixel circuit of (2m−1)th row and a pixel circuit of 2m-th row respectively, where 1≤d≤N/2.

As shown in FIG. 2 and FIG. 7, a control shift register GateS(n) of n-th stage is electrically connected to reset signal lines of a pixel circuit of (K+2n−1)-th row and a pixel circuit of (K+2n)-th row respectively, where 1≤n≤(N−K)/2.

In an exemplary embodiment, the control shift registers of first stage to (N−K)/2-th stage include a first signal output line and a second signal output line connected to each other, wherein the second signal output line is located at a side of the first signal output line away from the base substrate. A first signal output line of a control shift register of n-th stage is electrically connected to control signal lines of a pixel circuit of (2n−1)-th row and a pixel circuit of 2n-th row respectively, and a second signal output line of the control shift register of n-th stage is electrically connected to reset signal lines of the pixel circuit of (K+2n−1)-th row and the pixel circuit of (K+2n)-th row respectively.

In an exemplary embodiment, the first signal output line and the second signal output line are located between the control drive circuit and the display area, and an extension direction of the first signal output line intersects with an extension direction of the second signal output line.

In an exemplary embodiment, buffer shift registers of first stage to (K/2)-th stage include a third signal output line arranged in a same layer as the second signal output line, and a third signal output line of a buffer shift register of i-th stage is electrically connected with reset signal lines of the pixel circuit of (2i−1)-th row and the pixel circuit of 2i-th row.

In an exemplary embodiment, control shift registers ((N−K)/2+1)-th stage to N-th stage of include a fourth signal output line arranged in a same layer as the first signal output line. A fourth signal output line of a control shift register of t-th stage is electrically connected with control signal lines of a pixel circuit of (2t−1)-th row and a pixel circuit of 2t-th row respectively, where $(N-K)/2+1 \le t \le N$.

In an exemplary embodiment, the third signal output line and the fourth signal output line are located between the control drive circuit and the display area.

As shown in FIGS. 5 and 7, the light emitting drive circuit may include: light emitting shift registers EM (1) to EM (N/2) of N/2 stages. A light emitting shift register of d-th stage is electrically connected with light emitting signal lines of a pixel circuit of (2d−1)-th row and a pixel circuit of 2d-th row respectively, where $1 \le d \le N/2$.

Figure 8:
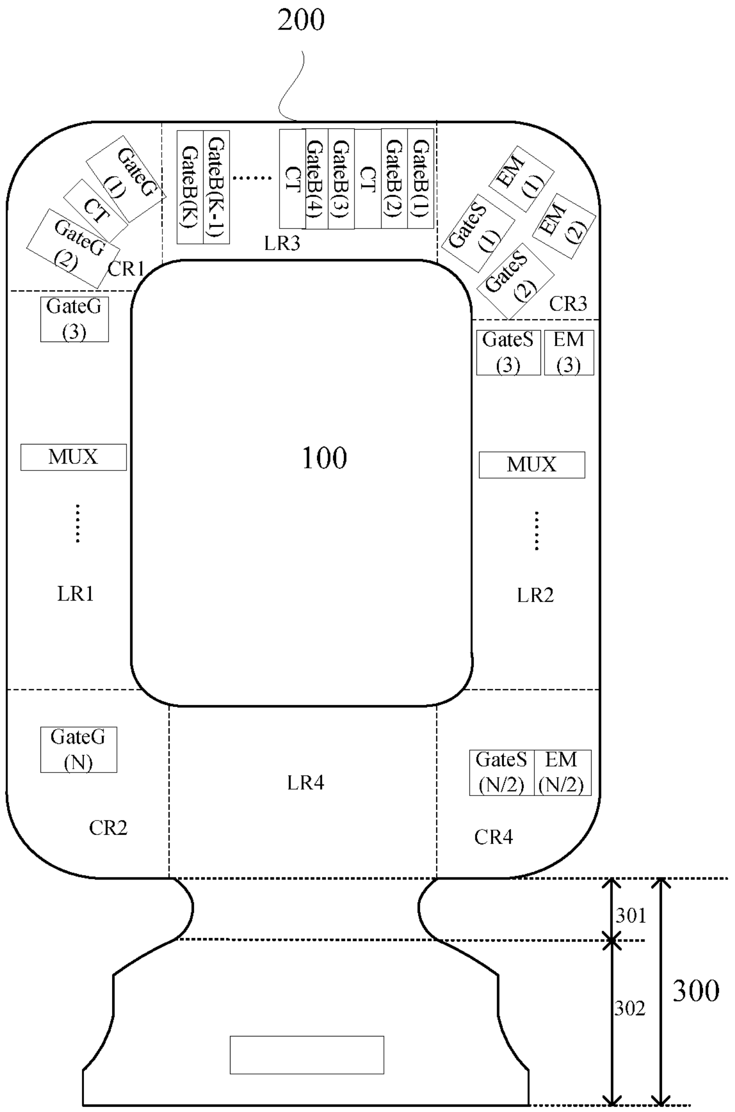
FIG. 8 is schematic diagram of an arrangement of multiple drive circuits of a display substrate.

FIG. 8 is a schematic diagram of an arrangement of multiple drive circuits of a display substrate. As shown in FIG. 8, a shape of a boundary of the display area 100 includes rounded rectangle. The rounded rectangle includes four rounded corners and four bezel edges. The bezel area 200 includes a first rounded corner area CR1 located outside a first rounded corner, a second rounded corner area CR2 located outside a second rounded corner, a third rounded corner area CR3 located outside a third rounded corner, a fourth rounded corner area CR4 located outside a fourth rounded corner, a first bezel area LR1 located outside a first bezel edge, a second bezel area LR2 located outside a second bezel edge, a third bezel area LR3 located outside a third bezel edge and a fourth bezel area LR4 located outside a fourth bezel edge. The first bezel area LR1, the first rounded corner area CR1 and the second rounded corner area CR2 are located at a first side of the display area 100, the second bezel area LR2, the third rounded corner area CR3 and the fourth rounded corner area CR4 are located at a second side of the display area 100, the third bezel area LR3 is located at a third side of the display area 100, and the fourth bezel area LR4 is located at the second side of the display area 100.

In an exemplary embodiment, the pixel circuits of first row are close to the third bezel area LR3, and the pixel circuits of N-th row are close to the fourth bezel area LR4.

In an exemplary embodiment, widths of the first rounded corner area to a fourth rounded corner area may be about 1300 microns to 1400 microns. Exemplarily, the widths of the first rounded corner area to the fourth rounded corner area may be about 1345 microns.

In an exemplary embodiment, as shown in FIG. 8, the scan drive circuit including multiple cascaded scan shift registers GateG (1) to GateG (N) is located in the first bezel area LR1, the first rounded corner area CR1 and the second rounded corner area CR2. The control drive circuit including multiple cascaded control shift registers GateS (1) to GateS (N/2) and the light emitting drive circuit including multiple cascaded light emitting shift registers EM (1) to EM (N/2) are located in the second bezel area LR2, the third rounded corner area CR3 and the fourth rounded corner area CR4.

In an exemplary embodiment, as shown in FIG. 8, the scan shift registers located in the first rounded corner area CR1 are arranged along the first rounded corner. The scan shift registers located in the second rounded corner area CR2 are arranged along the second rounded corner. The control shift registers located in the third rounded corner area CR3 are arranged along the third rounded corner. The control shift registers located in the fourth rounded corner area CR4 are arranged along the fourth rounded corner.

In an exemplary embodiment, as shown in FIG. 8, the buffer drive circuit including multiple cascaded buffer shift registers is located in the third bezel area LR3, and the cascaded buffer shift registers in the buffer drive circuit are arranged along the first direction.

In an exemplary embodiment, as shown in FIG. 8, the test circuit CT includes multiple sub-test circuits, wherein a part of the sub-test circuits are located in the third bezel area LR3 and interspersed between buffer shift registers, and another part of the sub-test circuits are located in the first rounded corner area CR1 and interspersed between scan shift registers located in the first rounded corner area CR1.

In an exemplary embodiment, as shown in FIG. 8, the multiplexing circuit MUX is interspersed between the scan shift registers located in the first bezel area LR1 and/or the control shift registers located in the second bezel area LR2.

In an exemplary embodiment, when the boundary of the display area is a rounded rectangle, K is greater than or equal to 14 when the reset signal lines of the pixel circuits of (K+1)-th row to N-th row are electrically connected to the scan drive circuit, and K is greater than or equal to 7 when the reset signal lines of the pixel circuits of (K+1)-th row to N-th row are electrically connected to the control drive circuit.

Figure 9:
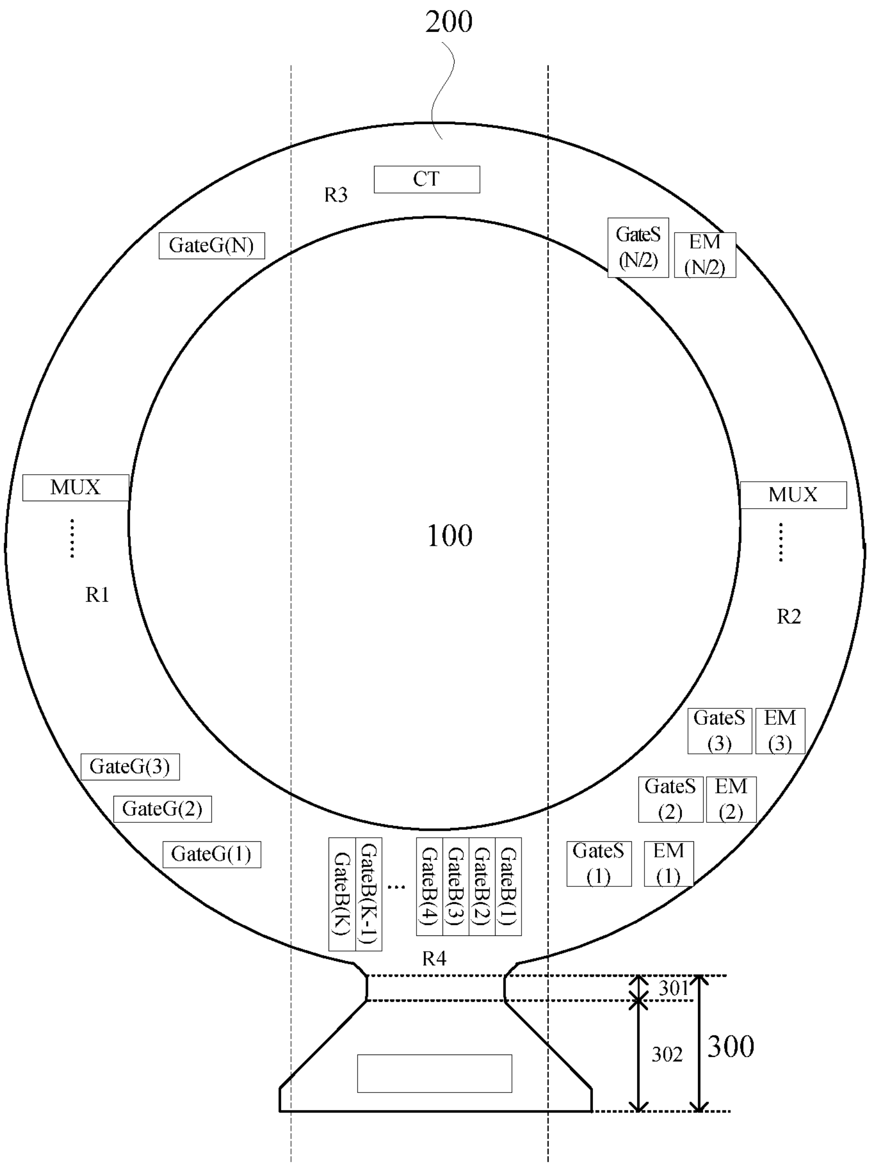
FIG. 9 is a schematic diagram of an arrangement of multiple drive circuits of another display substrate.

FIG. 9 is a schematic diagram of an arrangement of multiple drive circuits of another display substrate. As shown in FIG. 9, a boundary of the display area includes a circle. The bezel area 200 includes a first area R1 to a fourth area R4, wherein the first area R1 and the second area R2 are located between the third area R3 and the fourth area R4. A center line of the display area 100 extending in the first direction passes through the third area R3 and the fourth area R4. The first area R1 and the second area R2 are respectively located at two sides of the center line of the display area 100 extending in the first direction. The first area R1 is located at a first side of the display area 100, the second area R2 is located at a second side of the display area 100, the third area R3 is located at a third side of the display area 100, and the fourth area R4 is located at a fourth side of the display area 100.

In an exemplary embodiment, widths of the first area to the fourth area may be about 1100 microns to 1300 microns, and, for example, the widths of the first area to the fourth area may be about 1200 microns.

In an exemplary embodiment, when the boundary of the display area 100 is circular, the pixel circuits of first row is close to the fourth area R4 and the pixel circuits of N-th row is close to the third area R3.

In an exemplary embodiment, as shown in FIG. 9, the scan drive circuit including multiple cascaded scan shift registers GateG (1) to GateG (N) is located in the first area R1, the control drive circuit including multiple cascaded control shift registers GateS (1) to GateS (N/2) and the light emitting drive circuit including multiple cascaded light emitting shift registers EM (1) to EM (N/2) are located in the second area R2.

In an exemplary embodiment, as shown in FIG. 9, the scan shift registers located in the first area R1 are arranged along the circular boundary, the control shift registers located in the second area R2 are arranged along the circular boundary, and the light emitting shift registers located in the second area R2 are arranged along the circular boundary.

In an exemplary embodiment, as shown in FIG. 9, the buffer drive circuit including multiple cascaded buffer shift registers is located in the fourth area R4, and multiple cascaded buffer shift registers in the buffer drive circuit are arranged along the first direction.

In an exemplary embodiment, as shown in FIG. 9, the test circuit CT is located in the first area R1 and the third area R3. The test circuit CT located in the first area R1 is interspersed between scan shift registers located in the first area R1.

In an exemplary embodiment, as shown in FIG. 9, the multiplexing circuit is located in the first area R1 and/or the second area R2 and interspersed between the scan shift registers and/or the control shift registers.

In an exemplary embodiment, when the boundary of the display area 100 is circular, K is greater than or equal to 10 when the reset signal lines of the pixel circuits of (K+1)-th row to N-th row are electrically connected to the scan drive circuit, and K is greater than or equal to 5 when the reset signal lines of the pixel circuits of (K+1)-th row to N-th row are electrically connected to the control drive circuit.

As shown in FIGS. 8 and 9, the bonding area 300 may include a bending area 301 and a composite circuit area 302. In an exemplary implementation, the bending area 301 may be bent with a curvature, so that a surface of the composite circuit area 302 may be turned over, that is, a surface of the composite circuit area 302 facing upwards may be changed to be facing downwards by the bending of the bending area 301. In an exemplary implementation, when the bending area 301 is bent, the composite circuit area 302 may be overlapped with the display area 100.

In an exemplary embodiment, a length of the bending area in the first direction is greater than an average length of the composite circuit area in the first direction. A length of the composite circuit area in the first direction gradually varies in the second direction, and the length of the composite circuit area in the first direction close to the bending area is smaller than a length of the composite circuit area in the first direction away from the bending area.

In an exemplary implementation, the composite circuit area 302 may include an anti-static area, a drive chip area, and a bonding pin area. An Integrated Circuit (IC for short) may be bonded to the drive chip area, and a Flexible Printed Circuit (FPC for short) may be bonded to the bonding pin area. In an exemplary implementation, the integrated circuit may generate a drive signal required for driving sub-pixels, and may provide the drive signal to the sub-pixels in the display area 100. For example, the drive signal may be a data signal that drives a luminance of the sub-pixels. In an exemplary embodiment, the integrated circuit may be bonded to the drive chip area through an anisotropic conductive film or otherwise. In an exemplary implementation, the bonding pin area may be provided with bonding pads including multiple pins, and the flexible circuit board may be bonded to the bonding pads.

In an exemplary embodiment, when the reset signal lines of the pixel circuits of (K+1)-th row to N-th row are electrically connected with the scan drive circuit. The buffer shift registers and the scan shift registers have a same circuit structure including multiple scan transistors and multiple scan capacitors, wherein each scan capacitor includes a first plate and a second plate. The display substrate further includes a scan initial signal line, a first scan clock signal line and a second scan clock signal line, a first scan power supply line and a second scan power supply line. A buffer shift register of first stage is electrically connected with the scan initial signal line, and the buffer drive circuit and the scan drive circuit are electrically connected with the first scan clock signal line, the second scan clock signal line, the first scan power supply line and the second scan power supply line respectively.

In an exemplary embodiment, when the reset signal lines of the pixel circuits of (K+1)-th row to N-th row are electrically connected to the control drive circuit. The buffer shift registers and the control shift registers have a same circuit structure including multiple control transistors and multiple control capacitors, wherein each control capacitor includes a first plate and a second plate. The display substrate further includes a control initial signal line, a first control clock signal line and a second control clock signal line, a first control power supply line and a second control power supply line. A buffer shift register of first stage is electrically connected to the control initial signal line, and the buffer drive circuit and the control drive circuit are electrically connected to the first control clock signal line, the second control clock signal line, the first control power supply line and the second control power supply line respectively.

In an exemplary embodiment, a light emitting shift register may include multiple light emitting transistors and multiple light emitting capacitors. A circuit structure of the light emitting shift register may be 13T3C or 10T3C, which is not limited in the present disclosure.

In an exemplary embodiment, a scan shift register may include multiple scan transistors and multiple scan capacitors. A circuit structure of the scan shift register may be 8T2C, which is not limited in the present disclosure.

In an exemplary embodiment, a control shift register includes multiple control transistors and multiple control capacitors, and a circuit structure of the control shift register may be 8T2C, which is not limited in the present disclosure.

Figure 10A:
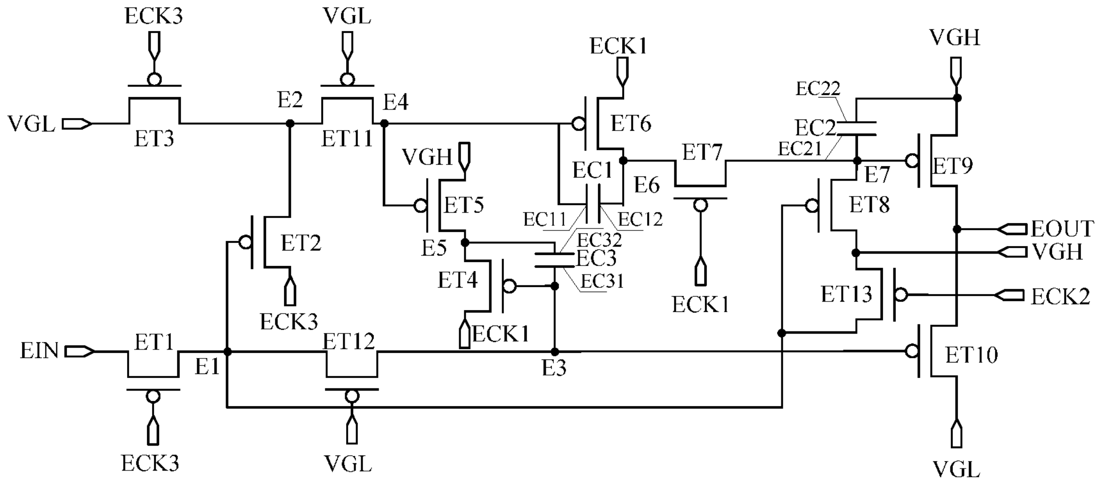
FIG. 10A is an equivalent circuit diagram of a light emitting shift register according to an exemplary embodiment.
Figure 10B:
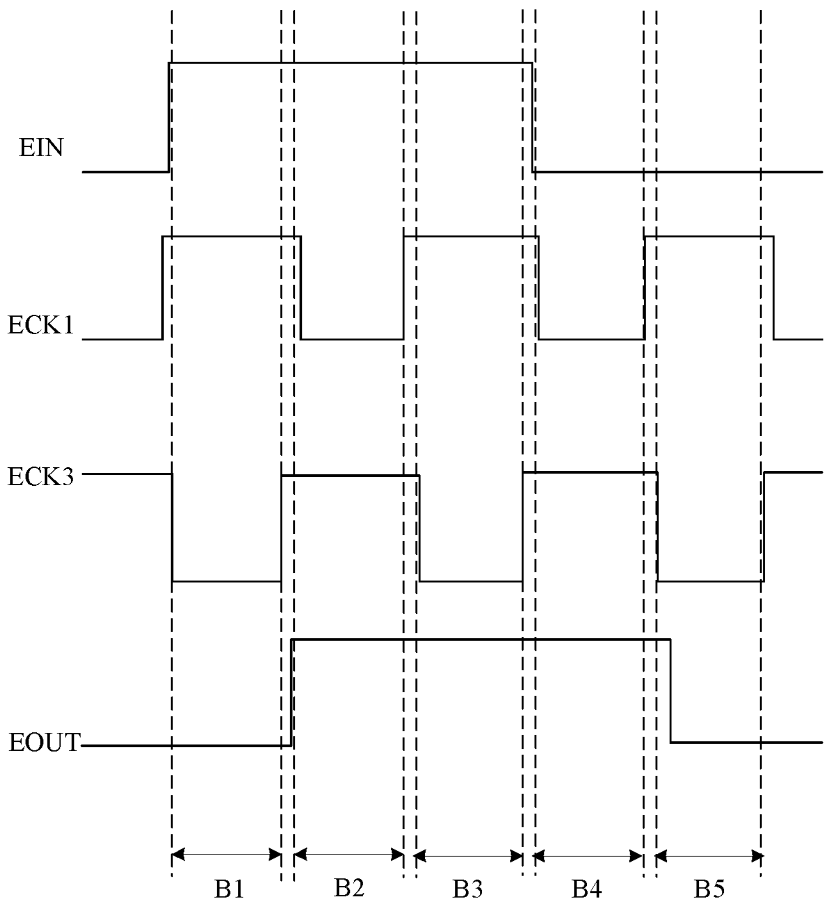
FIG. 10B is a timing diagram of the light emitting shift register provided in FIG. 10A.

FIG. 10A is an equivalent circuit diagram of a light emitting shift register according to an exemplary embodiment, and FIG. 10B is a timing diagram of the light emitting shift register provided in FIG. 10A. As shown in FIG. 10A and FIG. 10B, in an exemplary embodiment, the light emitting shift register may include a first light emitting transistor ET1 to a thirteenth light emitting transistor ET13 and a first light emitting capacitor EC1 to a third light emitting capacitor EC3.

In an exemplary embodiment, a control electrode of the first light emitting transistor ET1 is electrically connected with a third clock signal terminal ECK3, a first electrode of the first light emitting transistor ET1 is electrically connected with an input terminal EIN, and a second electrode of the first light emitting transistor ET1 is electrically connected with a first node E1.

A control electrode of the second light emitting transistor ET2 is electrically connected with the first node E1, a first electrode of the second light emitting transistor ET2 is electrically connected with the third clock signal terminal ECK3, and a second electrode of the second light emitting transistor ET2 is electrically connected with a second node E2. A control electrode of the third light emitting transistor ET3 is electrically connected with the third clock signal terminal ECK3, a first electrode of the third light emitting transistor ET3 is electrically connected with a second power supply terminal VGL, and a second electrode of the third light emitting transistor ET3 is electrically connected with the second node E2. A control electrode of the fourth light emitting transistor ET4 is electrically connected with a third node E3, a first electrode of the fourth light emitting transistor ET4 is electrically connected with a first clock signal terminal ECK1, and a second electrode of the fourth light emitting transistor ET4 is electrically connected with a fifth node E5. A control electrode of the fifth light emitting transistor ET5 is electrically connected with a fourth node E4, a first electrode of the fifth light emitting transistor ET5 is electrically connected with the fifth node E5, and a second electrode of the fifth light emitting transistor ET5 is electrically connected with a first power supply terminal VGH. A control electrode of the sixth light emitting transistor ET6 is electrically connected with the fourth node E4, a first electrode of the sixth light emitting transistor ET6 is electrically connected with the first clock signal terminal ECK1, and a second electrode of the sixth light emitting transistor ET6 is electrically connected with a sixth node E6. A control electrode of the seventh light emitting transistor ET7 is electrically connected with the first clock signal terminal ECK1, a first electrode of the seventh light emitting transistor ET7 is electrically connected with the sixth node E6, and a second electrode of the seventh light emitting transistor ET7 is electrically connected with a seventh node E7. A control electrode of the eighth light emitting transistor ET8 is electrically connected with the first node E1, a first electrode of the eighth light emitting transistor ET8 is electrically connected with the first power supply terminal VGH, and a second electrode of the eighth light emitting transistor ET8 is electrically connected with the seventh node E7. A control electrode of the ninth light emitting transistor ET9 is electrically connected with the seventh node E7, a first electrode of the ninth light emitting transistor ET9 is electrically connected with the first power supply terminal VGH, and a second electrode of the ninth light emitting transistor ET9 is electrically connected with an output terminal EOUT. A control electrode of the tenth light emitting transistor ET10 is electrically connected with the third node E3, a first electrode of the tenth light emitting transistor ET10 is electrically connected with the second power supply terminal VGL, and a second electrode of the tenth light emitting transistor ET10 is electrically connected with the output terminal EOUT. A control electrode of the eleventh light emitting transistor ET11 is electrically connected with the second power supply terminal VGL, a first electrode of the eleventh light emitting transistor ET11 is electrically connected with the second node E2, and a second electrode of the eleventh light emitting transistor ET11 is electrically connected with the fourth node E4. A control electrode of the twelfth light emitting transistor ET12 is electrically connected with the second power supply terminal VGL, a first electrode of the twelfth light emitting transistor ET12 is electrically connected with the first node E1, and a second electrode of the twelfth light emitting transistor ET12 is electrically connected with the third node E3. A control electrode of the thirteenth light emitting transistor ET13 is electrically connected with a second clock signal terminal ECK2, a first electrode of the thirteenth light emitting transistor ET13 is electrically connected with the first node E1, and a second electrode of the thirteenth light emitting transistor ET13 is electrically connected with the first power supply terminal VGH. A first plate EC11 of the first light emitting capacitor EC1 is electrically connected with the fourth node E4, and a second plate EC12 of the first light emitting capacitor EC1 is electrically connected with the sixth node E6. A first plate EC21 of the second light emitting capacitor EC2 is connected with the seventh node E7, and a second plate EC22 of the second light emitting capacitor EC2 is connected with the first power supply terminal VGH. A first plate EC31 of the third light emitting capacitor EC3 is connected with the third node E3, and a second plate EC32 of the third light emitting capacitor EC3 is connected with the fifth node E5.

In an exemplary embodiment, the first light emitting transistor ET1 to the thirteenth light emitting transistor ET13 may be P-type transistors or may be N-type transistors.

In an exemplary embodiment, the first power supply terminal VGH continuously provides a high-level signal, and the second power supply terminal VGL continuously provides a low-level signal. Since the second power supply terminal VGL continuously provides the low-level signal, the eleventh light emitting transistor ET11 and the twelfth light emitting transistor ET12 are continuously turned on.

In an exemplary embodiment, a signal of the second clock signal terminal ECK2 is a low-level signal in a startup initialization stage, which prevents a ninth light emitting transistor ET9 and a tenth light emitting transistor ET10 of a last light emitting shift register from simultaneously being turned on because of delay of an output signal, or is a low-level signal in an abnormal shutdown stage, which prevents the ninth light emitting transistor ET9 and the tenth light emitting transistor ET10 from simultaneously being turned on. The second clock signal terminal ECK2 continuously provides a high-level signal in a normal display stage, i.e. the thirteenth light emitting transistor ET13 is continuously turned off in the normal display stage.

Taking the first light emitting transistor ET1 to the thirteenth light emitting transistor ET13 being P-type transistors as an example, as shown in FIG. 10B, an operating process of a light emitting shift register according to an exemplary embodiment includes following stages.

In a first stage B1, a signal of the first clock signal terminal ECK1 is a high-level signal, and a signal of the third clock signal terminal ECK3 is a low-level signal. The signal of the third clock signal terminal ECK3 is the low-level signal, so that the first light emitting transistor ET1, the third light emitting transistor ET3, and the twelfth light emitting transistor ET12 are turned on. The turned-on first light emitting transistor ET1 transmits a high-level signal of the input terminal EIN to the first node E1, thus, a level of the first node E1 becomes a high level, the turned-on twelfth light emitting transistor ET12 transmits a high-level signal of the first node E1 to the third node E2, and the second light emitting transistor ET2, the fourth light emitting transistor ET4, the eighth light emitting transistor ET8, and the tenth light emitting transistor ET10 are turned off. In addition, the turned-on third light emitting transistor ET3 transmits a low-level signal of the second power supply terminal VGL to the second node E2, thus, a level of the second node E2 becomes a low level, the turned-on eleventh light emitting transistor ET11 transmits a low-level signal of the second node E2 to the fourth node E4, so that a level of the fourth node E4 becomes a low level, and the fifth light emitting transistor ET5 and the sixth light emitting transistor ET6 are turned on. The signal of the first clock signal terminal ECK1 is the high-level signal, and the seventh light emitting transistor ET7 is turned off. In addition, the ninth light emitting transistor ET9 is turned off under an action of the third light emitting capacitor EC3. In a first stage P1, since both the ninth light emitting transistor ET9 and the tenth light emitting transistor ET10 are turned off, a signal of the output terminal EOUT is kept at a previous low level.

In a second stage B2, the signal of the first clock signal terminal ECK1 is a low-level signal, and the signal of the third clock signal terminal ECK3 is a high-level signal. The signal of the first clock signal terminal ECK1 is the low-level signal, so that the seventh light emitting transistor ET7 is turned on. The signal of the third clock signal terminal ECK3 is the high-level signal, so that the first light emitting transistor ET1 and the third light emitting transistor ET3 are turned off. Under an action of the third light emitting capacitor EC3, the first node E1 and the third node E3 may continue to maintain a high-level signal of the previous stage, and under an action of the first light emitting capacitor EC1, the fourth node E4 may continue to maintain the low level of the previous stage, so that the fifth light emitting transistor ET5 and the sixth light emitting transistor ET6 are turned on, and the second light emitting transistor ET2, the fourth light emitting transistor ET4, the eighth light emitting transistor ET8, and the tenth light emitting transistor ET10 are turned off. In addition, the low-level signal of the first clock signal terminal ECK1 is transmitted to the seventh node E7 through the turned-on sixth light emitting transistor ET6 and the seventh light emitting transistor ET7, the ninth light emitting transistor ET9 is turned on and the turned-on ninth light emitting transistor ET9 outputs a high-level signal of the first power supply terminal VGH, so the signal of the output terminal EOUT is a high-level signal.

In addition, in a third stage B3, the signal of the third clock signal terminal ECK3 is a low-level signal, and the signal of the first clock signal terminal ECK1 is a high-level signal. The signal of the first clock signal terminal ECK1 is the high-level signal, so that the seventh light emitting transistor ET7 is turned off, and the second light emitting transistor ET2, the fourth light emitting transistor ET4, the eighth light emitting transistor ET8, and the tenth light emitting transistor ET10 are turned off. The signal of the third clock signal terminal ECK3 is the low-level signal, so that the first light emitting transistor ET1 and the third light emitting transistor ET3 are turned on. Under an action of the second light emitting capacitor EC3, the ninth light emitting transistor ET9 maintains a turned-on state, and the turned-on ninth light emitting transistor ET9 outputs a high-level signal of the first power supply terminal VGH, so the signal of the output terminal EOUT is still a high-level signal.

In a fourth stage B4, the signal of the first clock signal terminal ECK1 is a low-level signal, and the signal of the third clock signal terminal ECK3 is a high-level signal. The signal of the third clock signal terminal ECK3 is the high-level signal, so that the first light emitting transistor ET1 and the third light emitting transistor ET3 are turned off. The signal of the first clock signal terminal ECK1 is at the low level, and the seventh light emitting transistor ET7 is turned on. Due to a storage effect of the third light emitting capacitor EC3, levels of the first node E1 and the third node E3 are kept at high-levels of the previous stage, so that the second light emitting transistor ET2, the fourth light emitting transistor ET4, the eighth light emitting transistor ET8, and the tenth light emitting transistor ET10 are turned off. Due to a storage effect of the first light emitting capacitor EC1, the fourth node E4 continues to maintain the low level of the previous stage, so that the fifth light emitting transistor ET5 and the sixth light emitting transistor ET6 are turned on. In addition, the low-level signal of the first clock signal terminal ECK1 is transmitted to the seventh node E7 through the turned-on sixth light emitting transistor ET6 and the seventh light emitting transistor ET7, the turned-on ninth light emitting transistor ET9 outputs a high-level signal of the first power supply terminal VGH, so the signal of the output terminal EOUT is still a high-level signal.

In a fifth stage B5, the signal of the first clock signal terminal ECK1 is a high-level signal, and the signal of the third clock signal terminal ECK3 is a low-level signal. The signal of the third clock signal terminal ECK3 is the low-level signal, so that the first light emitting transistor ET1 and the third light emitting transistor ET3 are turned on. The signal of the first clock signal terminal ECK1 is the high-level signal, so that the seventh light emitting transistor ET7 is turned off. The turned-on first light emitting transistor ET1 transmits a low-level signal of the input terminal EIN to the first node E1, thus, a level of the first node E1 becomes a low level, the turned-on twelfth light emitting transistor ET12 transmits a low-level signal of the first node E1 to the third node E3, so that a level of the third node E3 becomes a low level, and the second light emitting transistor ET2, the fourth light emitting transistor ET4, the eighth light emitting transistor ET8, and the tenth light emitting transistor ET10 are turned on. The turned-on second light emitting transistor ET2 transmits the low-level signal of the third clock signal terminal ECK3 to the second node E2, so that a level of the second node E2 may be further pulled down and the second node E2 and the fourth node E4 continue to maintain the low levels of the previous stage, and thus the fifth light emitting transistor ET5 and the sixth light emitting transistor ET6 are turned on. The signal of the first clock signal terminal ECK1 is the high-level signal, so that the seventh light emitting transistor ET7 is turned off. In addition, the turned-on eighth light emitting transistor ET8 transmits the high-level signal of the first power supply terminal VGH to the seventh node E7, so that the ninth light emitting transistor ET9 is turned off. The turned-on tenth light emitting transistor ET10 outputs the low-level signal of the second power supply terminal VGL, so the signal of the output terminal EOUT turns to be at a low level.

In an exemplary embodiment, the display substrate may further include a light emitting initial signal line, a first light emitting clock signal line to a third light emitting clock signal line, a first high-level power supply line, and a first low-level power supply line which extend along the second direction.

An input terminal of a light emitting shift register of first stage is electrically connected with the light emitting initial signal line, and an output terminal of a light emitting shift register of i-th stage is electrically connected with an input terminal of a light emitting shift register of (i+1)-th stage. The light emitting shift register of i-th stage has a first clock signal terminal electrically connected with the first light emitting clock signal line, a second clock signal terminal electrically connected with the second light emitting clock signal line, and a third clock signal terminal electrically connected with the third light emitting clock signal line. The light emitting shift register of (i+1)-th stage has a first clock signal terminal electrically connected with the third light emitting clock signal line, a second clock signal terminal electrically connected with the second light emitting clock signal line, and a third clock signal terminal electrically connected with the first light emitting clock signal line. A first power supply terminal of the light emitting shift register of i-th stage is electrically connected with the first light emitting power supply line, and a second power supply terminal of the light emitting shift register of i-th stage is electrically connected with the second light emitting power supply line.

Figure 11A:
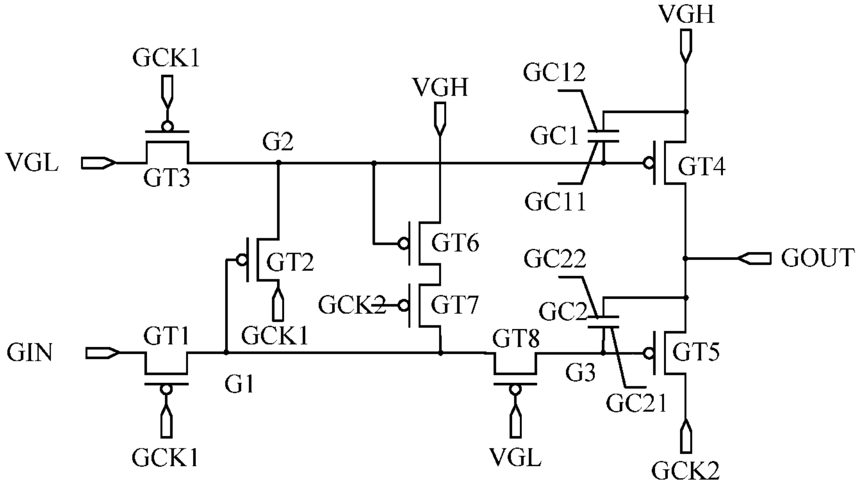
FIG. 11A is an equivalent circuit diagram of a scan shift register according to an exemplary embodiment.
Figure 11B:
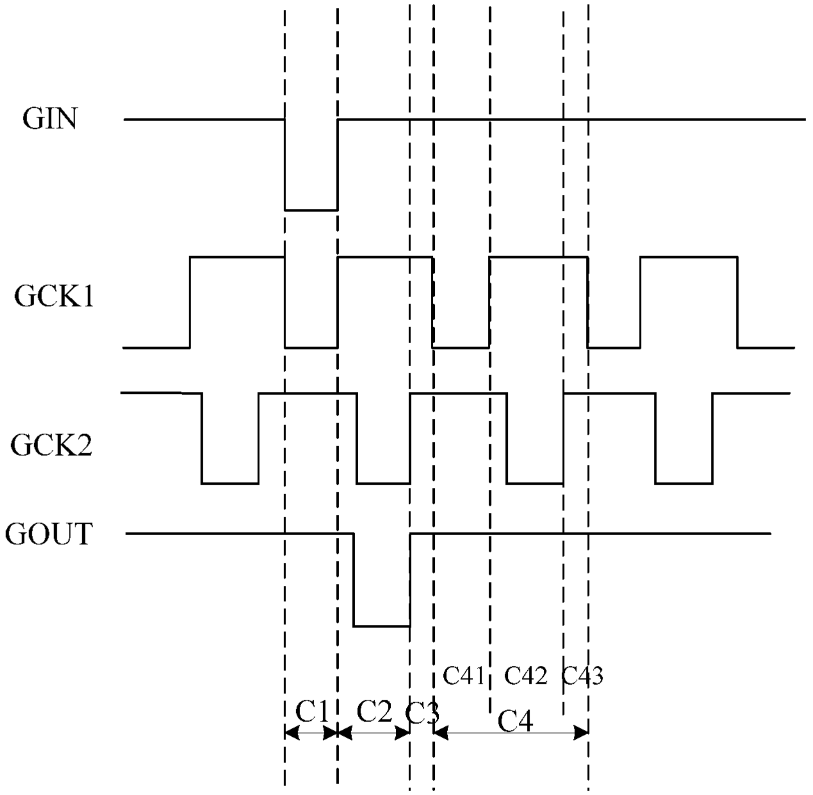
FIG. 11B is a timing diagram of the scan shift register provided in FIG. 11A.

FIG. 11A is an equivalent circuit diagram of a scan shift register according to an exemplary embodiment, and FIG. 11B is a timing diagram of the scan shift register provided in FIG. 11A. As shown in FIGS. 11A and 11B, the scan shift register includes a first scan transistor GT1 to an eighth scan transistor GT8, a first scan capacitor GC1 and a second scan capacitor GC2, as shown in FIG. 11B.

In an exemplary embodiment, a scan electrode of the first scan transistor GT1 is electrically connected to a first clock signal terminal GCK1, a first electrode of the first scan transistor GT1 is electrically connected to an input terminal GIN, and a second electrode of the first scan transistor GT1 is electrically connected to a first node G1. A scan electrode of the second scan transistor GT2 is electrically connected to a first node G1, a first electrode of the second scan transistor GT2 is electrically connected to the first clock signal terminal GCK1, and a second electrode of the second scan transistor GT2 is electrically connected to a second node G2. A scan electrode of the third scan transistor GT3 is electrically connected to a first clock signal terminal GCK11, a first electrode of the third scan transistor GT3 is electrically connected to a second power supply terminal VGL, and a second electrode of the third scan transistor GT3 is electrically connected to the second node G2. A scan electrode of the fourth scan transistor GT4 is electrically connected to the second node G2, a first electrode of the fourth scan transistor GT4 is electrically connected to a first power supply terminal VGH, and a second electrode of the fourth scan transistor GT4 is electrically connected to an output terminal GOUT. A scan electrode of the fifth scan transistor GT5 is electrically connected to a third node G3, a first electrode of the fifth scan transistor GT5 is electrically connected to a second clock signal terminal GCK2, and a second electrode of the fifth scan transistor GT5 is electrically connected to the output terminal GOUT. A scan electrode of the sixth scan transistor GT6 is electrically connected to the second node G2, a first electrode of the sixth scan transistor GT6 is electrically connected to the first power supply terminal VGH, and a second electrode of the sixth scan transistor GT6 is electrically connected to a first electrode of the seventh scan transistor GT7. A scan electrode of the seventh scan transistor GT7 is electrically connected to the second clock signal terminal GCK2, and a second electrode of the seventh scan transistor GT7 is electrically connected to the first node G1. A scan electrode of the eighth scan transistor GT8 is electrically connected to the second power supply terminal VGL, a first electrode of the eighth scan transistor GT8 is electrically connected to the first node G1, and a second electrode of the eighth scan transistor GT8 is electrically connected to the third node G3. One end of the first scan capacitor GC1 is electrically connected with the first power supply terminal VGH, and the other end of the first scan capacitor GC1 is electrically connected with the second node G2. A first plate GC21 of the second scan capacitor GC2 is electrically connected to the output terminal GOUT, and a second plate GC22 of the second scan capacitor GC2 is electrically connected to the third node G3.

In an exemplary embodiment, the first scan transistor GT1 to the eighth scan transistor GT8 may be P-type transistors or may be N-type transistors.

In an exemplary embodiment, the first power supply terminal VGH continuously provides a high-level signal, and the second power supply terminal VGL continuously provides a low-level signal.

Taking the first scan transistor GT1 to the eighth scan transistor GT8 being P-type transistors as an example, as shown in FIG. 11B, an operating process of a scan shift register according to an exemplary embodiment includes following stages.

In an input stage C1, signals of the first clock signal terminal GCK1 and the input terminal GIN are low-level signals, and a signal of the second clock signal terminal GCK2 is a high-level signal. As the signal of the first clock signal terminal GCK1 is the low-level signal, the first scan transistor GT1 is turned on, and a signal of the input terminal GIN is transmitted to the first node G1 through the first scan transistor GT1. As a signal of the eighth scan transistor GT8 receives a low-level signal of the second power supply terminal VGL, the eighth scan transistor GT8 is in an ON state. A level of the third node G3 may scan turning-on of the fifth scan transistor GT5, and the signal of the second clock signal terminal GCK2 is transmitted to the output terminal GOUT through the fifth scan transistor GT5, that is, in the input stage C1, the output terminal GOUT has the signal of the second clock signal terminal GCK2 which is a high-level signal. In addition, since the signal of the first clock signal terminal GCK1 is the low-level signal, the third scan transistor GT3 is turned on, and the low-level signal of the second power supply terminal VGL is transmitted to the second node G2 via the third scan transistor GT3. At this point, both the fourth scan transistor GT4 and the sixth scan transistor GT6 are turned on. As the signal of the second clock signal terminal GCK2 is the high-level signal, the seventh scan transistor GT7 is turned off.

In an output stage C2, the signal of the first clock signal terminal GCK1 is a high-level signal, the signal of the second clock signal terminal GCK2 is a low-level signal, and the signal of the input terminal GIN is a high-level signal. The fifth scan transistor GT5 is turned on, and the signal of the second clock signal terminal GCK2 is used as the signal of the output terminal GOUT via the fifth scan transistor GT5. In the output phase C2, a level at one end of the second scan capacitor GC2 connected to output terminal GOUT, becomes a signal of the second power supply terminal VGL. Due to a bootstrap effect of the second scanning capacitor GC2, the eighth scan transistor GT8 is turned off, the fifth scan transistor GT5 can be turned on better, and the signal of the output terminal GOUT is a low-level signal. In addition, the signal of the first clock signal terminal GCK1 is the high-level signal, so that both the first scan transistor GT1 and the third scan transistor GT3 are turned off. The second scan transistor GT2 is turned on, and the high-level signal of the first clock signal terminal GCK1 is transmitted to the second node G2 via the second scan transistor GT2, so that both the fourth scan transistor GT4 and the sixth scan transistor GT6 are turned off. As the signal of the second clock signal terminal GCK2 is the low-level signal, the seventh scan transistor GT7 is turned on.

In a buffering stage C3, the signals of the first clock signal terminal GCK1 and the second clock signal terminal GCK2 are both high-level signals, the signal of the input terminal GIN is a high-level signal, the fifth scan transistor GT5 is turned on, and the second clock signal terminal GCK2 is used as an output signal GOUT via the fifth control transistor GT5. Due to a bootstrap effect of the second scan capacitor C2, a level of the first node G1 becomes VGL−VthN1. In addition, the signal of the first clock signal terminal GCK1 is the high-level signal, so that the first scan transistor GT1 and the third scan transistor GT3 are both turned off, the eighth scan transistor GT8 is turned on, the second scan transistor GT2 is turned on, and the high-level signal of the first scan clock signal terminal GCK1 is transmitted to the second node G2 via the second scan transistor GT2, and thus both the fourth scan transistor GT4 and the sixth scan transistor GT6 are turned off. As the signal of the second clock signal terminal GCK2 is the high-level signal, the seventh scan transistor GT7 is turned off.

In a first sub-stage C41 of a stabilization stage C4, the signal of the first clock signal terminal GCK1 is a low-level signal, and the signals of the second clock signal terminal GCK2 and the input terminal GIN are high-level signals. As the signal of the first clock signal terminal GCK1 is the low-level signal, the first scan transistor GT1 is turned on, the signal of the input terminal GIN is transmitted to the first node G1 through the first scan transistor GT1, and the second scan transistor GT2 is turned off. As the eighth scan transistor GT8 is in an ON state, the fifth scan transistor GT5 is turned off. Since the signal of the first clock signal terminal GCK1 is at a low level, the third scan transistor GT3 is turned on, the fourth scan transistor GT4 and the sixth scan transistor GT6 are both turned on, and the high-level signal of the first power supply terminal VGH is transmitted to the output terminal GOUT through the fourth scan transistor GT4, that is, the signal of the output terminal GOUT is a high-level signal.

In a second sub-stage C42 of the stabilization stage C4, the signal of the first clock signal terminal GCK1 is a high-level signal, the signal of the second clock signal terminal GCK2 is a low-level signal, and the signal of the input terminal GIN is a high-level signal. Both the fifth scan transistor GT5 and the second scan transistor GT2 are turned off. The signal of the first clock signal terminal GCK1 is the high-level signal, so that the first scan transistor GT1 and the third scan transistor GT3 are both turned off. Under a holding effect of the first scanning capacitor GC1, the fourth scan transistor GT4 and the sixth scan transistor GT6 are both turned on, and the high-level signal is transmitted to the output terminal GOUT through the fourth scan transistor GT4, that is, a signal of the output terminal GOUT is a high-level signal.

In the second sub-phase C42, as the signal of the second clock signal terminal GCK2 is the low-level signal, the seventh scan transistor GT7 is turned on, so that the high-level signal is transmitted to the third node G3 and the first node G1 through the sixth scan transistor GT6 and the seventh scan transistor GT7, and thus the signals of the third node G3 and the first node G1 are kept as high-level signals.

In a third sub-stage C43, the signals of the first clock signal terminal GCK1 and the second clock signal terminal GCK2 are both high-level signals, and the signal of the input terminal GIN is a high-level signal. The fifth scan transistor GT5 and the second scan transistor GT2 are turned off. The signal of the first clock signal terminal GCK1 is a high-level signal, so that the first scan transistor GT1 and the third scan transistor GT3 are both turned off, and the fourth scan transistor GT4 and the sixth scan transistor GT6 are both turned on. The high-level signal is transmitted to the output terminal GOUT via the fourth scan transistor GT4, that is, the signal of the output terminal GOUT is a high-level signal.

In an exemplary embodiment, an input terminal of a scan shift register of first stage is electrically connected to a scan initial signal line, and an output terminal of a scan shift register of i-th stage is electrically connected to an input terminal of a scan shift register of (i+1)-th stage. The scan shift register of i-th stage has a first clock signal terminal electrically connected with the first scan clock signal line, and a second clock signal terminal electrically connected with the second scan clock signal line. The scan shift register of (i+1)-th stage has a first clock signal terminal electrically connected with the second scan clock signal line, and a second clock signal terminal electrically connected with the first scan clock signal line. A first power supply terminal of the scan shift register of i-th stage is electrically connected with the first scan power supply line, and a second power supply terminal of the scan shift register of i-th stage is electrically connected with the second scan power supply line.

Figure 12A:
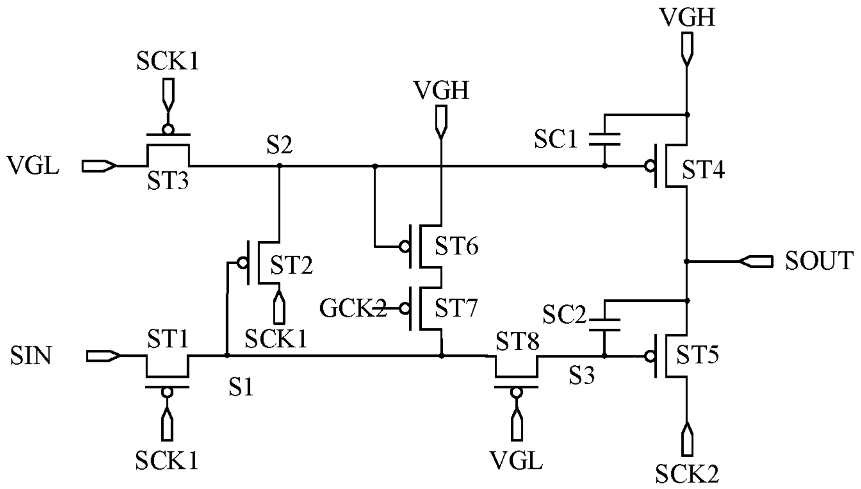
FIG. 12A is an equivalent circuit diagram of a control shift register according to an exemplary embodiment.
Figure 12B:
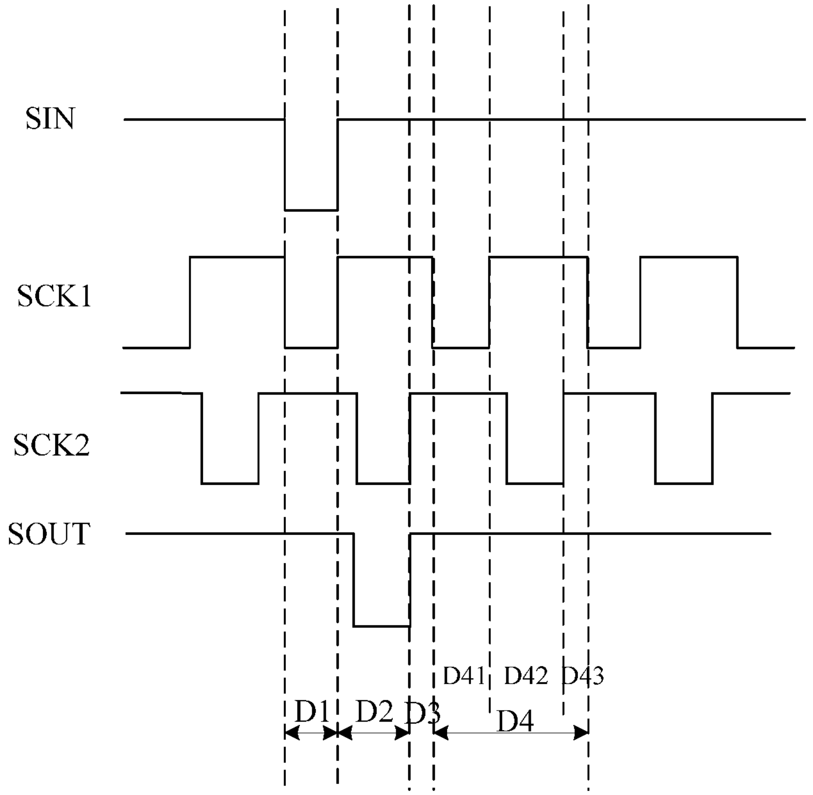
FIG. 12B is a timing diagram of the control shift register provided in FIG. 12A.

FIG. 12A is an equivalent circuit diagram of a control shift register according to an exemplary embodiment, and FIG. 12B is a timing diagram of the control shift register provided in FIG. 12A. As shown in FIGS. 12A and 12B, the control shift register includes a first control transistor ST1 to an eighth control transistor ST8, a first control capacitor SC1, and a second control capacitor SC2, as shown in FIG. 12B.

In an exemplary embodiment, a control electrode of the first control transistor ST1 is electrically connected to a first clock signal terminal GCK1, a first electrode of the first control transistor ST1 is electrically connected to an input terminal SIN, and a second electrode of the first control transistor ST1 is electrically connected to a first node Si. A control electrode of the second control transistor ST2 is electrically connected to the first node Si, a first electrode of the second control transistor ST2 is electrically connected to the first clock signal terminal GCK1, and a second electrode of the second control transistor ST2 is electrically connected to a second node S2. A control electrode of the third control transistor ST3 is electrically connected to a first clock signal terminal SSCK11, a first electrode of the third control transistor ST3 is electrically connected to a second power supply terminal VGL, and a second electrode of the third control transistor ST3 is electrically connected to the second node S2. A control electrode of the fourth control transistor ST4 is electrically connected to the second node S2, a first electrode of the fourth control transistor ST4 is electrically connected to a first power supply terminal VGH, and a second electrode of the fourth control transistor ST4 is electrically connected to an output terminal SOUT. A control electrode of the fifth control transistor ST5 is electrically connected to a third node S3, a first electrode of the fifth control transistor ST5 is electrically connected to a second clock signal terminal SCK2, and a second electrode of the fifth control transistor ST5 is electrically connected to the output terminal SOUT. A control electrode of the sixth control transistor ST6 is electrically connected to the second node S2, a first electrode of the sixth control transistor ST6 is electrically connected to the first power supply terminal VGH, and a second electrode of the sixth control transistor ST6 is electrically connected to a first electrode of the seventh control transistor ST7. A control electrode of the seventh control transistor ST7 is electrically connected to the second clock signal terminal SCK2, and a second electrode of the seventh control transistor ST7 is electrically connected to the first node Si. A control electrode of the eighth control transistor ST8 is electrically connected to the second power supply terminal VGL, a first electrode of the eighth control transistor ST8 is electrically connected to the first node S1, and a second electrode of the eighth control transistor ST8 is electrically connected to the third node S3. A first plate SC11 of the first control capacitor SC1 is electrically connected with the first power supply terminal VGH, and a second plate SC13 of the first control capacitor SC1 is electrically connected with the second node S2. A first plate SC21 of the second control capacitor SC2 is electrically connected to the output terminal SOUT, and a second plate SC22 of the second control capacitor SC2 is electrically connected to the third node S3.

In an exemplary embodiment, the first control transistor ST1 to the eighth control transistor ST8 may be P-type transistors or may be N-type transistors.

In an exemplary embodiment, the first power supply terminal VGH continuously provides a high-level signal, and the second power supply terminal VGL continuously provides a low-level signal.

Taking the first control transistor ST1 to the eighth control transistor ST8 being P-type transistors as an example, as shown in FIG. 12B, an operating process of a control shift register according to an exemplary embodiment includes following stages.

In an input stage D1, signals of the first clock signal terminal SCK1 and the input terminal SIN are low-level signals, and a signal of the second clock signal terminal SCK2 is a high-level signal. Since the signal of the first clock signal terminal SCK1 is the low-level signal, the first control transistor ST1 is turned on, and a signal of the input terminal SIN is transmitted to the first node S1 through the first control transistor ST1. Since a signal of the eighth control transistor ST8 receives the low-level signal of the second power supply terminal VGL, the eighth control transistor ST8 is in a turned-on state. A level of the third node S3 may control the fifth control transistor ST5 to be turned on, and the signal of the second clock signal terminal SCK2 is transmitted to the output terminal SOUT through the fifth control transistor ST5, that is, in the input stage D1, the output terminal SOUT has the signal of the second clock signal terminal SCK2 which is a high-level signal. In addition, since the signal of the first clock signal terminal SCK1 is the low-level signal, the third control transistor ST3 is turned on, and the low-level signal of the second power supply terminal VGL is transmitted to the second node S2 via the third control transistor ST3. At this point, both the fourth control transistor ST4 and the sixth control transistor ST6 are turned on. Since the signal of the second clock signal terminal SCK2 is the high-level signal, the seventh control transistor ST7 is turned off.

In an output stage D2, the signal of the first clock signal terminal SCK1 is a high-level signal, the signal of the second clock signal terminal SCK2 is a low-level signal, and the signal of the input terminal SIN is a high-level signal. The fifth control transistor ST5 is turned on, and the signal of the second clock signal terminal SCK2 is used as a signal of the output terminal SOUT via the fifth control transistor ST5. In the output stage D2, a level of one end of the second control capacitor SC2 connected with the output terminal GOUT becomes a signal of the second power supply terminal VGL. Due to a bootstrap effect of the second control capacitor SC2, the eighth control transistor ST8 is turned off, the fifth control transistor ST5 may be turned on more easily, and the signal of the output terminal SOUT is a low-level signal. In addition, the signal of the first clock signal terminal SCK1 is the high-level signal, so that both the first control transistor ST1 and the third control transistor ST3 are turned off. The second control transistor ST2 is turned on, and the high-level signal of the first clock signal terminal SCK1 is transmitted to the second node S2 via the second control transistor ST2, so that both the fourth control transistor ST4 and the sixth control transistor ST6 are turned off. Since the signal of the second clock signal terminal SCK2 is the low-level signal, the seventh control transistor ST7 is turned on.

In a buffering stage D3, the signals of the first clock signal terminal SCK1 and the second clock signal terminal SCK2 are both high-level signals, the signal of the input terminal SIN is a high-level signal, the fifth control transistor ST5 is turned on, and the signal of the second clock signal terminal SCK2 is used as a signal of the output terminal SOUT via the fifth control transistor ST5. Due to a bootstrap effect of the second control capacitor C2, a level of the first node S1 is changed to VGL-VthN1. In addition, the signal of the first clock signal terminal SCK1 is the high-level signal, so that the first control transistor ST1 and the third control transistor ST3 are both turned off, the eighth control transistor ST8 is turned on, the second control transistor ST2 is turned on, and the high-level signal of the first clock signal terminal SCK1 is transmitted to the second node S2 via the second control transistor ST2, and thus both the fourth control transistor ST4 and the sixth control transistor ST6 are turned off. Since the signal of the second clock signal terminal SCK2 is the high-level signal, the seventh control transistor ST7 is turned off.

In a first sub-stage D41 of a stabilization stage D4, the signal of the first clock signal terminal SCK1 is a low-level signal, and the signals of the second clock signal terminal SCK2 and the input terminal SIN are high-level signals. Since the signal of the first clock signal terminal SCK1 is the low-level signal, the first control transistor ST1 is turned on, and the signal of the input terminal SIN is transmitted to the first node Si through the first control transistor ST1, and the second scan transistor ST2 is turned off. Since the eighth control transistor ST8 is in a turned-on state, the fifth control transistor ST5 is turned off. Since the signal of the first clock signal terminal SCK1 is at a low level, the third control transistor ST3 is turned on, the fourth control transistor ST4 and the sixth control transistor ST6 are both turned on, and the high-level signal of the first power supply terminal VGH is transmitted to the output terminal SOUT through the fourth control transistor ST4, that is, the signal of the output terminal SOUT is a high-level signal.

In a second sub-stage t42 of the stabilization stage t4, the signal of the first clock signal terminal SCK1 is a high-level signal, the signal of the second clock signal terminal SCK2 is a low-level signal, and the signal of the input terminal SIN is a high-level signal. Both the fifth control transistor ST5 and the second control transistor ST2 are turned off. The signal of the first clock signal terminal SCK1 is the high-level signal, so that the first control transistor ST1 and the third control transistor ST3 are both turned off. Under a holding effect of the first control capacitor SC1, the fourth control transistor ST4 and the sixth control transistor ST6 are both turned on, and a high-level signal is transmitted to the output terminal SOUT via the fourth control transistor ST4, that is, the signal of the output terminal SOUT is a high-level signal.

In the second sub-stage t42, since the signal of the second clock signal terminal SCK2 is the low-level signal, the seventh control transistor ST7 is turned on, so that a high-level signal is transmitted to the third node S3 and the first node S1 via the sixth control transistor ST6 and the seventh control transistor ST7, so that signals of the third node S3 and the first node S1 are kept as high-level signals.

In a third sub-stage t43, the signals of the first clock signal terminal SCK1 and the second clock signal terminal SCK2 are both high-level signals, and the signal of the input terminal SIN is a high-level signal. The fifth control transistor ST5 and the second control transistor ST2 are turned off. The signal of the first clock signal terminal SCK1 is the high-level signal, so that the first control transistor ST1 and the third control transistor ST3 are both turned off, and the fourth control transistor ST4 and the sixth control transistor ST6 are both turned on. The high-level signal is transmitted to the output terminal SOUT via the fourth control transistor ST4, that is, the signal of the output terminal SOUT is a high-level signal.

In an exemplary embodiment, an input terminal of a control shift register of first stage is electrically connected to a control initial signal line, and an output terminal of a control shift register of i-th stage is electrically connected to an input terminal of a control shift register of (i+1)-th stage. The control shift register of i-th stage has a first clock signal terminal is electrically connected with the first control clock signal line, and a second clock signal terminal electrically connected with the second control clock signal line. The control shift register of (i+1)-th stage has a first clock signal terminal electrically connected with the second control clock signal line, and a second clock signal end electrically connected with the first control clock signal line. A first power supply terminal of the control shift register of i-th stage is electrically connected with the first control power supply line, and a second power supply terminal of the control shift register of i-th stage is electrically connected with the second control power supply line.

Figure 13:
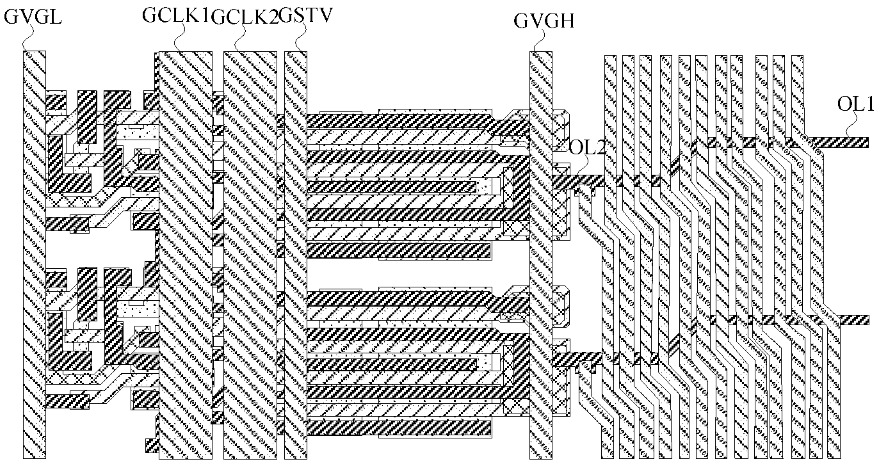
FIG. 13 is a schematic structural diagram of a scan shift register according to an exemplary embodiment.

In an exemplary embodiment, FIG. 13 is a schematic structural diagram of a scan shift register according to an exemplary embodiment, as shown in FIG. 13, when reset signal lines of the pixel circuits of (K+1)-th row to N-th row are electrically connected to the scan drive circuit, the circuit structure layer includes a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on a base substrate.

The semiconductor layer includes active layers of multiple scan transistors.

The first conductive layer includes control electrodes of multiple scan transistors and first plates of multiple scan capacitors.

The second conductive layer includes second plates of multiple scan capacitors.

The third conductive layer includes first electrodes and second electrodes of multiple scan transistors, first signal output lines OL1 of scan shift registers of first stage to (N−K)-th stage and fourth signal output lines of scan shift registers of (N−K+1)-th stage to N-th stage.

The fourth conductive layer includes a scan initial signal line GSTV, a first scan clock signal line GCLK1, a second scan clock signal line GCLK2, a first scan power supply line GVGH, a second scan power supply line GVGL, second signal output lines OL2 of the scan shift registers of first stage to (N−K)-th stage, and third output signal lines of buffer shift registers of first stage to K-th stage.

Figure 14:
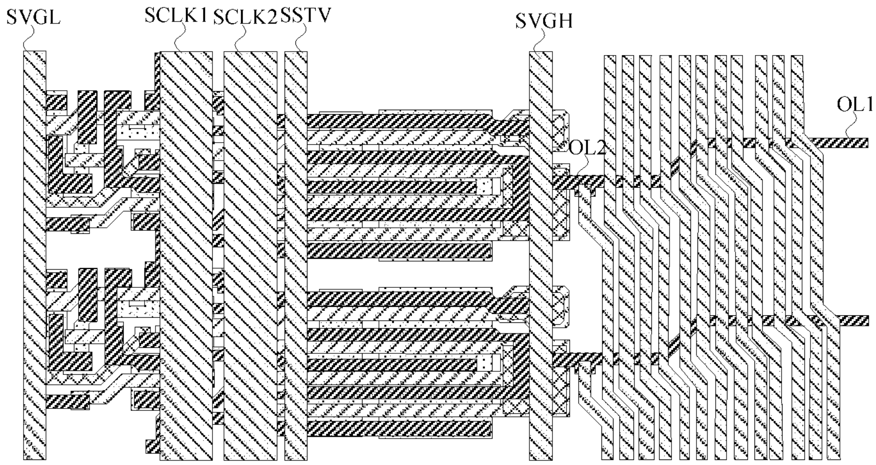
FIG. 14 is a schematic structural diagram of a control shift register according to an exemplary embodiment.

In an exemplary embodiment, FIG. 14 is a schematic structural diagram of a control shift register according to an exemplary embodiment, as shown in FIG. 14, when the reset signal lines of the pixel circuits of (K+1)-th row to N-th row are electrically connected to the control drive circuit, the circuit structure layer includes a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on a base substrate.

The semiconductor layer includes: active layers of multiple control transistors.

The first conductive layer includes: control electrodes of multiple control transistors and first plates of multiple control capacitors.

The second conductive layer includes second plates of multiple control capacitors.

The third conductive layer includes first electrodes and second electrodes of multiple control transistors, first signal output lines OL1 of control shift registers of first stage to (N−K)/2-th stage and fourth signal output lines of control shift registers of ((N−K)/2+1)-th stage to N-th stage.

The fourth conductive layer includes a control initial signal line SSTV, a first control clock signal line SCLK1, a second control clock signal line SCLK2, a first control power supply line SVGH, a second control power supply line SVGL, second signal output lines OL2 of control shift registers of first stage to (N−K)/2-th stage and third signal output lines of buffer shift registers of first stage to K/2-th stage.

Hereinafter, a process of manufacturing a scan shift register including a first signal output line and a second signal output line in a display substrate will be described through an example in which the reset signal lines of the pixel circuits of (K+1)-th row to N-th row are electrically connected to the scan drive circuit. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as deposition, coating, etc. If the "thin film" does not need a patterning process in an entire manufacturing process, the "thin film" may also be called a "layer". If the "thin film" needs a patterning process in an entire manufacturing process, it is called a "thin film" before the patterning process, and called a "layer" after the patterning process. The "layer" after the patterning process includes at least one "pattern". "A and B being disposed on a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthographic projection of B is within a range of an orthographic projection of A" or "an orthographic projection of A includes an orthographic projection of B" refers to that a boundary of the orthographic projection of B falls within a range of a boundary of the orthographic projection of A, or the boundary of the orthographic projection of A is overlapped with the boundary of the orthographic projection of B. FIGS. 15 to 21 illustrates an example in which the display substrate includes the two-stage scan shift register provided in FIG. 11A.

(1) A semiconductor layer is formed on a base substrate, which includes: a semiconductor thin film is deposited on the base substrate, and the semiconductor thin film is patterned through a patterning process to form the semiconductor layer. As show in FIG. 15, FIG. 15 is a schematic diagram after a pattern of the semiconductor layer is formed.

Figure 15:
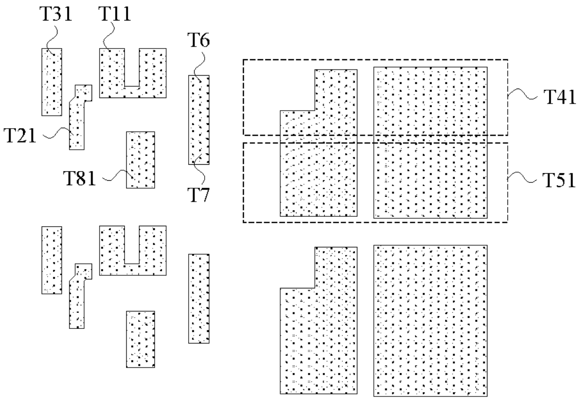
FIG. 15 is a schematic diagram after a pattern of a semiconductor layer is formed.

In an exemplary embodiment, as shown in FIG. 15, the pattern of the semiconductor layer may include an active layer T11 of a first scan transistor to an active layer T81 of an eighth scan transistor of the shift register.

In an exemplary embodiment, the base substrate may be a rigid base substrate or a flexible base substrate, wherein the rigid base substrate may be, but is not limited to, one or more of glass and metal foil, the flexible base substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the flexible substrate may include a first flexible material layer, a first inorganic material layer, a semiconductor layer, a second flexible material layer, and a second inorganic material layer which are stacked. Materials of the first flexible material layer and second flexible material layer may be polyimide (PI), polyethylene terephthalate (PET), or a polymer soft film subjected to surface treatment, etc. Materials of the first inorganic material layer and second inorganic material layer may be silicon nitride (SiNx), silicon oxide (SiOx), or the like, so as to improve water-oxygen resistance capability of the base substrate. The first inorganic material layer and second inorganic material layer are also referred to as barrier layers. A material of the semiconductor layer may be amorphous silicon (a-si). In some exemplary implementations, taking a laminated structure of PI1/Barrier1/a-Si/PI2/Barrier2 as an example, its manufacturing process includes: firstly, coating a layer of polyimide on the glass carrier plate, curing it into a film to form a first flexible (PI1) layer; then, depositing a layer of barrier thin film on the first flexible layer to form a first barrier (Barrier1) layer covering the first flexible layer; then depositing a layer of amorphous silicon thin film on the first barrier layer to form an amorphous silicon (a-Si) layer covering the first barrier layer; after that, coating a layer of polyimide on the amorphous silicon layer, curing it into a film to form a second flexible (PI2) layer; then, depositing a layer of barrier thin film on the second flexible layer to form a second barrier (Barrier2) layer covering the second flexible layer, thereby completing manufacturing of the base substrate.

In an exemplary embodiment, the semiconductor layer may be made of various materials, such as amorphous Indium Gallium Zinc Oxide (a-IGZO), Zinc Oxynitride (ZnON), Indium Zinc Tin Oxide (IZTO), amorphous Silicon (a-Si), polycrystalline Silicon (p-Si), hexathiophene, and polythiophene. That is, the present disclosure is applicable to a transistor manufactured based on an oxide technology, a silicon technology, and an organic matter technology.

In an exemplary embodiment, as shown in FIG. 15, the active layer T41 of the fourth scan transistor and the active layer T51 of the fifth scan transistor may form an integrated structure, and the active layer T61 of the sixth scan transistor and the active layer T71 of the seventh scan transistor may form an integrated structure.

In an exemplary embodiment, as shown in FIG. 15, the active layer T11 of the first scan transistor may be in a shape of an inverted "n", the active layer T21 of the second scan transistor extends in the second direction and may be a strip-shaped structure, the active layer T31 of the third scan transistor extends in the second direction and may be a strip-shaped structure. The integrated structure of the active layer T41 of the fourth scan transistor and the active layer T51 of the fifth scan transistor extends in the second direction and may be a strip-shaped structure, the integrated structure of the active layer T61 of the sixth transistor and the active layer T71 of the seventh scan transistor extends in the second direction and may be a strip-shaped structure, and the active layer T81 of the eighth scan transistor extends in the second direction and may be a stripe-shaped structure.

Figure 16A:
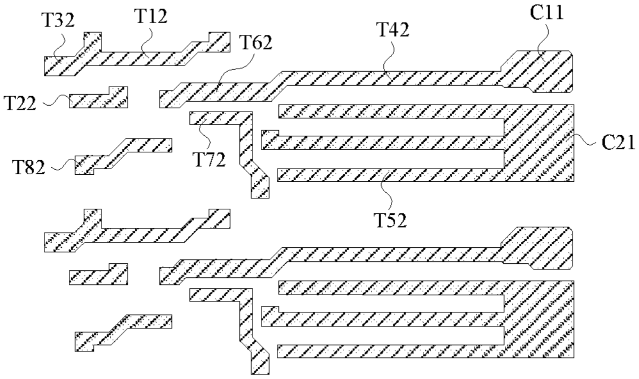
FIG. 16A is a schematic diagram of a pattern of a first conductive layer.
Figure 16B:
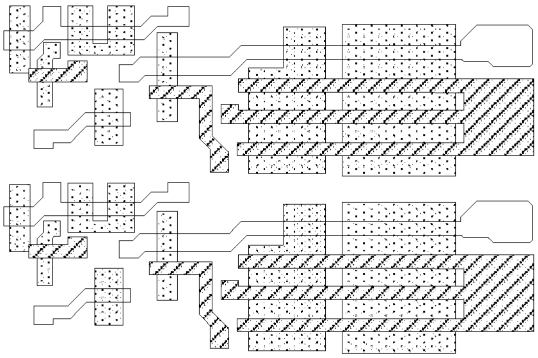
FIG. 16B is a schematic diagram after a pattern of a first conductive layer is formed.

(2) A pattern of a first conductive layer is formed, which includes: on the base substrate formed with the aforementioned pattern, a first insulation thin film and a first conductive thin film are deposited, the first insulation thin film and the first conductive thin film are patterned by a patterning process to form a pattern of first insulation layer and a pattern of a first conductive layer disposed on the pattern of the first insulation layer, as shown in FIGS. 16A and 16B, wherein FIG. 16A is a schematic diagram of the pattern of the first conductive layer and FIG. 16B is a schematic diagram after the pattern of the first conductive layer is formed.

In an exemplary embodiment, as shown in FIGS. 16A and 16B, the pattern of the first conductive layer may include a control electrode T12 of a first scan transistor to an eighth scan transistor T82, a first plate C11 of a first scan capacitor, and a first plate C21 of a second scan capacitor.

In an exemplary embodiment, the first conductive layer may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be a single-layer structure or a multi-layer composite structure, such as Ti/Al/Ti.

In an exemplary embodiment, the first insulation layer may be made of any one or more of silicon oxide (SiOx), silicon nitride (SiNx) and silicon oxynitride (SiON), and may be a single-layer, multi-layers or a composite layer. The first insulation layer may be referred to as a first gate insulation layer.

In an exemplary embodiment, as shown in FIGS. 16A and 16B, the control electrode T12 of the first scan transistor and the control electrode T32 of the third scan transistor form an integrated structure. The integrated structure of the control electrode T12 of the first scan transistor and the control electrode T32 of the third scan transistor extends in the first direction and may be strip-shaped.

In an exemplary embodiment, as shown in FIGS. 16A and 16B, the first plate C11 of the first scan capacitor, the control electrode T42 of the fourth scan transistor, and the control electrode T62 of the sixth scan transistor form an integrated structure and extend in the first direction.

In an exemplary embodiment, as shown in FIGS. 16A and 16B, the first plate C21 of the second scan capacitor and the control electrode T52 of the fifth scan transistor form an integrated structure. The integrated structure of the first plate C21 of the second scan capacitor and the control electrode T52 of the fifth scan transistor is a comb-shaped structure, the first plate C21 of the second scan capacitor is a comb back, and the control electrode T52 of the fifth scan transistor is a comb tooth.

In an exemplary embodiment, as shown in FIGS. 16A and 16B, the control electrode T22 of the second scan transistor and the control electrode T82 of the eighth scan transistor extend in the first direction and may be strip-shaped.

In an exemplary embodiment, as shown in FIGS. 16A and 16B, the control electrode T12 of the first scan transistor is arranged across the active layer of the first scan transistor, the control electrode T22 of the second scan transistor is arranged across the active layer of the second scan transistor, the control electrode T32 of the third scan transistor is arranged across the active layer of the third scan transistor, the control electrode T42 of the fourth scan transistor is arranged across the active layer of the fourth scan transistor, the control electrode T52 of the fifth scan transistor is arranged across the active layer of the fifth scan transistor, the control electrode T62 of the sixth scan transistor is arranged across the active layer of the sixth scan transistor, the control electrode T72 of the seventh scan transistor is arranged across the active layer of the seventh scan transistor, and the control electrode T82 of the eighth scan transistor is arranged across the active layer of the eighth scan transistor, that is, an extension direction of the control electrode of at least one scan transistor is perpendicular to the extension direction of the active layer.

In an exemplary embodiment, this process further includes a conductive processing. The conductive processing is that after the first conductive layer is formed, the semiconductor layer in an area shielded by control electrodes of multiple scan transistors (i.e., an area where the semiconductor layer is overlapped with the control electrodes) is used as a channel area of the scan transistor, and the semiconductor layer in an area that is not shielded by the first conductive layer is processed into a conductive layer to form an electrode connection portion of the scan transistor. As shown in FIG. 16B, electrode connection portions, which are connected with each other, of the active layer of the sixth scan transistor and the active layer of the seventh scan transistor in the present disclosure are processed into a conductive layer to form a conductive structure that can be multiplexed into a second electrode of the sixth scan transistor and a first electrode of the seventh scan transistor.

Figure 17A:
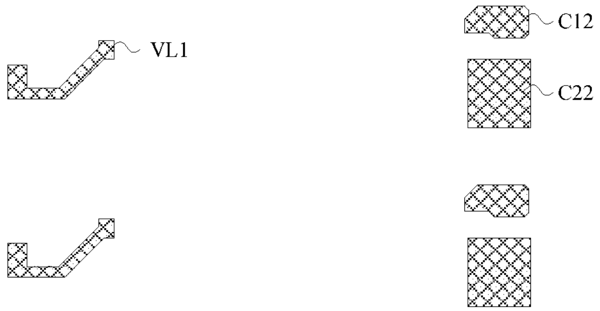
FIG. 17A is a schematic diagram of a pattern of second conductive layer.
Figure 17B:
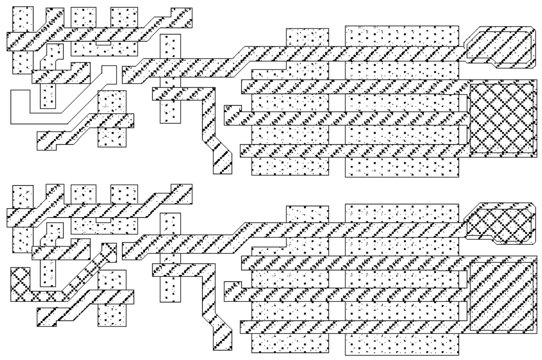
FIG. 17B is a schematic diagram after a pattern of a second conductive layer is formed.

(3) A pattern of a second conductive layer is formed, which includes: on the base substrate formed with the aforementioned pattern, a second insulation thin film and a second conductive thin film are deposited, the second insulation thin film and the second conductive thin film are patterned by a patterning process to form a pattern of a second insulation layer and a pattern of a second conductive layer on the pattern of the second insulation layer, as shown in FIGS. 17A and 17B, wherein FIG. 17A is a schematic diagram of the pattern of the second conductive layer and FIG. 17B is a schematic diagram after the pattern of the second conductive layer is formed.

In an exemplary embodiment, as shown in FIG. 17A and FIG. 17B, the pattern of the second conductive layer may include a second plate C12 of the first scan capacitor, a second plate C22 of the second scan capacitor, and a first connection line VL1.

In some examples, the second conductive layer may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be in a single-layer structure or a multi-layer composite structure, such as Ti/Al/Ti.

In an exemplary embodiment, the second insulation layer may be made of any one or more of silicon oxide (SiOx), silicon nitride (SiNx) and silicon oxynitride (SiON), and may be a single-layer, multi-layers or a composite layer. The first insulation layer 501 may be referred to as a second gate insulation layer.

In an exemplary embodiment, as shown in FIGS. 17A and 17B, an orthographic projection of the second plate C12 of the first scan capacitor on the base substrate is at least partially overlapped with an orthographic projection of the first plate C11 of the first scan capacitor on the base substrate.

In an exemplary embodiment, as shown in FIGS. 17A and 17B, an orthographic projection of the second plate C22 of the second scan capacitor on the base substrate is at least partially overlapped with an orthographic projection of the first plate C21 of the second scan capacitor on the base substrate.

In an exemplary embodiment, as shown in FIGS. 17A and 17B, an orthographic projection of the first connection line on the base substrate is located between an orthographic projection of the control electrode of the second scan transistor on the base substrate and an orthographic projection of the control electrode of the eighth scan transistor on the base substrate.

Figure 18:
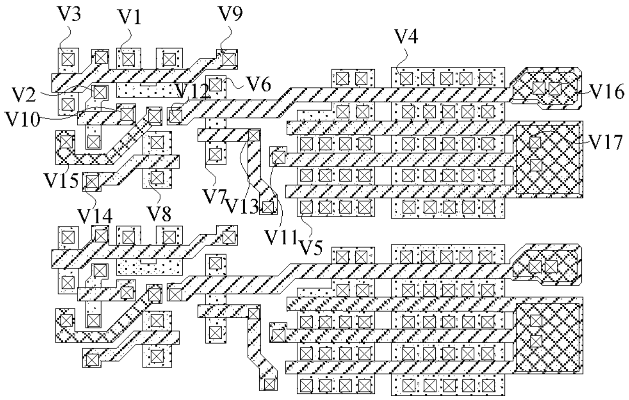
FIG. 18 is a schematic diagram after a pattern of a third insulation layer is formed.

(4) A pattern of a third insulation layer is formed, which includes: on the base substrate formed with the aforementioned patterns, a third insulation thin film is deposited, and the third insulation thin film is patterned through a patterning process to form a pattern of the third insulation layer. As shown in FIG. 18, FIG. 18 is a schematic diagram after the pattern of the third insulation layer is formed.

In an exemplary embodiment, as shown in FIG. 18, a pattern of multiple vias may include: a first via V1 to an eighth via V8 formed on the first insulation layer to the third insulation layer, a ninth via V9 to a fourteenth via V14 formed on the second insulation layer and the third insulation layer, and a fifteenth via V15 to a seventeenth via V17 formed on the third insulation layer. The first via V1 exposes the active layer of the first scan transistor, the second via V2 exposes the active layer of the second scan transistor, the third via V3 exposes the active layer of the third scan transistor, the fourth via V4 exposes the active layer T41 of the fourth scan transistor, the fifth via V5 exposes the active layer T51 of the fifth scan transistor, the sixth via V6 exposes the active layer T61 of the sixth scan transistor, the seventh via V7 exposes the active layer T71 of the seventh scan transistor, the eighth via V8 exposes the active layer T81 of the eighth scan transistor, the ninth via V9 exposes the integrated structure of the control electrode of the first scan transistor and the control electrode of the third scan transistor, the tenth via V10 exposes the control electrode of the second scan transistor, the eleventh via V11 exposes the control electrode of the fifth scan transistor, the twelfth via V12 exposes the integrated structure of the control electrode of the fourth scan transistor and the control electrode of the sixth scan transistor, the thirteenth via V13 exposes the control electrode of the seventh scan transistor, the fourteenth via V14 exposes the control electrode of the eighth scan transistor, the fifteenth via V15 exposes the first connection line, the sixteenth via V16 exposes the second plate of the first scan capacitor, and the seventeenth via V17 exposes the second plate of the second scan capacitor.

In an exemplary embodiment, the third insulation layer may be made of any one or more of silicon oxide (SiOx), silicon nitride (SiNx) and silicon oxynitride (SiON), and may be a single-layer, multi-layers or a composite layer. The first insulation layer may be referred to as a second gate insulation layer.

In an exemplary embodiment, as shown in FIG. 18, multiple fourth vias V4 may be provided, and the multiple fourth vias V4 are arranged in an array.

In an exemplary embodiment, as shown in FIG. 18, multiple fifth vias V5 may be provided, and the multiple fifth vias V5 are arranged in an array.

In an exemplary embodiment, as shown in FIG. 18, two ninth vias V9 may be provided, and a virtual straight line extending in the second direction passes through the two ninth vias.

In an exemplary embodiment, as shown in FIG. 18, two thirteenth via V13 may be provided, wherein one thirteenth via V13 is located in the middle of the control electrode of the seventh scan transistor, and the other thirteenth via V13 is located at an end of the control electrode of the seventh scan transistor close to the control electrode of the fifth transistor.

In an exemplary embodiment, as shown in FIG. 18, two fifteenth via V15 may be provided, and the two fifteenth via V15 are respectively located at two ends of the first connection line.

In an exemplary embodiment, as shown in FIG. 18, multiple sixteenth vias V16 may be provided, and the multiple sixteenth vias V16 may be arranged in the first direction.

In an exemplary embodiment, as shown in FIG. 18, multiple seventeenth vias V17 may be provided, and the multiple seventeenth vias V17 may be arranged in the second direction.

Figure 19A:
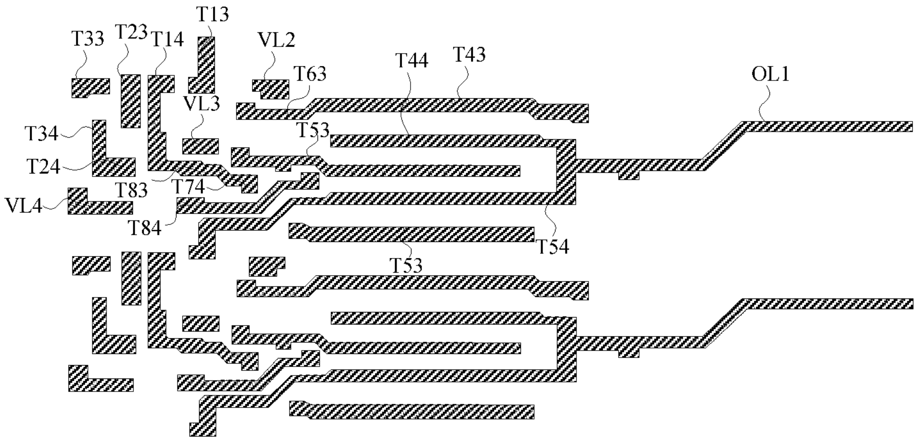
FIG. 19A is a schematic diagram of a pattern of a third conductive layer.
Figure 19B:
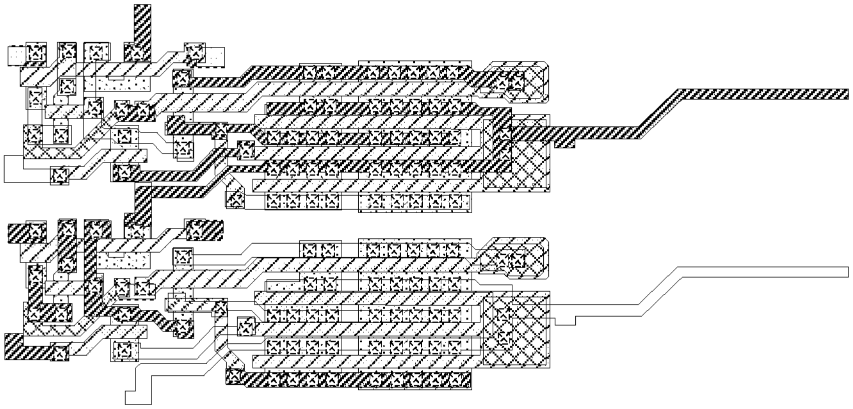
FIG. 19B is a schematic diagram after a pattern of a third conductive layer is formed.

(5) A pattern of a third conductive layer is formed, which includes: on the base substrate formed with the aforementioned pattern, a third metal thin film is deposited, and the third metal thin film is patterned by a patterning process to form a pattern of a third conductive layer, as shown in FIGS. 19A and 19B, wherein FIG. 19A is a schematic diagram of the pattern of the third conductive layer and FIG. 19B is a schematic diagram after the pattern of the third conductive layer is formed.

In an exemplary embodiment, as shown in FIGS. 19A and 19B, the pattern of the third conductive layer may include: a first electrode T13 and a second electrode T14 of the first scan transistor to a first electrode T53 and a second electrode T54 of the fifth scan transistor, a first electrode T63 of the sixth scan transistor, a second electrode T74 of the seventh scan transistor, a first electrode T83 and a second electrode T84 of the eighth scan transistor, a first signal output line OL1, a second connection line VL2, a third connection line VL3 and a fourth connection line VL4.

In some examples, the fourth conductive layer may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be in a single-layer structure or a multi-layer composite structure, such as Ti/Al/Ti.

In an exemplary embodiment, as shown in FIGS. 19A and 19B, the second electrode T14 of the first scan transistor, the second electrode T74 of the seventh scan transistor and the first electrode T83 of the eighth scan transistor form an integrated structure. The second electrode T24 of the second scan transistor and the second electrode T34 of the third scan transistor form an integrated structure. The first electrode T43 of the fourth scan transistor and the first electrode T63 of the sixth scan transistor form an integrated structure. The second electrode T44 of the fourth scan transistor, the second electrode T54 of the fifth scan transistor and the first signal output line OL1 form an integrated structure.

In an exemplary embodiment, as shown in FIGS. 19A and 19B, the first signal output line OL1 extends in the first direction, and an orthographic projection of the first signal output line OL1 on the base substrate is partially overlapped with an orthographic projection of the second scan capacitor on the base substrate.

In an exemplary embodiment, as shown in FIGS. 19A and 19B, an orthographic projection of the second connection line on the base substrate is partially overlapped with an orthographic projection of the integrated structure of the control electrode of the first scan transistor and the control electrode of the third scan transistor on the base substrate.

In an exemplary embodiment, as shown in FIGS. 19A and 19B, an orthographic projection of the third connection line VL3 on the base substrate is partially overlapped with an orthographic projection of the integrated structure of the first connection line and the first electrode C11 of the first scan capacitor and the integrated structure of the control electrode T42 of the fourth scan transistor and the control electrode T62 of the sixth scan transistor on the base substrate.

In an exemplary embodiment, as shown in FIGS. 19A and 19B, the first electrode T13 and the second electrode T14 of the first scan transistor are connected to the active layer of the first scan transistor through the first via. The first electrode T23 of the second scan transistor and the second electrode T24 of the second scan transistor are connected to the active layer of the second scan transistor through the second via, and the first electrode of the second scan transistor is electrically connected with the integrated structure of the control electrode of the first scan transistor and the control electrode of the third scan transistor through one ninth via. The first electrode T33 and the second electrode T34 of the third scan transistor are respectively connected to the active layer of the third scan transistor through the third via. The first electrode T43 and the second electrode T44 of the fourth scan transistor are connected to the active layer exposing the fourth scan transistor through the fourth via. The first electrode T53 and the second electrode T55 of the fifth scan transistor are connected to the active layer of the fifth scan transistor through the fifth via. The first electrode T63 of the sixth scan transistor is connected to the active layer of the sixth scan transistor through the sixth via. The second electrode T74 of the seventh scan transistor is connected to the active layer of the seventh scan transistor through the seventh via. The first electrode T83 and the second electrode T84 of the eighth scan transistor are connected to the active layer of the eighth scan transistor through the eighth via, and the second electrode T84 of the eighth scan transistor is electrically connected to the control electrode of the fifth scan transistor through the eleventh via. The integrated structure of the second electrode T24 of the second scan transistor and the second electrode T34 of the third scan transistor is electrically connected to the first connection line through one fifteenth via. The integrated structure of the second electrode T14 of the first transistor, the second electrode T74 of the seventh transistor and the first electrode T83 of the eighth transistor is electrically connected to the control electrode of the second transistor through the tenth via. The integrated structure of the first electrode T43 of the fourth transistor and the first electrode T63 of the sixth transistor T63 is electrically connected with the second plate of the first capacitor through the sixteenth via. The integrated structure of the second electrode T44 of the fourth transistor the second electrode T54 of the fifth transistor and the first signal output line OL1 is electrically connected to the second plate of the second transistor through the seventeenth via. The first electrode T53 of the fifth transistor is electrically connected to the control electrode of the seventh transistor through the thirteenth via. The second connection line VL2 is electrically connected to the integrated structure of the control electrode of the first transistor and the control electrode of the third transistor through the other ninth via. The third connection line VL3 is electrically connected to the first connection line through the other fifteenth via, and is electrically connected to the integrated structure of the control electrode of the fourth transistor and the control electrode of the sixth transistor through the twelfth via. The fourth connection line VL4 is electrically connected to the control electrode of the eighth transistor through the fourteenth via.

In an exemplary embodiment, as shown in FIGS. 19A and 19B, the integrated structure of the second electrode T44 of the fourth transistor, the second electrode T54 of the fifth transistor and the first signal output line OL1 is electrically connected to a first electrode of a first transistor of a scan shift register of a next stage.

Figure 20:
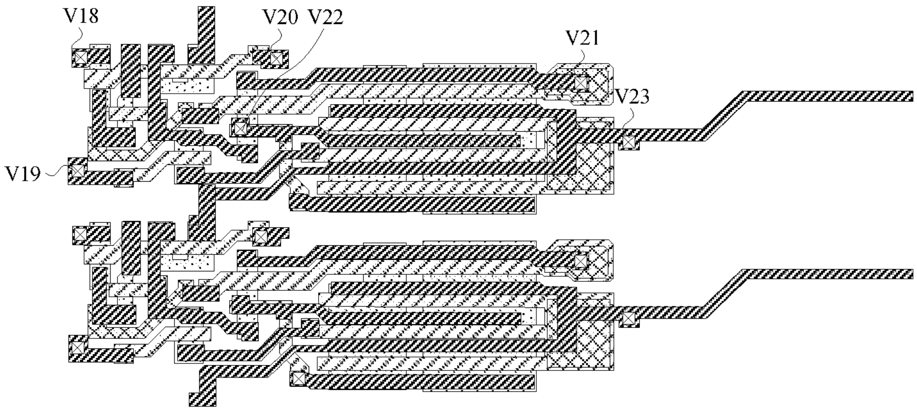
FIG. 20 is a schematic diagram after a pattern of a fourth insulation layer is formed.

(6) A pattern of a fourth insulation layer is formed, which includes: on the base substrate formed with the aforementioned patterns, a fourth insulation thin film is deposited, and the fourth insulation thin film is patterned through a patterning process to form a pattern of the fourth insulation layer. As shown in FIG. 20, FIG. 20 is a schematic diagram after the pattern of a fourth insulation layer is formed.

In an exemplary embodiment, as shown in FIG. 20, a pattern of multiple vias may include a eighteenth via V18 to a twenty-third via V23 formed on the fourth insulation layer. The eighteenth via V18 exposes the first electrode of the third transistor, the nineteenth via V19 exposes the fourth connection line, the twentieth via V20 exposes the second connection line, the twenty-first via V21 exposes the integrated structure of the first electrode of the fourth transistor and the first electrode of the sixth transistor, the twenty-second via V22 exposes the first electrode of the fifth transistor, and the twenty-third via V23 exposes the first signal output line.

In an exemplary embodiment, the fourth insulation layer may be made of any one or more of silicon oxide (SiOx), silicon nitride (SiNx) and silicon oxynitride (SiON), and may be a single-layer, multi-layers or a composite layer. The first insulation layer 501 may be referred to as a second gate insulation layer.

Figure 21A:
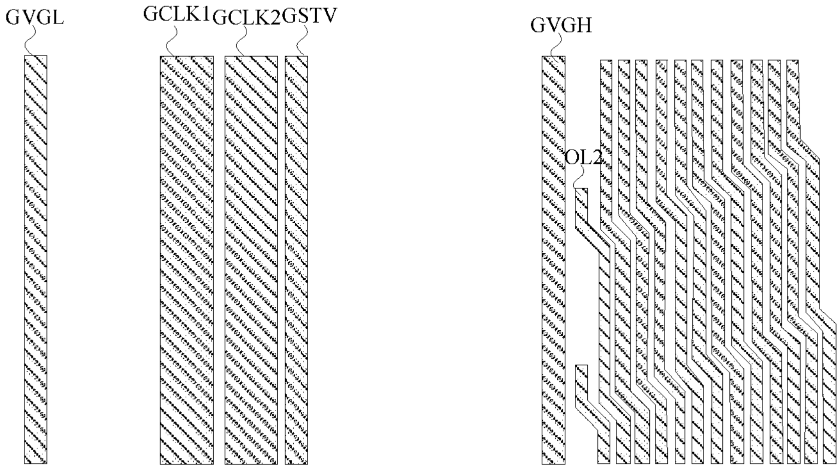
FIG. 21A is a schematic diagram of a pattern of a fourth conductive layer.
Figure 21B:
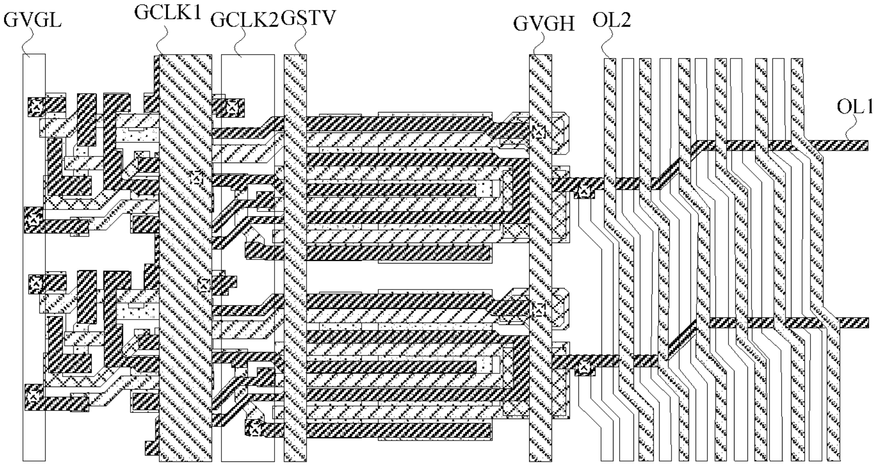
FIG. 21B is a schematic diagram after a pattern of a fourth insulation layer is formed.

(7) A pattern of a fourth conductive layer is formed, which includes: on the base substrate formed with the aforementioned pattern, a fourth metal thin film is deposited, and the fourth metal thin film by a patterning process to form a pattern of a fourth conductive layer, as shown in FIGS. 21A and 21B, wherein FIG. 21A is a schematic diagram of the pattern of the fourth conductive layer and FIG. 21B is a schematic diagram after the pattern of the fourth conductive layer is formed.

In an exemplary embodiment, as shown in FIGS. 21A and 21B, the pattern of the fourth conductive layer may include: a scan initial signal line GSTV, a first scan clock signal line GCLK1, a second scan clock signal line GCLK2, a first scan power supply line GVGH, a second scan power supply line GVGL, and a second signal output line OL2.

In some examples, the fourth conductive thin film may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be in a single-layer structure or a multi-layer composite structure, such as Ti/Al/Ti.

In an exemplary embodiment, as shown in FIGS. 21A and 21B, the second scan power supply line GVGL is located at a side of the first scan clock signal line GCLK1 away from the display area. The second scan clock signal line GCLK2 is located at a side of the first scan clock signal line GCLK1 close to the display area. The scan initial signal line GSTV is located at a side of the second scan clock signal line GCLK2 close to the display area. The first scan power supply line GVGH is located at a side of the scan initial signal line GSTV close to the display area. The second signal output line OL2 is located at a side of the first scan power supply line GVGH close to the display area.

In an exemplary embodiment, as shown in FIGS. 21A and 21B, an orthographic projection of the first electrode and the fourth connection line of the third transistor on the base substrate is partially overlapped with an orthographic projection of the second scan power supply line GVGL on the base substrate.

In an exemplary embodiment, as shown in FIGS. 21A and 21B, an orthographic projection of the second connection line on the base substrate is partially overlapped with an orthographic projection of the scan clock signal line connected with a first clock signal terminal of a scan shift register on the base substrate.

In an exemplary embodiment, as shown in FIGS. 21A and 21B, an orthographic projection of the first electrode of the fifth transistor on the base substrate is partially overlapped with an orthographic projection of the scan clock signal line connected with a second clock signal terminal of a scan shift register on the base substrate.

In an exemplary embodiment, as shown in FIGS. 21A and 21B, an orthographic projection of a second signal output line of a scan shift register on the base substrate is partially overlapped with an orthographic projection of a first signal output line of the same scan shift register on the base substrate.

In an exemplary embodiment, as shown in FIGS. 21A and 21B, the second scan power supply line is electrically connected to the first electrode of the third transistor through the eighteenth via, and is connected to the fourth connection line through the nineteenth via. The second connection line is electrically connected with the scan clock signal line connected to the first clock signal terminal of the scan shift register through the twentieth via. The first electrode of the fifth transistor is electrically connected to the scan clock signal line connected with the second clock signal terminal of the scan shift register through the twenty-second via. The first scan power supply line GVGH is electrically connected to the integrated structure of the first electrode of the fourth transistor and the first electrode of the sixth transistor through the twenty-first via. The second signal output line OL2 is electrically connected to the first signal output line through the twenty-third via. FIGS. 21A and 21B illustrates an example in which the first electrode of the fifth transistor of the upper scan shift register is electrically connected to the first scan clock signal line GCLK1, and the second connection line is electrically connected to the second scan clock signal line GCLK2, the first electrode of the fifth transistor of the lower scan shift register is electrically connected to the second scan clock signal line GCLK2, and the second connection line is electrically connected to the first scan clock signal line GCLK1.

(8) A light emitting structure layer is formed, which includes: on the base substrate formed with the aforementioned pattern, a planarization thin film is coated, and the planarization thin film is patterned by etching to form a planarization layer, a transparent conductive thin film is deposited on the base substrate formed with the planarization layer, the transparent conductive thin film is patterned by a patterning process to form an anode, a pixel definition thin film is deposited on the base substrate formed with the anode, the pixel definition thin film is patterned by a patterning process to form a pixel definition layer, a cathode thin film is deposited on the base substrate formed with the pixel definition layer, and the cathode thin film is patterned by a patterning process to form a cathode.

In an exemplary embodiment, the planarization layer may be made of an organic material.

In an exemplary embodiment, the anode thin film may be made of Indium Tin Oxide (ITO) or Indium Zinc Oxide (IZO).

The display substrate according to the embodiment of the present disclosure may be applied to display products with any resolution.

An embodiment of the present disclosure further provides a display device, including a display substrate.

In an exemplary embodiment, the display device may be any product or component with any display function, such as a display, a television, a mobile phone, a tablet computer, a navigator, a digital photo frame and a wearable display product.

The display substrate is the display substrate according to any of the aforementioned embodiments, and has similar implementation principles and implementation effects, which will not be repeated here.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, an area, or a base substrate is described as being "on" or "under" another element, the element may be "directly" located "on" or "under" the other element, or there may be an intermediate element therebetween.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation to implementation forms and details without departing from the spirit and scope disclosed in the present disclosure. However, the scope of patent protection of the present disclosure is still subject to the scope defined by the appended claims.

The invention claimed is:

1. A display substrate, comprising a base substrate and a circuit structure layer disposed on the base substrate, wherein the circuit structure layer comprises a plurality of pixel circuits, a scan drive circuit, a control drive circuit and a buffer drive circuit; each pixel circuit of the plurality of pixel circuits comprises a node reset transistor, a writing transistor, a reset signal line, a scan signal line, and a control signal line, the reset signal line is connected with a control electrode of the node reset transistor, the scan signal line is connected with a control electrode of the writing transistor;

reset signal lines of pixel circuits of first row to K-th row of the plurality of pixel circuits are electrically connected with the buffer drive circuit, reset signal lines of pixel circuits of (K+1)-th row to N-th row of the plurality of pixel circuits are electrically connected with the scan drive circuit or the control drive circuit, such that a difference between a start time of signals of scan signal lines or control signal lines of the plurality of pixel circuits being an effective signal and an end time of signals of reset signal lines of the plurality of pixel circuits being an effective level signal is greater than or equal to a threshold time, and N is a total number of rows of the plurality of pixel circuits.

2. The display substrate according to claim 1, wherein each pixel circuit of the plurality of pixel circuits further comprises a drive transistor, the threshold time t is approximately equal to K*(1/f)/N, or K*(1/f)/(N+N0), or Tstress, where f is a refresh frequency of the display substrate, N0 is a sum of number of blank rows executed by the display substrate before and/or after operation of the N rows pixel circuit, N0 is a positive integer greater than or equal to 0, and Tstress is a recovery time of a threshold voltage of a biased drive transistor.

3. The display substrate according to claim 1, wherein scan signal lines of the pixel circuits of the first row to the N-th row of the plurality of pixel circuits are electrically connected to the scan drive circuit, and control signal lines of the pixel circuits of the first row to the N-th row of the plurality of pixel circuits are electrically connected to the control drive circuit;

when a transistor type of the node reset transistor is the same as a transistor type of the writing transistor, the reset signal lines of the pixel circuits of the (K+1)-th row to the N-th row of the plurality of pixel circuits are electrically connected with the scan drive circuit; each pixel circuit of the plurality of pixel circuits further comprises a compensation transistor and a compensation reset transistor; a transistor type of the compensation reset transistor is opposite to transistor types of the drive transistor, the node reset transistor, the writing transistor and the compensation transistor; the scan signal line is further electrically connected with a control electrode of the compensation transistor, and a control signal line is electrically connected with a control electrode of the compensation reset transistor;

when the transistor type of the node reset transistor is opposite to that the transistor type of the writing transistor, the reset signal lines of the pixel circuits of the (K+1)-th row to the N-th of the plurality of pixel circuits are electrically connected with the control drive circuit, and each pixel circuit of the plurality of pixel circuits further comprises the compensation transistor; the transistor types of the node reset transistor and the compensation transistor are opposite to the transistor types of the drive transistor and the writing transistor; the control signal line is electrically connected with the control electrode of the compensation transistor.

4. The display substrate according to claim 1, comprising a display area and a non-display area, wherein the non-display area comprises a bezel area surrounding a periphery of the display area and a bonding area located at a side of the bezel area away from the display area;

the scan drive circuit, the control drive circuit and the buffer drive circuit are located in the display area and/or the non-display area;

when the scan drive circuit, the control drive circuit and the buffer drive circuit are located in the non-display area, the scan drive circuit and the control drive circuit are located at a first side and a second side of the display area which are opposite to each other, the buffer drive circuit is located at a third side of the display area away from the bonding area, or a fourth side of the display area close to the bonding area.

5. The display substrate according to claim 4, further comprising a light emitting drive circuit, wherein each pixel circuit of the plurality of pixel circuits further comprises a light emitting transistor and a light emitting signal line; the light emitting signal line is electrically connected with a control electrode of the light emitting transistor;

the light emitting drive circuit is located at a side of the control drive circuit away from the display area;

light emitting signal lines of pixel circuits of the first row to the N-th row of the plurality of pixel circuits are electrically connected with the light emitting drive circuit;

for pixel circuits in a same row of the plurality of pixel circuits, a difference between a start time of signals of light emitting signal lines of the row of pixel circuits being an effective level signal and an end time of signals of reset signal lines of the row of pixel circuits being an effective level signal is greater than a sum of the threshold time and a duration of signals of scan signal lines of the row of pixel circuits being an effective level signal.

6. The display substrate according to claim 1, further comprising a test circuit and a multiplexing circuit; each pixel circuit of the plurality of pixel circuits further comprises a data signal line extending in a second direction, a first direction intersects with the second direction, the first direction is an extension direction of the reset signal line, the scan signal line and the control signal line;

the data signal line is electrically connected with a first electrode of the writing transistor, the test circuit and the multiplexing circuit respectively; and the test circuit is located at a first side and a third side of a display area, and the multiplexing circuit is located at the first side and/or a second side of the display area.

7. The display substrate according to claim 6, wherein when the reset signal lines of the pixel circuits of the (K+1)-th row to the N-th row of the plurality of pixel circuits are electrically connected to the scan drive circuit, the buffer drive circuit comprises K cascaded buffer shift registers; the scan drive circuit comprises N cascaded scan shift registers; the control drive circuit comprises N/2 cascaded control shift registers, an output terminal of a buffer shift register of last stage is electrically connected with an input terminal of a scan shift register of first stage;

a buffer shift register of a-th stage is electrically connected with a reset signal line of a pixel circuit of a-th row, 1≤a≤K;

a scan shift register of b-th stage is electrically connected with a scan signal line of a pixel circuit of b-th row, 1≤b≤N;

a scan shift register of c-th stage is electrically connected with a reset signal line of a pixel circuit of (K+c)-th row, 1≤c≤N−K;

a control shift register of d-th stage is electrically connected to control signal lines of pixel circuits of (2d−1)-th row and 2d-th row respectively, 1≤d≤N/2.

8. The display substrate according to claim 7, wherein scan shift registers of first stage to (N−K)-th stage of the N cascaded scan shift registers comprises a first signal output line and a second signal output line connected to each other, the second signal output line is located at a side of the first signal output line away from the base substrate;

a first signal output line of the scan shift register of the c-th stage is electrically connected with a scan signal line of a pixel circuit of the c-th row, and a second signal output line of the scan shift register of the c-th stage is electrically connected with a reset signal line of the pixel circuit of the (K+c)-th row;

wherein the first signal output line and the second signal output line are located between the scan drive circuit and the display area, and an extension direction of the first signal output line intersects with an extension direction of the second signal output line.

9. The display substrate according to claim 7, wherein buffer shift registers of first stage to K-th stage of the K cascaded buffer shift registers comprise a third signal output line arranged in a same layer as the second signal output line, and a third signal output line of the buffer shift register of the a-th stage is electrically connected with a reset signal line of a pixel circuit of a-th row;

scan shift registers of (N−K+1)-th stage to N-th stage of the N cascaded scan shift registers comprises a fourth signal output line arranged in a same layer as the first signal output line; a fourth signal output line of a scan shift register of s-th stage is electrically connected with a scan signal line of a pixel circuit of s-th row, N−K+1≤s≤N; and the third signal output line and the fourth signal output line are located between the scan drive circuit and the display area.

10. The display substrate according to claim 6, wherein when the reset signal lines of the pixel circuits of the (K+1)-th row to the N-th row of the plurality of pixel circuits are electrically connected to the control drive circuit, the buffer drive circuit comprises K/2 cascaded buffer shift registers; the scan drive circuit comprises N cascaded scan shift registers; the control drive circuit comprises N/2 cascaded control shift registers, an output terminal of a buffer shift register of last stage is electrically connected with an input terminal of a control shift register of first stage;

a buffer shift register of i-th stage is electrically connected to reset signal lines of pixel circuits of (2i−1)-th row and 2i-th row respectively, 1≤i≤K/2;

a scan shift register of b-th stage is electrically connected with a scan signal line of a pixel circuit of b-th row, 1≤b≤N;

a control shift register of m-th stage is electrically connected to control signal lines of pixel circuits of (2m−1)-th row and 2m-th row respectively, 1≤m≤N/2; and a control shift register of n-th stage is electrically connected to reset signal lines of pixel circuits of (K+2n−1)-th row and (K+2n)-th row respectively, 1≤n≤(N−K)/2.

11. The display substrate according to claim 10, wherein control shift registers of first stage to (N−K)/2-th stage of the N/2 cascaded control shift registers comprises a first signal output line and a second signal output line connected to each other, the second signal output line is located at a side of the first signal output line away from the base substrate;

a first signal output line of a control shift register of the n-th stage of the N/2 cascaded control shift registers is electrically connected to control signal lines of pixel circuits of (2n−1)-th row and 2n-th row of the plurality of pixel circuits respectively, and a second signal output line of the control shift register of the n-th stage of the N/2 cascaded control shift registers is electrically connected to the reset signal lines of the pixel circuits of the (K+2n−1)-th row and the (K+2n)-th row of the plurality of pixel circuits respectively;

wherein the first signal output line and the second signal output line are located between the control drive circuit and the display area, and an extension direction of the first signal output line intersects with an extension direction of the second signal output line.

12. The display substrate according to claim 10, wherein buffer shift registers of first stage to (K/2)-th stage of the K/2 cascaded buffer shift registers comprise a third signal output line arranged in a same layer as the second signal output line, and a third signal output line of the buffer shift register of the i-th stage is electrically connected with the reset signal lines of the pixel circuits of the (2i−1)-th row and the 2i-th row respectively;

control shift registers of ((N−K)/2+1)-th stage to N/2-th stage of the N/2 cascaded control shift registers comprises a fourth signal output line arranged in a same layer as the first signal output line; a fourth signal output line of a control shift register of t-th stage is electrically connected with control signal lines of pixel circuits of (2t−1)-th row and 2t-th row respectively, $(N-K)/2+1t\le N/2$; and the third signal output line and the fourth signal output line are located between the control drive circuit and the display area.

13. The display substrate according to claim 5, wherein the light emitting drive circuit comprises light emitting shift registers of N/2 stages;

a light emitting shift register of d-th stage is electrically connected with light emitting signal lines of pixel circuits of (2d−1)-th row and 2d-th row respectively, $1\le d\le N/2$.

14. The display substrate according to claim 7, wherein a shape of a boundary of the display area comprises rounded rectangle, the rounded rectangle comprises four rounded corners and four bezel edges, the bezel area comprises a first rounded corner area located outside a first rounded corner, a second rounded corner area located outside a second rounded corner, a third rounded corner area located outside a third rounded corner, a fourth rounded corner area located outside a fourth rounded corner, a first bezel area located outside a first bezel edge, a second bezel area located outside a second bezel edge, a third bezel area located outside a third bezel edge and a fourth bezel area located outside a fourth bezel edge;

the first bezel area, the first rounded corner area and the second rounded corner area are located at the first side of the display area; the second bezel area, the third rounded corner area and the fourth rounded corner area are located at the second side of the display area; the third bezel area is located at the third side of the display area; and the fourth bezel area is located at the second side of the display area;

the pixel circuits of the first row of the plurality of pixel circuits are close to the third bezel area, and the pixel circuits of the N-th row of the plurality of pixel circuits are close to the fourth bezel area;

the display substrate further comprises a light emitting drive circuit;

the scan drive circuit is located in the first bezel area, the first rounded corner area and the second rounded corner area; the control drive circuit and the light emitting drive circuit are located in the second bezel area, the third rounded corner area and the fourth rounded corner area;

in the N cascaded scan shift registers, scan shift registers located in the first rounded corner area are arranged along the first rounded corner;

in the N cascaded scan shift registers, scan shift registers located in the second rounded corner area are arranged along the second rounded corner;

in the N/2 cascaded control shift registers, control shift registers located in the third rounded corner area are arranged along the third rounded corner; and in the N/2 cascaded control shift registers, control shift registers located in the fourth rounded corner area are arranged along the fourth rounded corner.

15. The display substrate according to claim 14, wherein the buffer drive circuit is located in the third bezel area, and the cascaded buffer shift registers in the buffer drive circuit are arranged along the first direction; or wherein the test circuit comprises a plurality of sub-test circuits, a part of the sub-test circuits are located in the third bezel area and interspersed between buffer shift registers, and another part of the sub-test circuits are located in the first rounded corner area and interspersed between the scan shift registers located in the first rounded corner area;

the multiplexing circuit is interspersed between the scan shift registers located in the first bezel area and/or the control shift registers located in the second bezel area; or wherein K is greater than or equal to 14 when the reset signal lines of the pixel circuits of the (K+1)-th row to the N-th row of the plurality of pixel circuits are electrically connected to the scan drive circuit; and K is greater than or equal to 7, when the reset signal lines of the pixel circuits of the (K+1)-th row to the N-th row of the plurality of pixel circuits are electrically connected to the control drive circuit.

16. The display substrate according to claim 7, wherein a boundary of the display area comprises a circle; the bezel area comprises a first area to a fourth area, the first area and the second area are located between the third area and the fourth area, a center line of the display area extending along the first direction passes through the third area and the fourth area;

the first area and the second area are respectively located at two sides of the center line of the display area extending along the first direction;

the first area is located at the first side of the display substrate, the second area is located at the second side of the display area, the third area is located at the third side of the display area, and the fourth area is located at the fourth side of the display area;

the pixel circuits of the first row of the plurality of pixel circuits are close to the fourth area, and the pixel circuits of the N-th row of the plurality of pixel circuits are close to the third area;

the display substrate further comprises a light emitting drive circuit;

the scan drive circuit is located in the first area, the control drive circuit and the light emitting drive circuit are located in the second area;

in the N cascaded scan shift registers, scan shift registers located in the first area are arranged along the circular boundary;

in the N/2 cascaded control shift registers, control shift registers located in the second area are arranged along the circular boundary; and the light emitting drive circuit comprises a plurality of light emitting shift registers, and in the plurality of light emitting shift registers, light emitting shift registers located in the second area are arranged along the circular boundary.

17. The display substrate according to claim 16, wherein the buffer drive circuit is located in the fourth area, and a plurality of cascaded buffer shift registers in the buffer drive circuit are arranged along the first direction; or wherein the test circuit is located in the first area and the third area;

the multiplexing circuit is located in the first area and/or the second area and is interspersed between the scan shift registers and/or the control shift registers; or wherein K is greater than or equal to 10 when the reset signal lines of the pixel circuits of the (K+1)-th row to the N-th row of the plurality of pixel circuits are electrically connected to the scan drive circuit; and K is greater than or equal to 5, when the reset signal lines of the pixel circuits of the (K+1)-th row to the N-th row of the plurality of pixel circuits are electrically connected to the control drive circuit.

18. The display substrate according to claim 1, wherein when the reset signal lines of the pixel circuits of the (K+1)-th row to the N-th row of the plurality of pixel circuits are electrically connected with the scan drive circuit, the buffer shift register and the scan shift register have a same circuit structure comprising a plurality of scan transistors and a plurality of scan capacitors, and a scan capacitor comprises a first plate and a second plate;

the display substrate further comprises a scan initial signal line, a first scan clock signal line and a second scan clock signal line, a first scan power supply line and a second scan power supply line; a buffer shift register of first stage is electrically connected with the scan initial signal line, and the buffer drive circuit and the scan drive circuit are electrically connected with the first scan clock signal line, the second scan clock signal line, the first scan power supply line and the second scan power supply line, respectively;

when the reset signal lines of the pixel circuits of the (K+1)-th row to the N-th row of the plurality of pixel circuits are electrically connected with the control drive circuit, the buffer shift register and the control shift register have a same circuit structure comprising a plurality of control transistors and a plurality of control capacitors, and a control capacitor comprises a first plate and a second plate; and the display substrate further comprises a control initial signal line, a first control clock signal line and a second control clock signal line, a first control power supply line and a second control power supply line; the buffer shift register of the first stage is electrically connected to the control initial signal line, and the buffer drive circuit and the control drive circuit are electrically connected to the first control clock signal line, the second control clock signal line, the first control power supply line and the second control power supply line respectively.

19. The display substrate according to claim 18, wherein when the reset signal lines of the pixel circuits of the (K+1)-th row to the N-th row of the plurality of pixel circuits are electrically connected with the scan drive circuit, the circuit structure layer comprises a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on the base substrate;

the semiconductor layer comprises active layers of the plurality of scan transistors;

the first conductive layer comprises control electrodes of the plurality of scan transistors and first plates of the plurality of scan capacitors;

the second conductive layer comprises second plates of the plurality of scan capacitors;

the third conductive layer comprises first electrodes and second electrodes of the plurality of scan transistors, first signal output lines of scan shift registers of first stage to (N−K)-th stage of the scan drive circuit and fourth signal output lines of the scan shift registers of (N−K+1)-th stage to N-th stage of the scan drive circuit; and the fourth conductive layer comprises the scan initial signal line, the first scan clock signal line, the second scan clock signal line, the first scan power supply line, the second scan power supply line, second signal output lines of the scan shift registers of the first stage to the (N−K)-th stage of the scan drive circuit and third signal output lines of buffer shift registers of the first stage to K-th stage of the buffer drive circuit;

or, wherein when the reset signal lines of the pixel circuits of (K+1)-th row to N-th row of the plurality of pixel circuits are electrically connected with the control drive circuit, the circuit structure layer comprises a semiconductor layer, a first insulation layer, a first conductive layer, a second insulation layer, a second conductive layer, a third insulation layer, a third conductive layer, a fourth insulation layer, a fourth conductive layer and a planarization layer which are sequentially stacked on the base substrate;

the semiconductor layer comprises active layers of the plurality of control transistors;

the first conductive layer comprises control electrodes of the plurality of control transistors and first plates of the plurality of control capacitors;

the second conductive layer comprises second plates of the plurality of control capacitors;

the third conductive layer comprises first electrodes and second electrodes of the plurality of control transistors, first signal output lines of control shift registers of first stage to (N−K)/2-th stage of the control drive circuit and fourth signal output lines of control shift registers of ((N−K)/2+1)-th stage to N-th stage of the control drive circuit; and the fourth conductive layer comprises the control initial signal line, the first control clock signal line, the second control clock signal line, the first control power supply line, the second control power supply line, second signal output lines of the control shift registers of the first stage to the (N−K)/2-th stage of the control drive circuit and third signal output lines of buffer shift registers of the first stage to K/2-th stage of the buffer drive circuit.

20. A display device, comprising the display substrate of claim 1.

* * * * *